United States Patent [19]

Cadotte et al.

[11] 4,345,315
[45] Aug. 17, 1982

[54] CUSTOMER SATISFACTION TERMINAL

[75] Inventors: Ernest R. Cadotte, Knoxville, Tenn.; Gerald P. Hester, Santa Ana, Calif.

[73] Assignee: MSI Data Corporation, Costa Mesa, Calif. ; by said Gerald P. Hester

[21] Appl. No.: 4,901

[22] Filed: Jan. 19, 1979

[51] Int. Cl.³ .................. G06F 15/02; G06F 15/20; G09B 7/00
[52] U.S. Cl. .................. 364/900; 434/322; 434/347; 179/2 AS; 235/54 F
[58] Field of Search ... 364/900 MS File, 200 MS File; 340/152 R, 149 R; 179/2 AS; 325/31; 35/9 R, 9 A, 48 R; 40/446; 235/54 F; 434/306, 322, 347

[56] References Cited

U.S. PATENT DOCUMENTS

| | | | |
|---|---|---|---|
| 3,071,753 | 1/1963 | Fritze et al. | 364/900 |
| 3,126,513 | 3/1964 | Kamen | 340/152 R |
| 3,158,317 | 11/1964 | Alexander | 235/145 |
| 3,394,368 | 7/1968 | Carr et al. | 340/365 |
| 3,566,370 | 2/1971 | Worthington, Jr. et al. | 364/900 |
| 3,573,749 | 4/1971 | Smith et al. | 364/900 |
| 3,596,254 | 7/1971 | Highleyman | 364/900 |
| 3,596,256 | 7/1971 | Alpert et al. | 364/900 |
| 3,689,930 | 9/1972 | Strickland | 40/446 |
| 3,747,228 | 7/1973 | Yamamoto | 35/9 A |
| 3,777,222 | 12/1973 | Harris | 317/112 |
| 3,794,982 | 2/1974 | McCormick et al. | 364/900 |
| 3,941,976 | 3/1976 | Huhn | 235/54 F |
| 3,946,220 | 3/1976 | Brobeck et al. | 364/900 |
| 3,950,618 | 4/1976 | Bloisi | 179/2 AS |
| 3,955,185 | 5/1976 | Nishimura | 340/324 R |
| 4,015,106 | 3/1977 | De Phillipo | 235/54 F |
| 4,046,992 | 9/1977 | Huhn et al. | 235/54 F |
| 4,085,446 | 4/1978 | Nagamura | 364/900 |
| 4,178,501 | 12/1979 | Luther | 235/54 F |
| 4,219,875 | 8/1980 | Templeton | 364/200 |

*Primary Examiner*—Gareth D. Shaw
*Assistant Examiner*—Eddie P. Chan
*Attorney, Agent, or Firm*—Edward J. DaRin

[57] ABSTRACT

An electronic terminal for electronically collecting opinion data from customers of a service organization as to the satisfaction with the services rendered. The electronic terminal has a keyboard that displays the inquiries with multiple choice responses for each inquiry. A response is associated with each key whereby the operation of the key records the associated response. The response representative of each operated key are collected under the electronic control of a microprocessor controller and visually displaying to the customer each of his selections. A tally of each answer is permanently recorded in the terminal. The electronic control for the terminal includes stored parameters for programming certain operations. The terminal includes a porable data collection terminal for receiving the collected data and permitting it to be transmitted to a remote point by conventional telephone lines to a host processor. The terminal may include a printer for providing written reports of the accumulated data in preselected formats. The printer is controlled by an individual microprocessor for arithmetically processing the collected data and printing it out. The parameter data may be examined and/or modified by authorized personnel of the service organization. Similarly, the stored tally counts may be visually displayed for on-the-site interpretations of the service questions.

30 Claims, 46 Drawing Figures

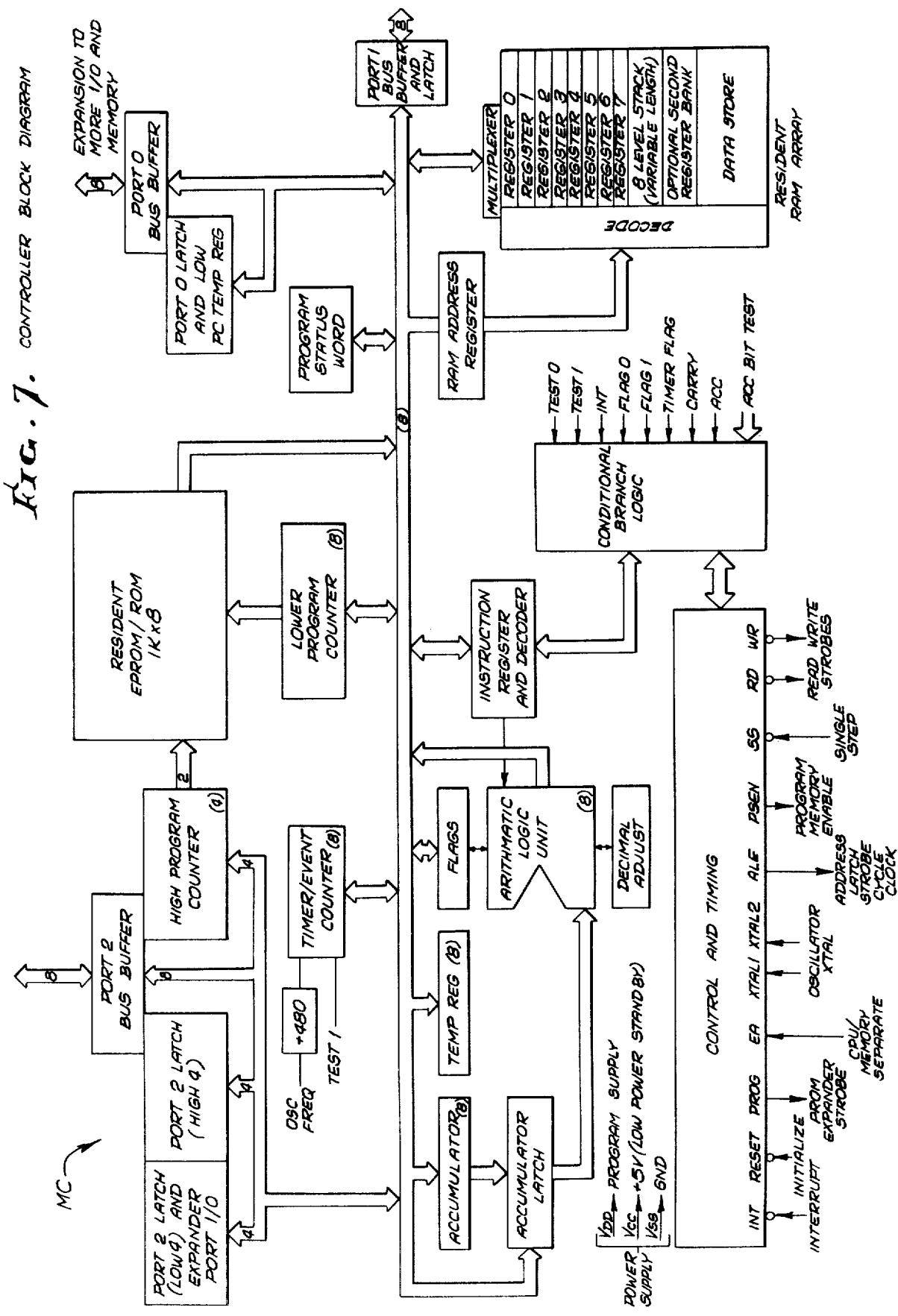
FIG. 7. CONTROLLER BLOCK DIAGRAM

MAIN TERMINAL LOGIC DIAGRAM

CONTROLLER REGISTER USAGE

256×8 RAM READ/WRITE TIMING

FIG. 10.

RAM 4 DIGIT PACKED BCD DATA FORMAT

PACKED BCD MEMORY DATA

| | DB7 | DB6 | DB5 | DB4 | DB3 | DB2 | DB1 | DB0 |
|---|---|---|---|---|---|---|---|---|
| MEMORY ADDRESS "A" | DIGIT NO. 3 NEXT LEAST SIGNIFICANT DIGIT (NLSD) | | | | DIGIT NO 4 LEAST SIGNIFICANT DIGIT (LSD) | | | |
| MEMORY ADDRESS "A+1" | DIGIT NO. 1 MOST SIGNIFICANT DIGIT (MSD) | | | | DIGIT NO 2, NEXT LEAST SIGNIFICANT DIGIT (NLSD) | | | |

FIG. 11.

5 DIGIT 7 SEGMENT DISPLAY FORMAT FOR 4 DIGIT MEMORY DATA

CHARACTER POSITIONS OF DISPLAY - 20

| DIGIT NO. 1 | DIGIT NO. 2 | DIGIT NO. 3 | DIGIT NO. 4 | DIGIT NO. 5 |
|---|---|---|---|---|
| MSD | NLSD (NMSD) | NLSD | LSD | BLANK |

KEYBOARD SCAN & DISPLAY
REFRESH LOGIC DIAGRAM

KEYBOARD SCAN AND DISPLAY REFRESH TIMING

DISPLAY BUFFER MEMORY

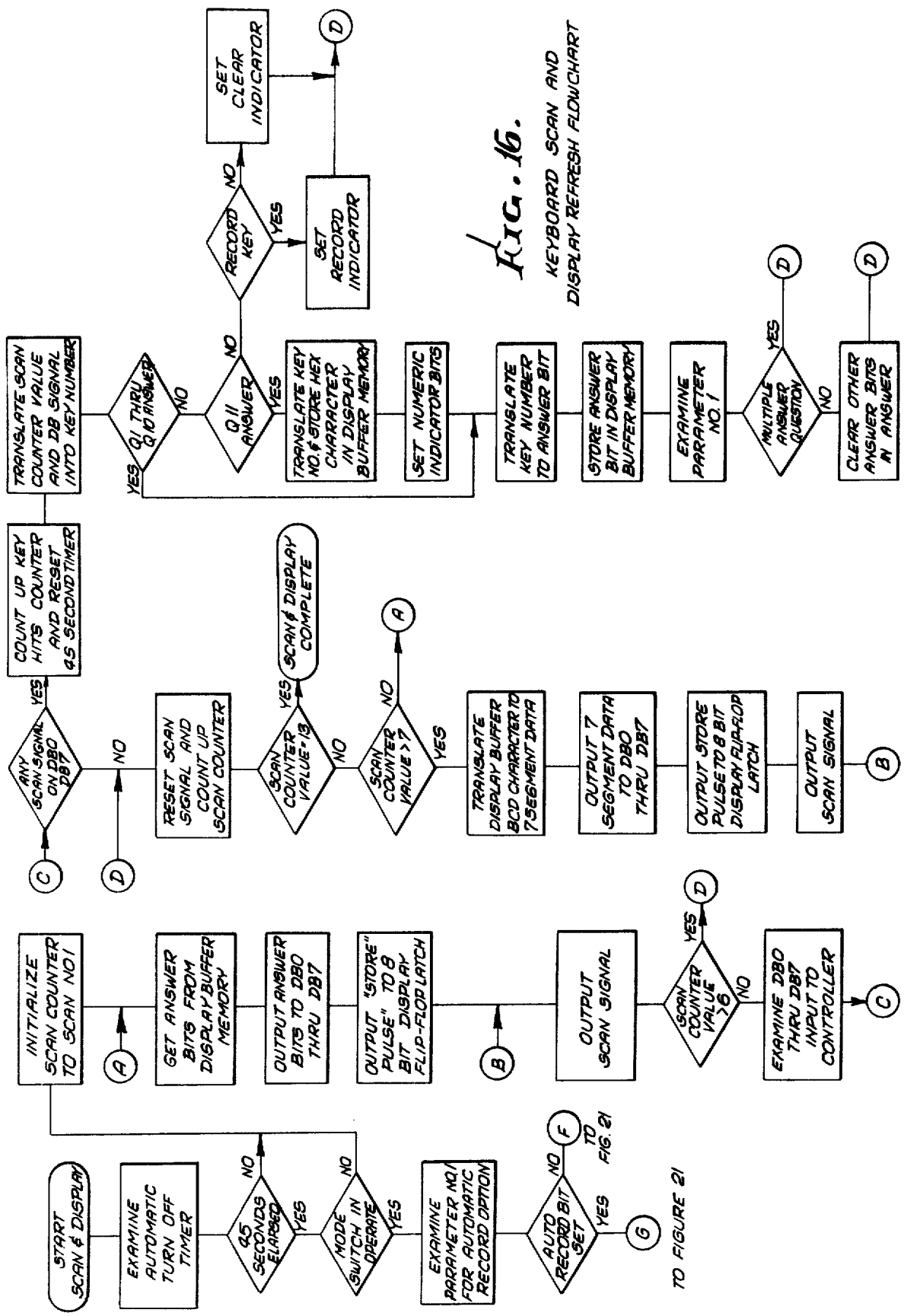

DEFINITION OF PARAMETER NUMBER 1 BITS

TYPICAL SERIAL DATA
CHARACTER "9"

POWER ON & OPERATE MODE FLOW CHART

ANSWER BIT & NUMERIC DATA OUTPUT BUFFER MEMORY ORGANIZATION

SERIAL DATA OUTPUT FLOWCHART

FIG. 22. COMPLETE DETAILED SERIAL DATA

SERIAL DATA RECORDS TO PORTABLE DATA COLLECTION TERMINAL

| ← ANSWER FIELD → | | ← ANSWER FIELD → | | ← ANSWER FIELD → | | ← TIME FIELD → | |
|---|---|---|---|---|---|---|---|
| ANSWERS TO QUES. 1 THRU 5 | 2 DIGIT ID CODE | ANSWERS TO QUES. 6 THRU 10 | 2 DIGIT ID CODE | ANSWERS TO QUES. 11 | 2 DIGIT ID CODE | TIME-OF-DAY | 2 DIGIT ID CODE |
| Q1 Q2 Q3 Q4 Q5 | 5 0 | Q6 Q7 Q8 Q9 Q10 | 5 1 | Q11 Q11 Q11 Q11 Q11 DIGIT DIGIT DIGIT DIGIT DIGIT 1 2 3 4 5 | 5 2 | TIME TIME TIME TIME H10 H1 M10 M1 | 5 3 |

FIG. 24. PARAMETER MODE DISPLAY

5 DIGIT 7 SEGMENT DISPLAY DATA

| VIEW | DIGIT 1 | DIGIT 2 | DIGIT 3 | DIGIT 4 | DIGIT 5 |
|---|---|---|---|---|---|
| A | P | | 0 | 1 | |
| B | P | | 2 | | |
| C | 2 | | | | |
| D | P | 3 | 2 | 3 | |
| E | 2 | | | | |

PARAMETER MODE FLOWCHART

MODE DISPLAY MESSAGES

SEQUENCED REPORT BUFFER
MEMORY ORGANIZATION

REAL-TIME-CLOCK FLOWCHART

PRINTER ELECTRONICS LOGIC DIAGRAM

REPORT No. 1

TYPICAL PRINTER DIGITS

TYPICAL 5×7 DOT MATRIX CHARACTERS

GENERAL PRINTER OPERATIONS

STANDARD HEADER

REPORT No 2

FIG. 35. REPORT No 3

REPORT No 4

CUSTOMER SATISFACTION TERMINAL

BACKGROUND OF INVENTION

1. Field of Invention

This invention relates to an electronic terminal for anonymously obtaining data on customer satisfaction with the services rendered by a service organization, by means of a portable, electronic data collection terminal.

The lodging industry has long recognized that there is a close relationship between guest satisfaction with the services rendered and profitability. The lodging industry attaches importance to guest feed-back information as a source of information of the satisfaction with their services. Some members of the lodging industry have gone to great lengths to measure this customer satisfaction, not only to solve immediate problems, but to prevent them from occurring again. Most guests do not take the time to communicate dissatisfactions or compliments to their hosts. Accordingly, a wide variety of approaches have been used to determine the level of satisfaction experienced by guests. Customer comment cards, unsolicited complaints and compliments, guest surveys, and anonymous visits by inspectors have all been used to gather information about guest satisfaction in the lodging industry. The most frequent complaints reported in the lodging industry include the speed of service provided by hotels and/or motels. The price of rooms, meals and other services, and the quality of service were also rated highly as major complaint items. Next in frequency were complaints about employee knowledge and service, availability of parking, the quietness of the surroundings, cleanliness of the property, and availability of accomodations. In addition, other complaints were directed to the check-out time and the adequacy of credit, etc. It has also been determined that the most effective methods to measure guest satisfaction involved direct communication initiated by the guests. These guest opinions or communications are helpful in the operation of a hotel and/or a motel since they identify the most frequent complaints and compliments and are valuable to highlight which services the guests are most sensitive to by virtue of their willingness to voice a complaint or compliment. Similar data is helpful in other consumer-oriented service industries, such as the grocery industry, hardware industry, drugstore industry, and the restaurant industry, in order to evaluate the services from the consumer's standpoint.

Accordingly, it is proposed to anonymously collect data of customer satisfaction with services rendered by a service organization through the provision of a portable data-collection terminal that may be readily operated by a customer of the service organization.

The electronic terminal is to be placed in a location of the service organization that is readily accessible to facilitate the use of the terminal by the organization's customers. One of the important items in such a portable data terminal is the keyboard. In obtaining the anonymous data on customer satisfaction, it is important that the terminal and/or keyboard have defined therein some ready means for changing both the inquiries concerning the services performed on behalf of a customer and the answers to such inquiries so that the establishment may readily evaluate the services on the basis of the recorded answers or opinions. In addition, it is desirable that the terminal be simple to operate and permit the establishment to collect and identify valid answers to the preselected customer satisfaction inquiries. The valid responses that are collected should be permanently recorded and the terminal should include means for transmitting the response data to a remote data processing facility for computer analyais of the data.

2. Prior Art

A rather complicated opinion sampling apparatus is disclosed in U.S. Pat. No. 3,689,930. This patent discloses electro-mechanical apparatus of a somewhat complicated construction for sequentially displaying inquiries in a preselected sequence on the face of a screen, much in the fashion that photographic slides are projected on a screen. The operator selects a particular key for his response and the subsequent inquiries are flashed on the screen in the preselected sequence. There is still a need for a relatively simple and inexpensive terminal for measuring such opinion data or customer satisfaction, that can be inexpensively manufactured and is essentially tamperproof from the standpoint of the user of the terminal but programmable from the standpoint of the establishment as to functions performed by the terminal.

SUMMARY OF THE INVENTION

The present invention provides an improved and relatively inexpensive method and apparatus for anonymously collecting opinion data such as customer satisfaction opinions for the services rendered by a service organization such as a motel, hotel, supermarket, drug store, or similar organization. The data collection terminal is of a simplified construction from the standpoint of the user of the terminal and the customer service organization. The method and apparatus allows a service organization to readily pinpoint the problem areas in their services on a day-by-day basis and on a time-by-day basis as well as the type of customer who has rendered his opinion, with the results being immediately available in either a printed out form or from a digital display. The method and apparatus of the present invention permits the service organization's establishment to quickly learn which areas of operation are working well and which areas improvement could significantly impact the profitability of their operation. The terminal is advantageously defined to be portable to allow it to be readily moved to different locations within the service organization. For further analysis of the collected opinion data the terminal is constructed and defined to permit the collected data to be transmitted to a host processor for the detail processing, analysis, etc. of the data.

From a broad method standpoint, the present invention comprehends a method of anonymously collecting opinion data from various types of customers and customers from diverse locations including the steps of recording a plurality of inquiries with multiple choice responses for each individual inquiry and displaying the record of inquiries and responses with a keyboard so that the individual keys of the keyboard are associated with and represent one of the multiple choice responses of the group of responses for an individual inquiry. The method comprehends electronically scanning the keyboard to acquire response data represented by an operative key and displaying the fact that an individual key has been operated and the corresponding response or responses for each displayed inquiry has been selected. The method includes providing a tally counter for each key on the keyboard and thereby each response, and incrementing each tally counter corresponding to the operated keys on the keyboard. The method may further comprehend a step of automatically discriminating between a valid and an invalid use of the terminal and storing the response data signals only for a valid use of the terminal. The method of collecting customer satisfaction data may also include the steps of transmitting the collected data signals to a remote location for detailed data processing.

From a structural organization standpoint the customer satisfaction data collection terminal of the present invention comprises a housing having a plurality of keys arranged in rows and columns on one face thereof, the housing displaying a plurality of inquiries with multiple responses for each inquiry, a response of the group of multiple responses for an individual inquiry being arranged in association with an individual key whereby the operation of a key represents a selection by the terminal user of the associated response. The keys are arranged in an electrical matrix of rows and columns with each key arranged in an electrical open circuit relationship with an individual row and column and the operation of the key momentarily bridges the row and column lines of an operated key. The keys include a "record" key arranged at a preselected location in the rows and columns of keys. Microprocessor control circuit means is mounted in the housing for providing key scan signals to the electrical matrix of rows and columns, row-by-row, for detecting and signalling the operation of an individual key and providing a key scan signal to the microprocessor control circuit means representative of the operated key. The microprocessor control circuit means includes a temporary storage means for storing the key scan signals at preselected storage locations in accordance with the position of the key in the rows and columns. Permanent storage means for summing the number of times an individual response is selected, with each response being assigned an individual storage location in the permanent storage means. The operation of the "record" key provides a key scan signal to the microprocessor circuit means and the microprocessor control circuit means will provide the necessary control signals for transferring the key scan signals from the temporary storage means to the permanent storage means at the individual storage locations for summing the number of times the individual responses have been selected by the anonymous terminal users.

The customer satisfaction data collection terminal may be further constructed and defined to include a conventional, portable, data collection terminal having memory means therein removaby mounted in the customer satisfaction terminal housing. The microprocessor circuit means is capable of transferring the key scan signals from the temporary storage means of the customer satisfaction terminal to the memory means for the conventional data collection terminal. The conventional, portable, data collection terminal includes means for converting the stored key scan signals to acoustic pulses for transmission over the conventional telephone lines to allow the collection opinion data to be transmitted to a remote large scale data processing unit. The customer satisfaction terminal may further include printing means mounted therein and an individual microprocessor control circuit means coupled to the printing means. The microprocessor circuit means in the customer satisfaction terminal for processing the opinion data is operative for transferring the key scan signals from its temporary storage means to the microprocessor circuit means for the printer to allow it to be printed out. The individual printer microprocessor is programmable for controlling the printing means to print out preselected data in preselected formats, including performing calculations on the data represented by the keyed in signals.

DESCRIPTION OF THE DRAWINGS

These and other features of the present invention may be fully appreciated when considered in the light of the following specifications and drawings, in which:

FIG. 7 is a block diagram of the conventional microprocessor controller utilized in the customer satisfaction terminal of FIG. 1;

FIG. 10 is a diagrammatic illustration of the data as packed in a binary coded decimal format in the permanent memory of FIG. 8.

FIG. 11 is a diagrammatic illustration of the character positions for the digital display of the customer satisfaction terminal for identifying the location of the digits stored therein from the most significant to the least significant;

FIG. 16 is a flow chart of the keyboard scan and display refresh operations;

FIG. 22 is a diagrammatic representation of the serial data as stored in the portable data collection terminal;

FIG. 24 is a diagrammatic illustration of the parameter mode display formats for the digital display of the customer satisfaction terminal;

DESCRIPTION OF THE PREFERRED EMBODIMENT

Figure 1:
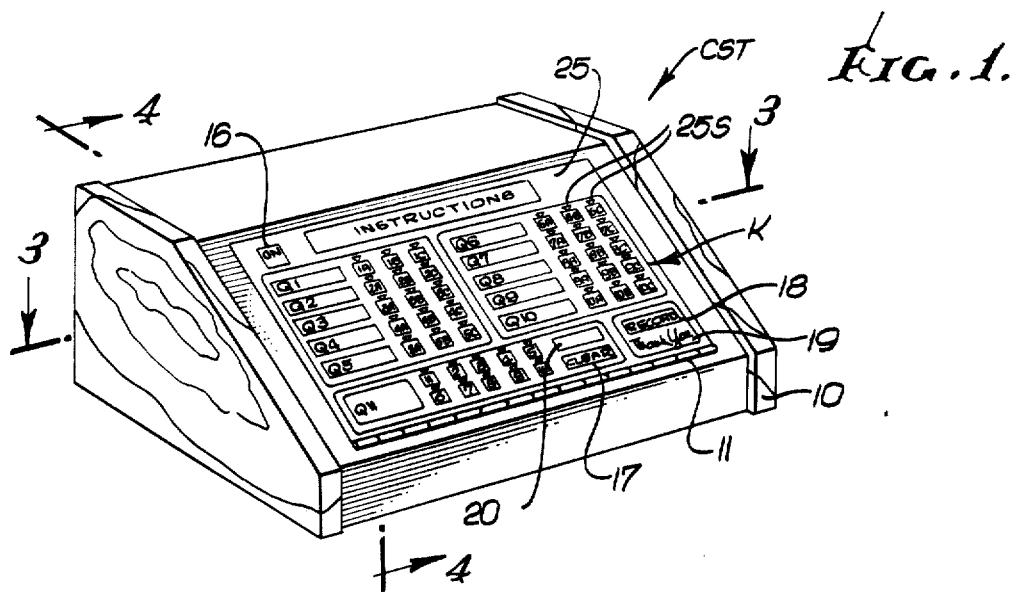
FIG. 1 is a perspective view of the customer satisfaction terminal embodying the present invention.
Figure 2:
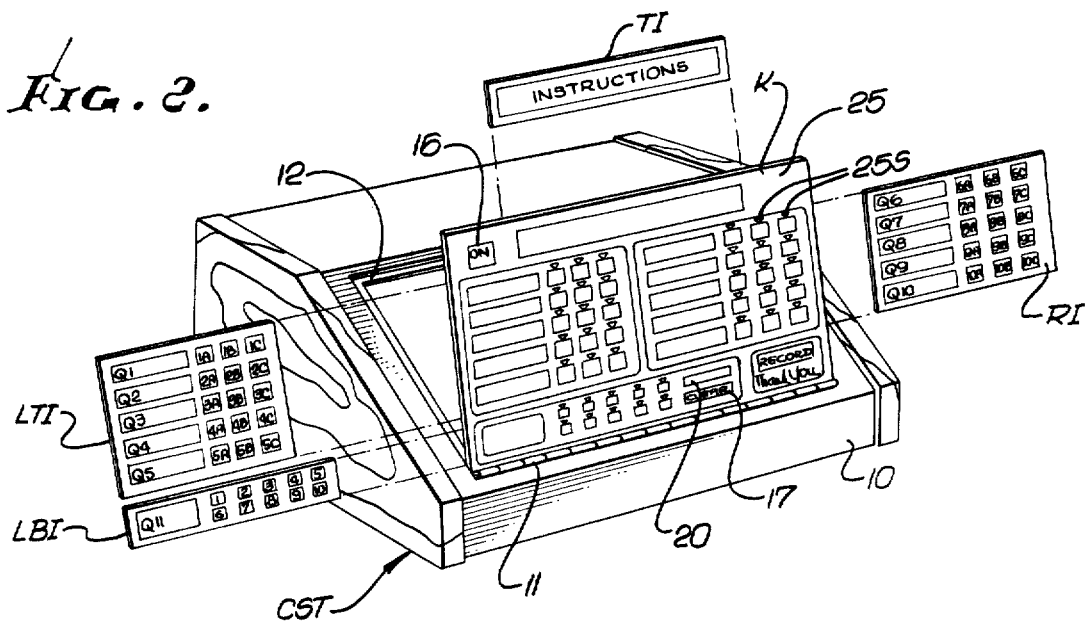
FIG. 2 is a perspective view of the customer satisfaction terminal of FIG. 1 with the keyboard in an open condition and showing the keyboard inserts in an exploded relationship with the open keyboard.

Now, referring to the drawings, the customer satisfaction terminal CST will be described in detail. The customer satisfaction terminal CST is illustrated in FIG. 1 in its operative relationship with the front face of the housing 10. The keyboard K is mounted to the front of the housing 10 by a longitudinal extending hinge 11 to permit the keyboard K to be swung outwardly, towards the user, as illustrated in FIG. 2. The keyboard K can only be swung outwardly by an authorized individual. To this end the keyboard K is mounted to overlie a ledge 12 (see FIG. 2), so as to lie flush with the front face of the terminal 10 and so as not to be movable by the user. The rear of the terminal CST is secured with a swingable door 13. The door 13 is hung with a longitudinal hinge 14 and is normally provided with a lock 15 for securing the door 13 to the terminal 10 proper; see FIG. 4. When the terminal 10 is secured, the keyboard K may not be moved from its operative position as illustrated in FIG. 1. The open position of the door 13 permits an individual to reach into the housing proper and push the keyboard K outwardly with his hand from the front face of the housing 10 to assume a position as illustrated in FIG. 2. The open position of the keyboard K permits access to the three edges of the keyboard K, as is best seen in FIG. 2.

The keyboard K, for the purposes of the present invention, is defined to display a multiplicity of inquiries or questions and a multiplicity of answers or responses for each individual question. Accordingly, the blank spaces illustrated on the front face of the keyboard K in FIGS. 1 and 2 are utilized for displaying the questions and multiple-choise answers. The format for the keyboard K, as illustrated in FIGS. 1 and 2, includes an ON switch 16 arranged in the upper left hand corner. The operation of the ON switch powers the keyboard K and the associated electronic circuitry housed within the terminal 10. In addition, a "CLEAR" key 17 is arranged to the left of the lower right-hand corner of the keyboard K for correcting any errors in operating the "keys". A RECORD key 18 and a THANK YOU area 19 are also arranged adjacent one another in the lower right-hand corner adjacent the CLEAR key 17. The RECORD key 18 is effective to actuate the electronic circuitry housed in the terminal 10 in response to its operation to record the answers selected by the user. The "THANK YOU" is merely a courtesy message that is illuminated at the end of the selection of the answers on the terminal CST by a user and is illuminated in response to the operation of the RECORD key, as will be made more evident immediately hereinafter.

The keyboard K, as illustrated in FIG. 2, is constructed and defined so that three inserts recording the desired customer satisfaction inquiries and the associated responses, may be displayed on the keyboard K. As illustrated in FIG. 2, two such inserts are illustrated on the left-hand edge of the keyboard K while a single insert is positioned adjacent the right-hand edge. A fourth insert is utilized to record the instructions to the user as to how to operate the terminal CST for recording the user's opinions on a step-by-step basis. The fourth insert is arranged adjacent the top edge of the keyboard K. The inserts are adapted to be slidably received between the top and bottom layers of the keyboard K. The upper left insert is identified in FIG. 2 as the insert LTI. The left bottom insert is identified as the insert LBI. The top insert is identified as the insert TI while the right-hand insert is identified as the insert RI. The inserts LTI, LBI and RI are constructed and defined of a light transmitting material with the areas identified as the question and answer areas Q1,Q2,1A,-2A,etc. respectively recording an inquiry (Q1) and associated multiple-choice answers (1A, 1B, 1C) to be visibly displayed at the keyboard K. Adjacent to each question or Q area on the inserts LTI and RI are three separate areas arranged in horizontal alignment and identified with the capital letter A. These areas record the multiple-choice answers or responses to be selected by the terminal user for the corresponding questions shown on the immediate left on the insert card. The insert LBI records a single question and a multiplicity of answers, 10 possible answers for a single question, as contrasted with three answers for each of the other 10 questions. Question 11 is defined to solicit responses in numerical form, i.e., "what is your zip code?" Accordingly, the 10 answer keys are identified as requesting the numbers 1 through 10, as illustrated in FIG. 2. Arranged immediately above the CLEAR key 17 is a digital display 20. The digital display 20 may be a 5 digit-7 segment light emitting diode display, with the digits identified as digits 1 through 5, reading left to right. The digital display 20 displays the numeric information keyed in by the operation of the numeric answer keys associated with question No. 11.

The questions are tailored to the particular service provided by the service organization and the questions and/or choice of answers may be readily varied. The insert cards, LBI, LTI and RI all record the previously defined questions and multiple choice answers on the face thereof. When other questions and answers are desired to be used by a service organization, the insert cards are removed and new insert cards placed therein that record the new question and/or questions and corresponding multiple-choice answers. Alternatively, the same insert may be utilized and new questions and/or answers provided by applying a label having the new questions and/or answers recorded thereon in the areas identified as Q and A, as should be evident from examining FIG. 2.

For the purposes of the present invention, it should be noted that the keyboard K is constructed of a multiplicity of electrically insulative, light transmitting layers secured to one another for defining the flat keyboard assembly K. The layers include a pair of switch layers having conductive segments deposited thereon and arranged in rows and columns. The pair of switch layers are normally insulatively spaced and pressure sensitive. Upon the application of pressure to a "key" or answer area on the face of the keyboard, the switch layers are placed into engagement so that the conductive segments are arranged in electrical conducting arrangement to provide a switch closure for defining an electrical signal representative of the operation of the selected key. Upon the release of the "key" the keyboard layers return to their normal spaced relationship.

In the preferred embodiment of the keyboard K, each of the insulative layers are constructed of a light-transmitting material. Similarly, the inserts are preferably constructed of a material that is light-transmitting so that the questions and answers that are recorded thereon are visible through the question and answer areas that are graphically delineated on the top layer 25; see FIG. 1.

The keyboard K is mounted with a printed circuit board 30. The keyboard K is provided with standoffs 20ST and the printed circuit board 30 is secured thereto by means of fasteners 31; see FIG. 4. The printed circuit board 30 mounts the light signalling devices, digital display, microprocessor and associated electronics as will be made more evident hereinafter.

Figure 5:
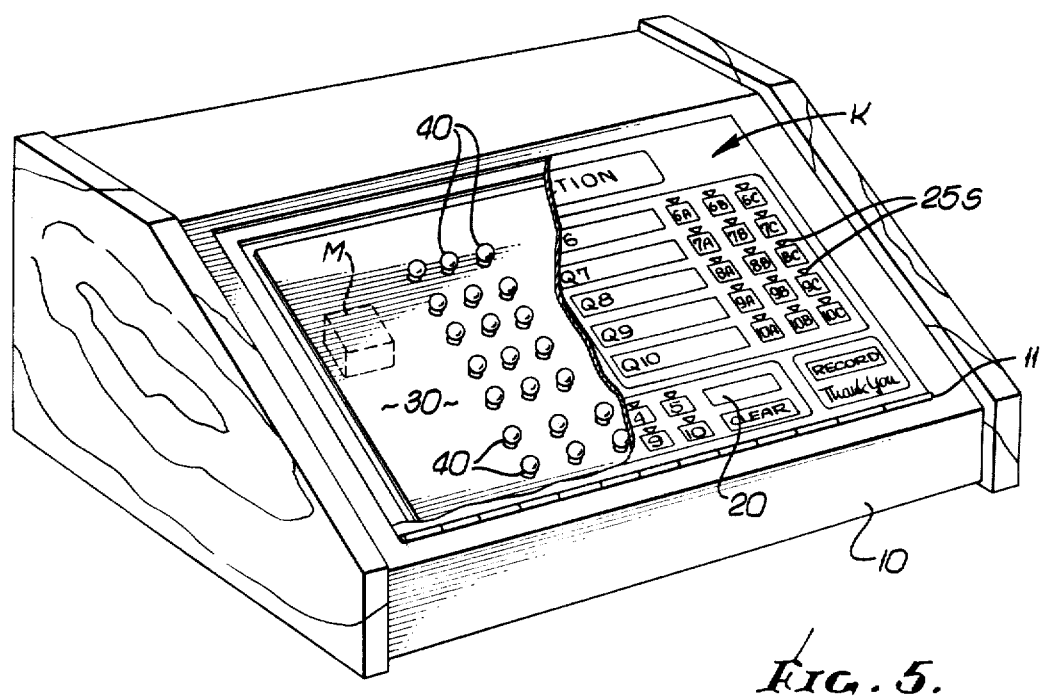
FIG. 5 is a perspective view of the customer satisfaction terminal as illustrated in FIG. 1 with a portion of the keyboard broken away to expose the interior construction thereof.

At this point, it should be noted that the top layer of the keyboard, or the layer 25, is provided with a signalling area in the form of a small triangle adjacent each of the "keys" on the face of the keyboard for signalling that a particular answer to a question or a key has been operated. The signalling area is identified in FIGS. 1, 2 and 5 as the area 25S. Each of the areas 25S are arranged in alignment with a light source which may be in the form of a light emitting diode 40 for signalling the actuation of a "key" of the keyboard K. The light emitting diodes 40 are mounted on the printed circuit board 30 in alignment with the apertures provided for a substrate layer (not shown) for the keyboard K. In this fashion, the energization of a light emitting diode 40 on the printed circuit board 30 will cause the light rays therefrom to be channeled through a substrate aperture and then through the top layer 25 so as to illuminate the signalling area 25S. In the same fashion, a light emitting diode (not illustrated) is mounted on the printed circuit board 30 so as to signal that the "ON" switch has been operated for visually indicating that the power supply has been switched on after the "ON" switch is operated. Similarly, for the "THANK YOU" area on the layer 25, an incandescent lamp (not shown) is mounted on the printed circuit board 30 so that when the lamp is energized, the "THANK YOU" message will be illuminated. In accordance with the aforementioned format for the top layer 25 of the keyboard K, there is mounted on the printed circuit board 30, 41 light emitting diodes for each of the answer "keys" on the layer 25 and the "ON" key. An incandescent lamp is also mounted on the printed circuit board 30 to backlight the "THANK YOU" message. The printed circuit board 30 also mounts a five digit, seven segment display 20 for displaying numeric and alphabetic data on the face of the keyboard K at the area on the layer 25 identified as the display area 20. The substrate layer is defined with an aperture (not shown) aligned with the five digit, seven segment display on the printed circuit board 30 to be visible at the area 20 on the layer 25. Similarly, an aperture (not shown) is provided on the substrate layer of the keyboard K in alignment with the lamp on the printed circuit board to backlight the "THANK YOU" message on the layer 25 of the keyboard K. The above description of the keyboard K is deemed sufficient for the purposes of the present invention but a more detailed description of the keyboard per se may be had by reference to the corresponding application bearing Ser. No. 05/969,343, now abandoned and assigned to the same assignee as the present application. The disclosure of the aforementioned copending application is incorporated herein by reference.

Figure 3:
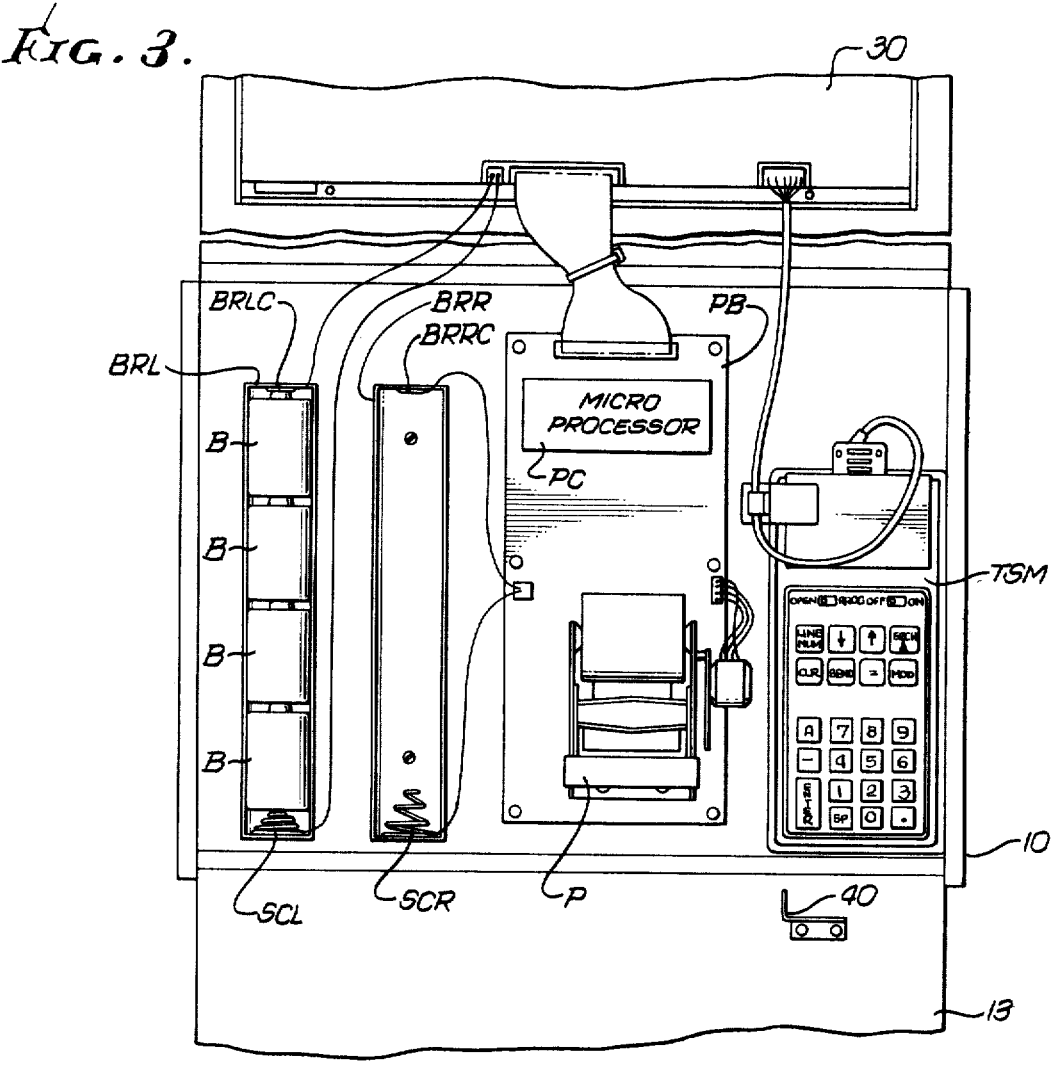
FIG. 3 is a cross-sectional view of the customer satisfaction terminal taken along the line 3—3 of FIG. 1.
Figure 6:
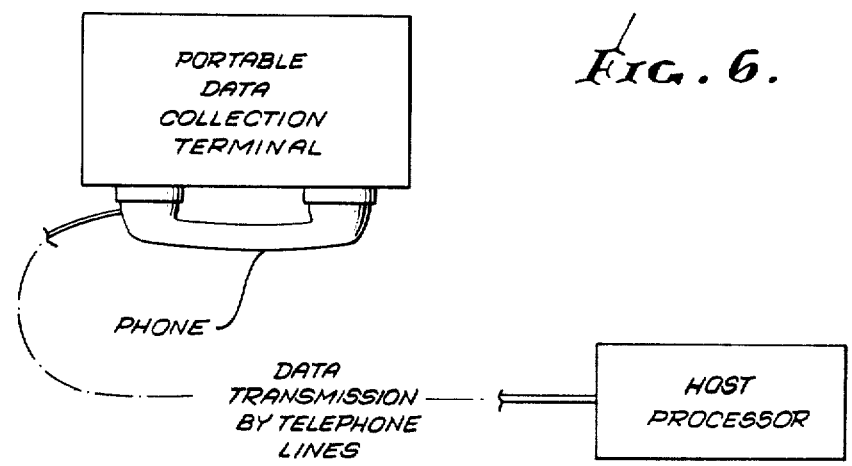
FIG. 6 is a diagrammatic illustration of the arrangement of the portable data collection terminal with a telephone handset for transmitting information to a host processor.
Figure 4:
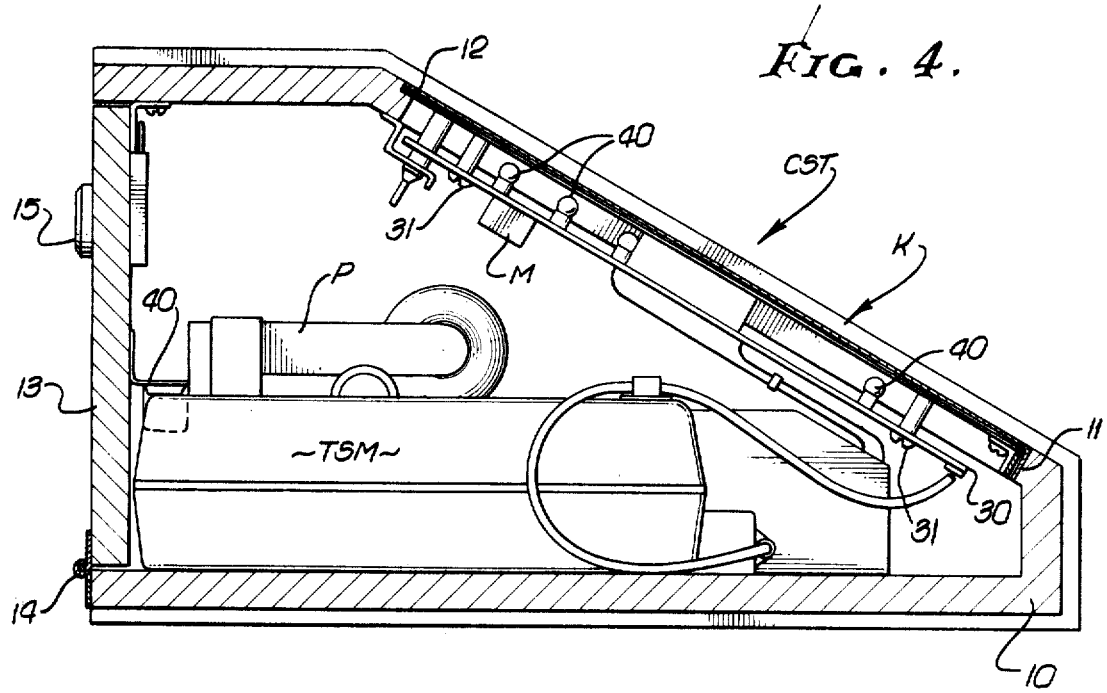
FIG. 4 is a cross-sectional view of the customer satisfaction terminal taken along the lines 4—4 of FIG. 1.

The customer satisfaction terminal CST is constructed and defined to be portable so that it can be readily moved from one location to another location in the service facility for collecting data at various locations. To this end, it is preferable that the terminal CST be battery operated. The inside of the housing 10 for the terminal CST is accessible by unlocking the door 13. The inside of the housing 10 has mounted therein a data collection and communications module TSM on one side thereof, the right hand side as illustrated in FIG. 3. A small printer P is mounted on a printed circuit board PB adjacent the data collection module TSM. At the left hand side of the housing 10 there is mounted two battery retaining receptacles BRL and BRR for mounting four small batteries in each receptacle. The right hand receptacle BRR is illustrated with the batteries removed therefrom while the left hand receptacle BRL is illustrated with four batteries mounted therein. The receptacles BRR and BRL are of conventional construction for mounting batteries in series circuit relationship and are provided with an electrical contact at each end in the fashion of a flashlight battery assembly. One electrical contact is in the form of a spring contact for yieldably engaging the flat side of a battery as illustrated for the BRL receptacle. The opposite polarity contacts are identified as the contacts BRLC and BRRC for the receptacles BRL and BRR, respectively. These latter contacts are fixed contacts. The eight batteries power the customer satisfaction terminal CST including the data collection module TSM and the Printer P. The Printer P is controlled by a single "chip" microprocessor which is mounted on a printed circuit board PB. The printer P may be any commercially available printer and a conventional commercially available thermal-printer has been employed. The Printer P is utilized to print out reports of the data collected by the terminal CST as will be explained more fully hereinafter. The TSM module is removably mounted within the housing 10. The principal characteristic of the TSM module is that it has a memory for accepting the data collected and stored in the terminal CST and the ability to convert the data stored in the memory to acoustic data pulses to permit the collected data to be transmitted by means of the conventional telephone lines to a remote point. The TSM module as illustrated may be a commercially available data collection terminal of the type manufactured by MSI Data Corporation of Costa Mesa, California. The MSI-77 model data collection terminal is illustrated in FIG. 3 and possesses the required structural characteristics for acquiring and storing the data from the terminal CST and transmitting it to a remote point. The data collection module TSM is held in position inside the housing 10 by means of a bracket 40 secured to the inside surface of the door 13, See FIG. 4. When the door 13 is in an open position, as illustrated in FIG. 3, the module TSM may be readily removed and disconnected from the terminal CST for transmitting the collected information. Once the module TSM is mounted and electrically connected to the terminal CST it may be secured in position when the door 13 is closed by the bracket 40 holding it in position as best illustrated in FIG. 4. Once the data is collected in the TSM module from the customer satisfaction terminal CST, the module TSM may be removed and carried to a conventional telephone for transmitting data to a host processor. The module TMS is also battery operated and will retain the data in memory once it is removed from the terminal CST. The module TSM is provided with an acoustic coupler which will allow it to mount a conventional telephone hand set whereby the acoustic pulses provided by the module will be transmitted over the telephone lines to the host processor. The host processor is generally located at a remote data processing facility for processing the data collected by the CST terminal; (FIG. 6).

The customer satisfaction terminal CST is provided with an electronic controller in the form of a single "chip" microprocessor. The microprocessor may be a commercially available processor as manufactured by Intel Corporation of Santa Clara, California. The Model 8748 Intel microprocessor has been incorporated as the electronic controller into the terminal CST. The same type of a single "chip" microprocessor is utilized for controlling the printer P. The printer P and the controller for the terminal CST are separate processors and are dedicated to their particular function. FIG. 7 is a block diagram of the conventional structure of the microprocessor Model 8748, as manufactured by Intel Corporation. The circuit operation of the controller is principally based on the structural organization of FIG. 7 with some additional components as will be explained hereinafter. The microprocessor for the terminal CST proper is mounted on a printed circuit board 30 associated with the keyboard K.

MODE SELECTION

The customer satisfaction terminal CST is defined to operate in two modes. One mode is identified as the "operate" mode, while the other mode is known as the "parameter" mode. For this purpose the printed circuit board 30 mounts a mode select switch M on the opposite side of the printed circuit board 30 from the light emitting diodes 40, as illustrated in FIG. 4. The switch M is a two position switch and in one position the "operate" mode is selected while in the other position the "parameter mode" is selected. In the normal use of the terminal CST the mode select switch M is not available to the user of the terminal. As in the instance for removing and replacing the inserts for the keyboard K, the keyboard must be swung out from the front face of the terminal to expose the mode switch M to change the mode of operation of the terminal CST. This is controlled so that only the establishment can operate the mode select switch M to the "parameter" position.

OPERATE MODE

In the operate mode, the terminal CST performs the following functions. The keyboard is scanned to acquire the answer data to the questions one through eleven and to display the selected responses as they are keyed in. In addition, during the operate mode the selected answers may be recorded in a permanent memory. The answers are permanently recorded by incrementing tally counters according to the acquired answers from the keyboard to count up the number of times each individual answer has been selected for valid operations of the terminal. The parameter values stored in the terminal are utilized to program the terminal for various functions. During this same interval, answers to selected questions can be correlated. In addition, the data responses that have been acquired may be transmitted to and stored in the data collection module TSM.

PARAMETER MODE

In the "parameter" mode the terminal CST will perform the keyboard scan and display refresh function as in the "operate" mode to allow the parameter values stored in the permanent memory to be examined, modified and to allow selection of different functions to be performed by the terminal. These functions include a display, print out, header and clear functions. These will be explained in more detail hereinafter.

MAIN CONTROLLER—MICROPROCESSOR AND PERMANENT MEMORY

The microprocessor or the main controller as illustrated in FIG. 7 is the commercially available microcomputer which contains a read only memory (ROM) for program storage, translation tables and other fixed type data, a random access (RAM) buffer memory for storing intermediate variable type data, and various registers and flip-flop indicators which can be used for performing arithmetic counting, timing and other types of mathematical, logical and binary bit manipulation functions. These elements are utilized in the description of the customer satisfaction terminal-CST. The items that are external to the controller will be identified as the description of the invention develops.

As is well known to those conversant with microprocessors, the microprocessor is capable of outputting and inputting signals and can initiate signals, time them and stop them and in this manner the controller may be employed to generate and time the majority of signals that operate the CST terminal. These functions perform in the same fashion as prior art logical circuits implemented in hardware fashion by proper programming of the elements of the microprocessor. The microprocessor can monitor the logic level of the various input signals to provide sensing of switch closures, electrical events, etc., as is well known.

Figure 8:
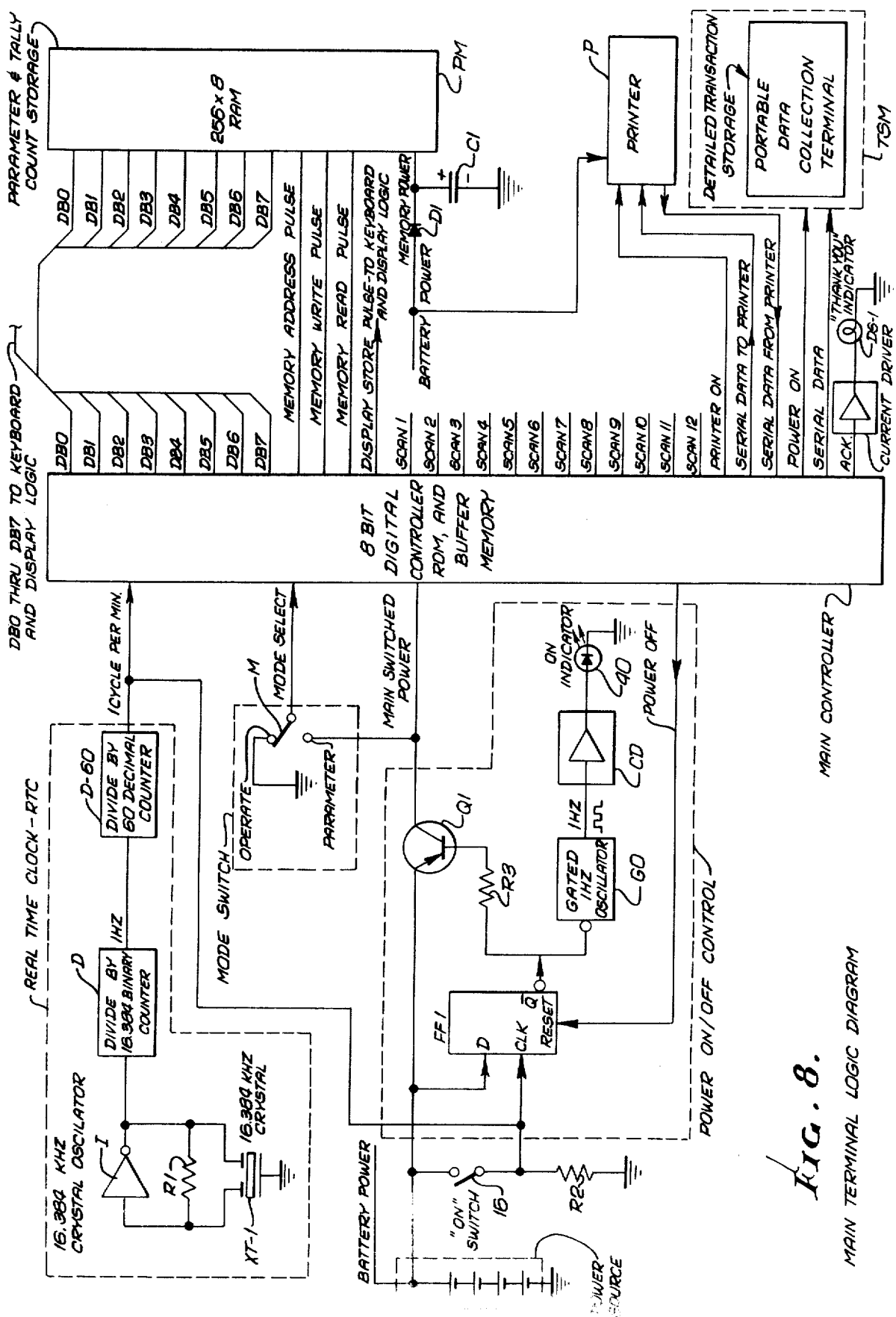
FIG. 8 is a logic diagram of the control network for the customer satisfaction terminal of FIG. 1.

In addition to the microprocessor MC an external memory or permanent memory PM, illustrated in FIG. 8, is utilized. The permanent memory PM is a random access permanent memory, RAM, arranged in a 256×8 bit storage capacity and is utilized for the permanent storage of the answers collected and stored in the microprocessor MC. The communications between the microprocessor MC and the permanent memory PM or the RAM is by means of the data bus lines which are identified as the lines DB0 through DB7. These data bus lines are used to communicate both as input and output lines to provide the desired electrical interface between the controller or microprocessor MC and the permanent memory PM.

Figure 9:
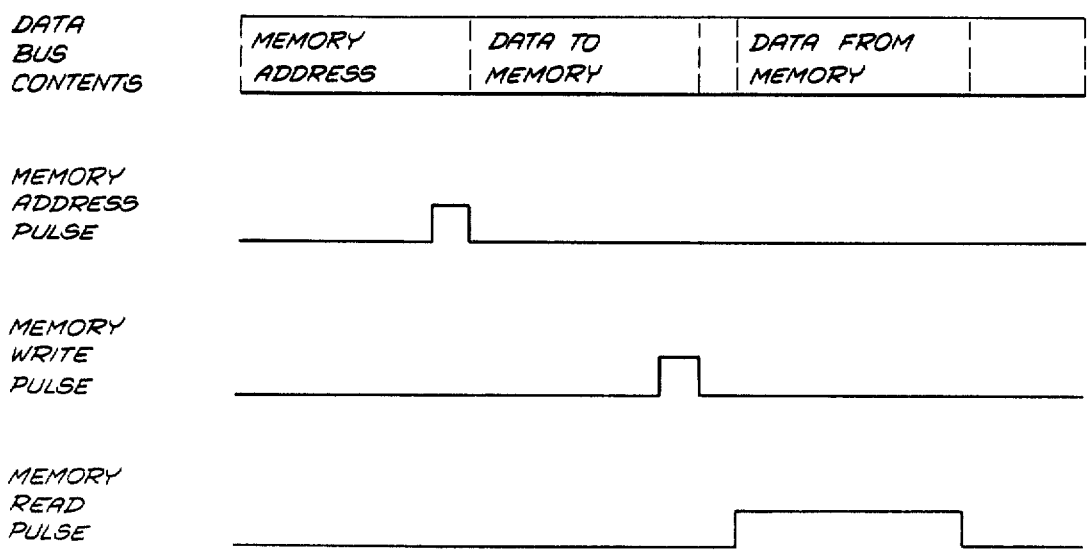
FIG. 9 is a graphical illustration of the read/write timing diagram for the permanent memory of the control network of FIG. 8.

The permanent storage element PM may be in the form of a commercial low power CMOS random access memory RAM organized as a 256, 8 bit words (bytes). The permanent memory PM stores the values of the parameters, answer bit tally counts and the time of day, etc. increments therein. In the operation and coaction between the main controller MC and the permanent memory PM, the permanent memory or RAM may receive address information from the controller that selects one specific byte or word out of the 256 words stored therein. At that selected address the memory either will store a new piece of information that has been generated by the controller by means of a write operation or a read operation will be called for in which event a word will be derived from the memory PM as a result of a previously stored piece of information and will be transmitted back to the main controller MC. The timing of the read/write operations are illustrated in FIG. 9. The address and data information transfers are effected by means of the DB0 through DB7 lines while the specific address, read and write pulses are handled on separate transmission lines as is evident from examining FIGS. 8 and 9.

To better appreciate the transfer of information between the permanent memory PM or the RAM and the main controller MC an examination of the timing signals illustrated in FIG. 9 for reading and writing into the RAM is in order. For a readout operation, the main controller will first provide an output signal which represents the desired address of the information to be obtained from the permanent memory. This address information is placed on the data bus. The address will be obtained from the read only memory of the controller MC or one of the buffer registers from the controller (FIG. 7). After the address signal is generated from the controller MC, the controller applies a memory address pulse to the memory PM to cause the memory elements within the memory PM to retain the address information from the controller and in turn seek out and read out the addressed piece of information.

Similarly, when information is to be written in or stored in the memory PM the main controller removes the address information from the data bus and provides an output signal of the new data information and then sends a memory write pulse to the memory PM causing it to store the data previously placed on the data bus. If the information is to be read from the memory PM, the controller outputs a memory read signal following the address signal which causes the memory PM to read out the selected information back to the controller MC. The signal lines that interface the main controller MC and the memory PM are illustrated in FIG. 8 and should be considered in conjunction with FIG. 9.

The logic diagram for the main terminal as illustrated in FIG. 8 will now be examined. The main controller MC is illustrated interfaced with the permanent memory PM through the eight lines DB0 through DB7. These same eight lines are also coupled to the keyboard and display logic matrixes which will be explained hereinafter. The main controller MC will output the memory address pulses, memory write pulses and memory read pulses to the memory PM on individual lines as described hereinabove. In addition, a display store pulse will be coupled to the keyboard and display logic matrix to be later explained. The keyboard scan signals are identified as scan signals 1 through scan 12 and are also output from the main controller in a sequential fashion on individual lines. The main controller MC also will output a "printer on" signal on an individual line along with the "serial data to printer" signal while accepting "serial data from printer" on an individual line. A "power on" signal will be applied to the data collection terminal TSM from the controller MC. In addition, the "serial data" signal will be utilized to transfer data from the main controller MC to the collection module TSM. When the record operation is complete or all the required answers have been stored in the memory PM an "acknowledge" signal (ACK) is outputted from the controller MC so as to illuminate the "THANK YOU" area on the face of the keyboard K. This "acknowledge" signal is applied by means of a current driver to an incandescent lamp, identified as a lamp DS1 in FIG. 8.

The main controller MC will also accept signals from a real time clock RTC. The real time clock RTC will provide an output signal at the rate of one cycle per minute. The RTC clock signal will be accepted by the main controller MC and transferred for storage in the permanent memory PM. The real time clock circuit RTC comprises a quartz crystal selected to operate at 16.384 kilohertz. The crystal XT-1 is arranged with a crystal oscillator inverter I for providing the 16.384 kilohertz signal. The inverter I and the crystal are arranged in parallel circuit relationship with a resistor R1 coupled in parallel therewith. The output signal from the crystal oscillator is applied to a divider circuit D to divide the input signal by 16,384 and therefore provide a one hertz output signal. A further divide network D60 is coupled to receive the one hertz signal and divide it by 60 to provide the one cycle per minute output signal directly applied to the controller MC.

The battery power source is illustrated on the left hand side of FIG. 8. The "on" or power switch 16 is coupled in parallel across the batteries along with a dropping resistor R2 to ground. The top terminal of the switch 16 is coupled to the positive terminal of the battery power source while the opposite terminal is connected to ground by means of the dropping resistor R2. The switch 16 is shown in its normally open circuit condition. The battery circuit is connected with the power on/off control network. The network includes a flip-flop, identified as the flip-flop FF1. The flip-flop FF1 has a D input and clock input terminal and a $\bar{Q}$ output terminal as well as a reset input terminal. The D input to the flip-flop FF1 is coupled to the positive terminal of the power source or battery. The clock input (CLK) is coupled directly to the output of the D60 divider for coupling the one cycle per minute signal to the clock input of flip-flop FF1. The reset input is responsive to a "Power Off" signal supplied by the main controller MC. The $\bar{Q}$ output signal is connected to the base electrode of the switching transistor Q1 through a resistor R3. The emitter electrode of the transistor Q1 is connected in common with the D input of the flip-flop FF1 to the positive terminal of the power source. The collector electrode of transistor Q1 is connected directly into the main controller MC as the "main switched power" signal. The $\bar{Q}$ is also connected to a gated one hertz oscillator identified as GO. The one hertz output signal from the oscillator GO is applied to the current driver CD for powering the "on" visual indicator associated with the "on" key, or key 16, on the front of the keyboard K. The "on" indicator is a light emitting diode 40 having its anode electrode connected to the current driver CD and its cathode electrode connected to ground.

The remaining portion of the logic diagram of FIG. 8 illustrates the mode select switch M. The fixed contact for the movable arm of the switch M is connected to the mode select input to the main controller MC. One position of the switch M is connected to the operate terminal which is connected directly to ground. The parameter position of the mode select switch M has a terminal connected to the "main switched power line" to the controller MC.

The "battery power" or the positive output from the power source is also connected to the permanent memory PM through a diode D1 and a parallel capacitor C1 to maintain the power on the element PM for a preselected interval. The power supply from the battery is supplied through the diode D1 to the memory PM and accordingly the battery power charges the capacitor C1. In the event that the batteries B are removed from the terminal CST, the diode D1 will maintain the charge accumulated on the capacitor C1 isolated from the battery and accordingly the energy stored in the capacitor will allow the memory PM to be powered for a sufficient interval until the batteries are replaced.

With the logic diagram of FIG. 8 in mind it will be noted that the battery power is applied to the controller MC by operating the "on" key 16 on the keyboard K. Operating the "on" key 16 will apply a high level voltage signal from the power source to the clock terminal of the input flip-flop FF1 which is normally maintained in the low voltage condition by the dropping resistor R2. The flip-flop FF1 is a D type flip-flop and the high level clock input signal causes it to go to the "set" state and produce an output signal at the $\bar{Q}$ output terminal having a low level voltage state. The low level $\bar{Q}$ output signal is applied to the gated oscillator GO and causes it to start operation. The operation of the oscillator GO applies a one hertz square wave output signal to the current driver CD and thereby to the light emitting diode 40 or "on" indicator 40. With this circuit operation the on indicator 40, which is physically arranged adjacent the "on" key 16 on the keyboard K, as illustrated in FIG. 1, will "blink" on and off at the one hertz rate. This blinking indicator 40 provides the visual signal to the user of the terminal CST to indicate that the terminal is operative.

The $\bar{Q}$ output signal from flip-flop FF1 is also applied to the base electrode of the switching transistor Q1 through the resistor R3. This low level voltage signal causes the transistor Q1 to be rendered conductive to a current saturation condition and apply the battery power to the main controller MC as the "main switched power" signal, FIG. 8, and thereby actuate the main controller MC. The customer satisfaction terminal CST is de-energized or powered off when the controller MC provides the high level output signal identified as the "power off" signal to the reset input terminal or the flip-flop FF1. This will cause the flip-flop FF1 to be reset and the $\bar{Q}$ output to return to a high level state to remove the battery power from the controller MC.

To conserve the energy of the battery, the terminal CST is powered off whenever the terminal is not being used. Once the terminal CST is powered on, it will automatically power itself off if no keying activity is detected for a preselected time interval such as forty-five seconds. The controller MC functions as a timer in response to the power being turned on and/or a key being operated to provide a "power off" signal to the flip-flop FF1 and remove power from the terminal only after 45 seconds have elapsed without any keyboard activity.

TABLE I

Figure 17:
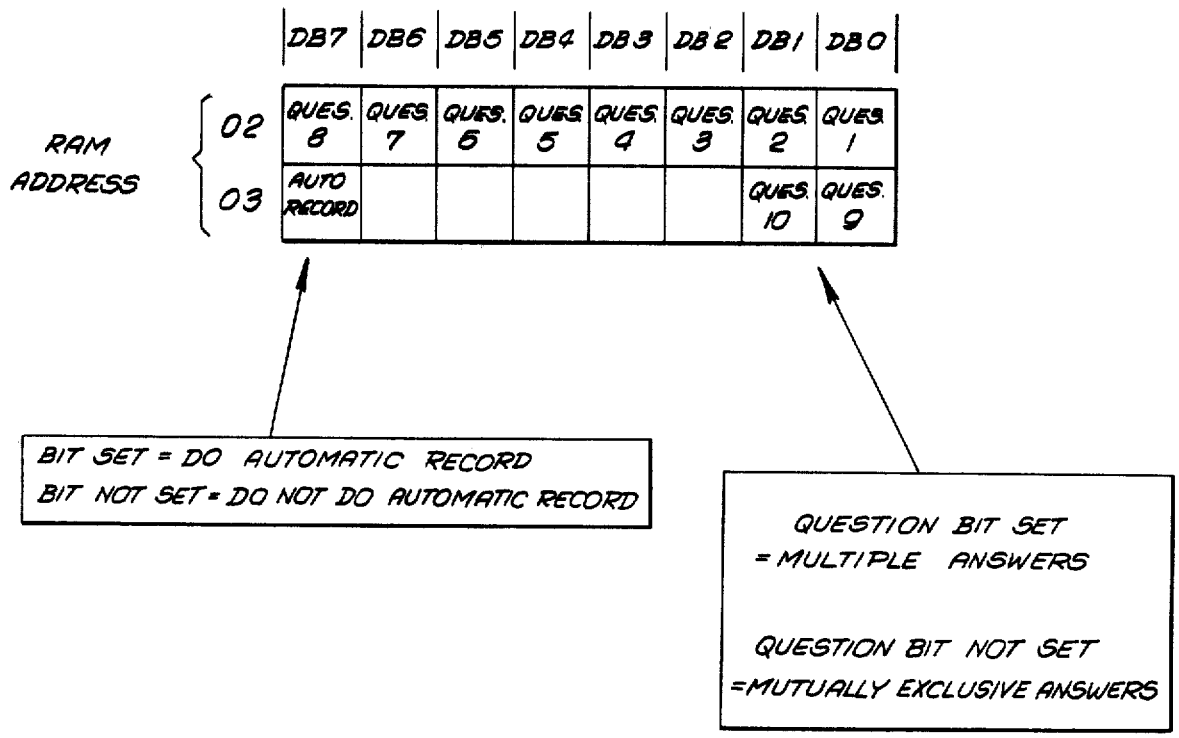
FIG. 17 is a diagrammatic representation of information stored in the permanent memory for defining multiple or single answer questions on the customer satisfaction keyboard.

| Hexadecimal Address | Function | Description | Data Format |
|---|---|---|---|
| 00, 01 | Not used | | |
| 02, 03 | Parameter No. 1 | Identifies which questions have multiple answers, selects power off record option | See FIG. 17 |
| 04, 05 | Parameter No. 2 | First 4 digits of property I.D. number | 4 Digit Packed BCD |
| 06, 07 | Parameter No. 3 | Second 4 digits of property I.D. Number | 4 Digit Packed BCD |
| 08, 09 | Parameter No. 4 | Terminal location I.D. Number | 4 Digit Packed BCD |
| OA, OB | Parameter No. 5 | Time-of-day | H10, H1, M10, M1, 4 Digit Packed BCD Time |
| OC, OD | Parameter No. 6 | Date | M10, M1, D10, D1, 4 Digit |

TABLE I-continued
RAM MAP

| Hexadecimal Address | Function | Description | Data Format |
|---|---|---|---|
| | | | Packed BCD Date |
| OE, OF | Parameter No. 7 | Question Set I.D. Number | 4 Digit Packed BCD |
| 10, 11 | Parameter No. 8 | Question No. 1 Master I.D. Number | 4 Digit Packed BCD |
| 12, 13 | Parameter No. 9 | Question No. 2 Master I.D. Number | 4 Digit Packed BCD |
| 14, 15 | Parameter No. 10 | Question No. 3 Master I.D. Number | 4 Digit Packed BCD |
| 16, 17 | Parameter No. 11 | Question No. 4 Master I.D. Number | 4 Digit Packed BCD |
| 18, 19 | Parameter No. 12 | Question No. 5 Master I.D. Number | 4 Digit Packed BCD |
| 1A, 1B | Parameter No. 13 | Question No. 6 Master I.D. Number | 4 Digit Packed BCD |
| 1C, 1D | Parameter No. 14 | Question No. 7 Master I.D. Number | 4 Digit Packed BCD |
| 1E, LF | Parameter No. 15 | Question No. 8 Master I.D. Number | 4 Digit Packed BCD |
| 20, 21 | Parameter No. 16 | Question No. 9 Master I.D. Number | 4 Digit Packed BCD |
| 22, 23 | Parameter No. 17 | Question No. 10 Master I.D. Number | 4 Digit Packed BCD |
| 24, 25 | Parameter No. 18 | Question No. 11 Master I.D. Number | 4 Digit Packed BCD |
| 26, 27 | Parameter No. 19 | Question No. for Key Question | 4 Digit Packed BCD, Only LSD & NLSD used for Question No. from 1 to 10. |
| 28, 29 | Parameter No. 20 | Question No. for Correlated Response No. 1 | 4 Digit Packed BCD, Only LSD & NLSD used for question No. from 1 to 10 |
| 2A, 2B | Parameter No. 21 | Question No. for Correlated Response No. 2 | 4 Digit Packed BCD, Only LSD & NLSD used for question No. from 1 to 10. |
| 2C, 2D | Parameter No. 22 | Question No. for Correlated Response No. 3 | 4 Digit Packed BCD, Only LSD & NLSD used for Question No. from 1 to 10 |
| 2E, 2F | Parameter No. 23 | Question No. for Correlated Response No. 4 | 4 Digit Packed BCD, Only LSD & NLSD used for Question No. from 1 to 10 |
| 30, 31 | Parameter No. 24 | Keystroke Lo-Limit and Hi-Limit values | 4 Digit Packed BCD, Lo-Limit is MSD and NMSD Hi-Limit is LSD and NLSD |
| 32, 33 | Parameter No. 25 | Lo-Limit Tally Counter | 4 Digit Packed BCD |
| 34, 35 | Parameter No. 26 | Hi-Limit Tally Counter | 4 Digit Packed BCD |
| 36, 37 | Parameter No. 27 | Printed Report No. 0 Report Printing Sequence | 4 Digit Packed BCD |
| 38, 39 | Parameter No. 28 | Detailed Data Sample Value and detailed data sample count. | 4 Digit Packed BCD, Sample value is LSD and NLSD, Sample Count is MSD and NMSD |
| 3A, 3B | Parameter No. 29 | Printed Report No. 4 Highest Question No. used | 4 Digit Packed BCD, Only LSD and NLSD used for Question No. from 1 to 10 |
| 3C, 3D | Parameter No. 30 | | 4 Digit Packed BCD |
| 3E, 3F | Parameter No. 31 | | 4 Digit Packed |

TABLE I-continued

RAM MAP

| Hexadecimal Address | Function | Description | Data Format |
|---|---|---|---|
| 40, 41 | Parameter No. 32 | | 4 Digit Packed BCD |
| 42, 43 | Parameter No. 33 | | 4 Digit Packed BCD |
| 44, 45 | Parameter No. 34 | | 4 Digit Packed BCD |
| 46, 47 | Parameter No. 35 | | 4 Digit Packed BCD |
| 48, 49 | Parameter No. 36 | | 4 Digit Packed BCD |
| 4A, 4B | Parameter No. 37 | | 4 Digit Packed BCD |
| 4C, 4D | Parameter No. 38 | | 4 Digit Packed BCD |
| 4E, 4F | Parameter No. 39 | | 4 Digit Packed BCD |
| 50, 51 | Not Used | | |
| 52, 53 | Not Used | | |
| 54, 55 | Not used | | |
| 56, 57 | Not used | | |
| 58, 59 | Tally Count | Answer No. 1A | 4 Digit Packed BCD |
| 5A, 5B | Tally Count | Answer No. 1B | 4 Digit Packed BCD |
| 5C, 5D | Tally Count | Answer No. 1C | 4 Digit Packed BCD |
| 5E, 5F | Tally Count | Answer No. 2A | 4 Digit Packed BCD |
| 60, 61 | Tally Count | Answer No. 2B | 4 Digit Packed BCD |
| 62, 63 | Tally Count | Answer No. 2C | 4 Digit Packed BCD |
| 64, 65 | Tally Count | Answer No. 3A | 4 Digit Packed BCD |
| 66, 67 | Tally Count | Answer No. 3B | 4 Digit Packed BCD |
| 68, 69 | Tally Count | Answer No. 3C | 4 Digit Packed BCD |
| 6A, 6B | Tally Count | Answer No. 4A | 4 Digit Packed BCD |
| 6C, 6D | Tally Count | Answer No. 4B | 4 Digit Packed BCD |
| 6E, 6F | Tally Count | Answer No. 4C | 4 Digit Packed BCD |
| 70, 71 | Tally Count | Answer No. 5A | 4 Digit Packed BCD |
| 72, 73 | Tally Count | Answer No. 5B | 4 Digit Packed BCD |
| 74, 75 | Tally Count | Answer 5C | 4 Digit Packed BCD |
| 76, 77 | Tally Count | Answer No. 6A | 4 Digit Packed BCD |
| 78, 79 | Tally Count | Answer No. 6B | 4 Digit Packed BCD |
| 7A, 7B | Tally Count | Answer No. 6C | 4 Digit Packed BCD |
| 7C, 7D | Tally Count | Answer No. 7A | 4 Digit Packed BCD |
| 7E, 7F | Tally Count | Answer No. 7B | 4 Digit Packed BCD |
| 80, 81 | Tally Count | Answer No. 7C | 4 Digit Packed BCD |
| 82, 83 | Tally Count | Answer No. 8A | 4 Digit Packed BCD |
| 84, 85 | Tally Count | Answer No. 8B | 4 Digit Packed BCD |
| 86, 87 | Tally Count | Answer No. 8C | 4 Digit Packed BCD |
| 88, 89 | Tally Count | Answer No. 9A | 4 Digit Packed BCD |
| 8A, 8B | Tally Count | Answer No. 9B | 4 Digit Packed BCD |
| 8C, 8D | Tally Count | Answer No. 9C | 4 Digit Packed BCD |
| 8E, 8F | Tally Count | Answer No. 10A | 4 Digit Packed BCD |
| 90, 91 | Tally Count | Answer No. 10B | 4 Digit Packed BCD |
| 92, 93 | Tally Count | Answer No. 10C | 4 Digit Packed |

TABLE I-continued
RAM MAP

| Hexadecimal Address | Function | Description | Data Format |
|---|---|---|---|
| 94, 95 | Tally Count | Answer No. 11-0 | BCD 4 Digit Packed BCD |
| 96, 97 | Tally Count | Answer No. 11-1 | 4 Digit Packed BCD |
| 98, 99 | Tally Count | Answer No. 11-2 | 4 Digit Packed BCD |
| 9A, 9B | Tally Count | Answer No. 11-3 | 4 Digit Packed BCD |
| 9C, 9D | Tally Count | Answer No. 11-4 | 4 Digit Packed BCD |
| 9E, 9F | Tally Count | Answer No. 11-5 | 4 Digit Packed BCD |
| A0, A1 | Tally Count | Answer No. 11-6 | 4 Digit Packed BCD |
| A2, A3 | Tally Count | Answer No. 11-7 | 4 Digit Packed BCD |
| A4, A5 | Tally Count | Answer No. 11-8 | 4 Digit Packed BCD |
| A6, A7 | Tally Count | Answer No. 11-9 | 4 Digit Packed BCD |
| A8, A9 | Tally Count | Tally count of all entries that passed the lo-limit and hi-limit checks | 4 Digit Packed BCD |
| AA, AB | Not Used | | |
| AC, AD | Not Used | | |
| AE, AF | Not Used | | |
| B0, B1 | Tally Count | Key question Answer A correlated response No. 1 Answer A | 4 Digit Packed BCD |
| B2, B3 | Tally Count | Key question Answer A correlated response No. 1 Answer B | 4 Digit Packed BCD |
| B4, B5 | Tally Count | Key question Answer A correlated response No. 1 Answer C | 4 Digit Packed BCD |
| B6, B7 | Tally Count | Key question Answer A correlated response No. 2 Answer A. | 4 Digit Packed BCD |
| B8, B9 | Tally Count | Key question Answer A correlated response 2 Answer B | 4 Digit Packed BCD |
| BA, BB | Tally Count | Key question Answer A correlated response No. 2 Answer C | 4 Digit Packed BCD |
| BC, BD | Tally Count | Key question Answer A correlated response No. 3 Answer A | 4 Digit Packed BCD |
| BE, BF | Tally Count | Key question Answer A correlated response No. 3 Answer B | 4 Digit Packed BCD |
| C0, C1 | Tally Count | Key question Answer A correlated response No. 3 Answer C | 4 Digit Packed BCD |
| C2, C3 | Tally Count | Key question Answer A correlated response No. 4 Answer A | 4 Digit Packed BCD |
| C4, C5 | Tally Count | Key question Answer A correlated response No. 4 Answer B | 4 Digit Packed BCD |
| C6, C7 | Tally Count | Key question Answer A correlated response No. 4 Answer C | 4 Digit Packed BCD |
| C8, C9 | Tally Count | Key question Answer B correlated response No. 1 Answer A | 4 Digit Packed BCD |
| CA, CB | Tally Count | Key question Answer B correlated response No. 1 Answer B | 4 Digit Packed BCD |
| CC, CD | Tally Count | Key question Answer B correlated response No. 1 Answer C | 4 Digit Packed BCD |
| CE, CF | Tally Count | Key question Answer B correlated response No. 2 Answer A | 4 Digit Packed BCD |
| D0, D1 | Tally Count | Key question Answer B correlated response No. 2 Answer B | 4 Digit Packed BCD |
| D2, D3 | Tally Count | Key question Answer B correlated | 4 Digit Packed BCD |

TABLE I-continued
RAM MAP

| Hexadecimal Address | Function | Description | Data Format |
|---|---|---|---|
| | | response No. 2 Answer C | |
| D4, D5 | Tally Count | Key question Answer B correlated response No. 1 Answer C | 4 Digit Packed BCD |
| D6, D7 | Tally Count | Key question Answer B correlated response No. 3 Answer B | 4 Digit Packed BCD |
| D8, D9 | Tally Count | Key question Answer B correlated response No. 3 Answer C | 4 Digit Packed BCD |
| DA, DB | Tally Count | Key question Answer B correlated response No. 4 Answer A | 4 Digit Packed BCD |
| DC, DD | Tally Count | Key question Answer B correlated response No. 4 Answer B | 4 Digit Packed BCD |
| DE, DF | Tally Count | Key question Answer B Correlated response No. 4 Answer C | 4 Digit Packed BCD |
| E0, E1 | Tally Count | Key question Answer C correlated response No. 1 Answer A | 4 Digit Packed BCD |
| E2, E3 | Tally Count | Key question Answer C correlated response No. 1 Answer B | 4 Digit Packed BCD |
| E4, E5 | Tally Count | Key question Answer C correlated response No. 1 Answer C. | 4 Digit Packed BCD |
| E6, E7 | Tally Count | Key question Answer C correlated response No. 2 Answer A. | 4 Digit Packed BCD |
| E8, E9 | Tally Count | Key question Answer C correlated response No. 2 Answer B | 4 Digit Packed BCD |
| EA, EB | Tally Count | Key question Answer C correlated response No. 2 Answer C | 4 Digit Packed BCD |
| EC, ED | Tally Count | Key question Answer C correlated response No. 3 Answer A | 4 Digit Packed BCD |
| EE, EF | Tally Count | Key question Answer C correlated response No. 3 Answer B | 4 Digit Packed BCD |
| F0, F1 | Tally Count | Key question Answer C correlated response No. 3 Answer C | 4 Digit Packed BCD |
| F2, F3 | Tally Count | Key question Answer C correlated response No. 4 Answer A | 4 Digit Packed BCD |
| F4, F5 | Tally Count | Key question Answer C correlated response No. 4 Answer B. | 4 Digit Packed BCD |
| F6, F7 | Tally Count | Key question Answer C correlated response No. 4 Answer C | 4 Digit Packed BCD |
| F8, F9 | Not Used | | |
| FA, FB | Not Used | | |
| FC, FD | Not Used | | |
| FE, FF | Not Used | | |

Table I is a map of the information stored in the permanent memory PM and shows the hexadecimal address of the information stored therein, the function of the stored data and the description of the function of the stored data and the format for the entire 256 bytes or words stored in the memory PM. It should be noted that in general two consecutive bytes in memory are used to store a parameter or tally count in a four digit packed binary coded decimal format as illustrated in FIG. 10. Each stored byte in the element PM is divided into two, four bit binary coded decimal characters located at memory address "A" and memory address "A+1". The controller MC will "unpack" the data stored in the memory PM when it is to be numerically displayed on the digital display 20 as will be explained hereinafter. The controller MC also "packs" the data that is displayed on the digital display 20 so that it can be stored into the permanent memory PM. FIG. 11 illustrates and relates the displayed digit position for each of the four binary coded digits stored in the permanent memory PM, as illustrated in FIG. 10.

As mentioned hereinabove, each of the "keys" for the keyboard K are arranged in a matrix of rows and columns. Questions one through ten are arranged with three individual keys representing individual multiple choice responses to a question. Question No. 11 is arranged with ten answer keys with the keys representing the digits 1-9, 0. The rows and colunns are arranged so that a column reads from top to bottom and the rows read from left to right. The keys representing answers 1A, 1B, 1C and 6A, 6B and 6C are arranged in the same column, while the keys representing the answers 1A, 2A, 3A, 4A, 5A and the numeric keys 1 and 6 are arranged in the same row. This row and column relationship corresponds to the layout of the keys illustrated in FIG. 1.

KEYBOARD SCAN AND DISPLAY REFRESH LOGIC

Figure 12A:
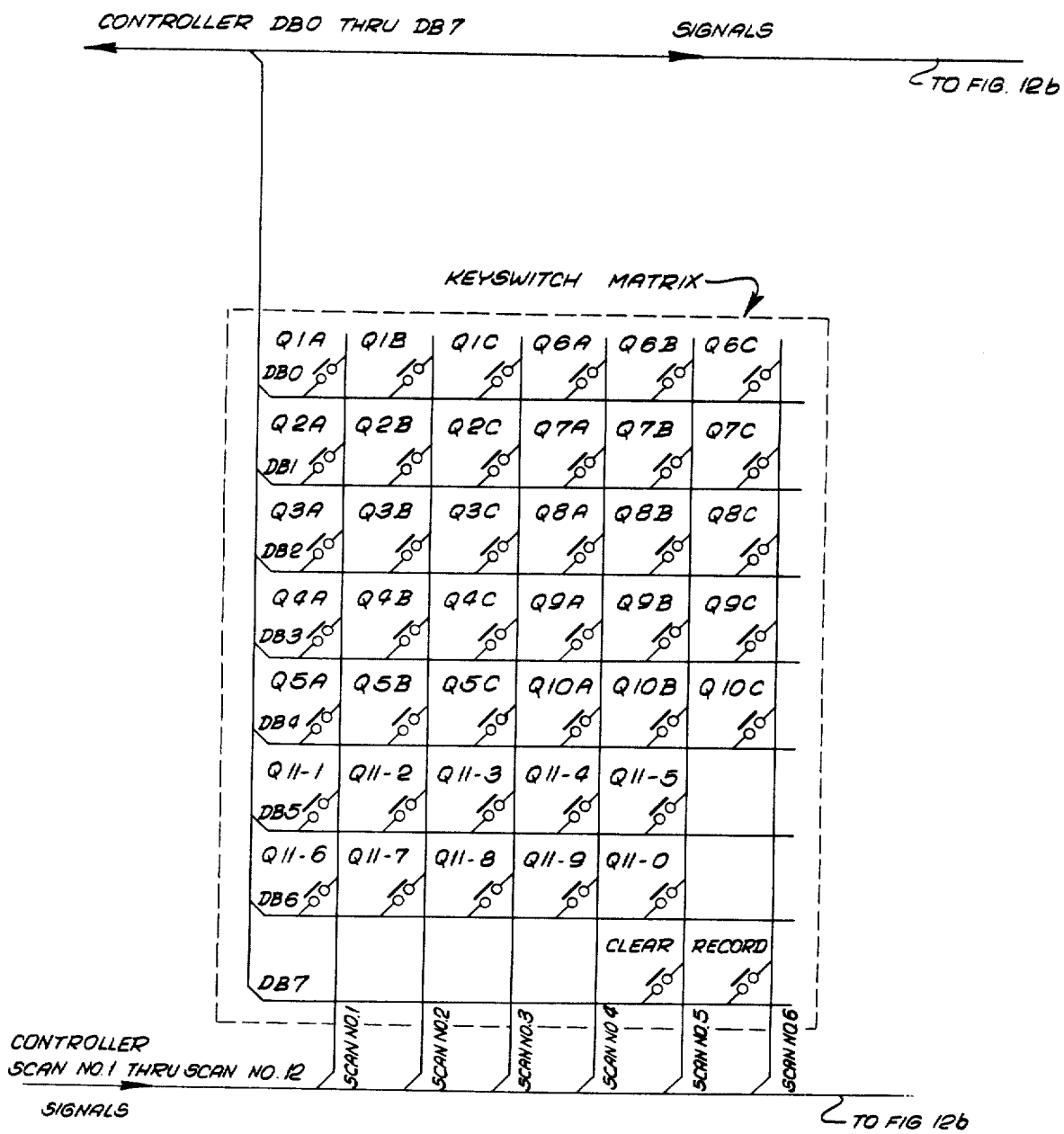
FIGS. 12a and 12b are schematic-logic diagrams of the key switch and light emitting diode matrixes for illustrating the keyboard scan and display refresh operations.

With this in mind the keyboard scan and display refresh logic diagram illustrated in FIG. 12 will be examined. FIG. 12 illustrates the key switch matrix arranged in rows and columns and the matrix of light emitting diodes 40 for the answer keys arranged side by side. The key switch matrix illustrates each "key" as an open circuited switch bridging a row line and a column line so that the operation of the "key" will place a row and a column line in electrical conducting relationship. The keys arranged in FIG. 12a in the same relationship as illustrated on the face of the keyboard K in FIG. 1 with the answer keys Q1A, 1B, 1C, and Q6A, 6B, 6C in the same column and the rows having the keys 1A, 2A, through Q11-6 in the same row as described hereinabove. The row lines for the key switch matrix are identified as the lines scan No. 1, scan No. 2 . . . through scan No. 6, reading from left to right on FIG. 12a. The column lines reading from the top to the bottom in FIG. 12a read as DB0, DB1 through DB7. In addition to the answer keys, the "clear" key is arranged in the lines between the scan No. 5 line and the DB7 line. Similarly, the "record" key is arranged between the scan No. 6 line and the DB7 line. Scan No. 1 through scan No. 6 row lines represent the scan signals that are derived from the main controller MC as described hereinabove. Accordingly upon the occurrence of a scan signal and the actuation of the "key" or switch, a scan output signal will be applied from the key switch matrix back to the controller MC through the operated key. For example, if Key 1A has been operated during scan No. 1 time, an output signal will appear on the DB0 line back to the main controller MC to signal the operation of key 1A. The same logic prevails for the other keys in the key switch matrix. The scan signals are sequentially outputted from the controller MC.

Figure 12B:
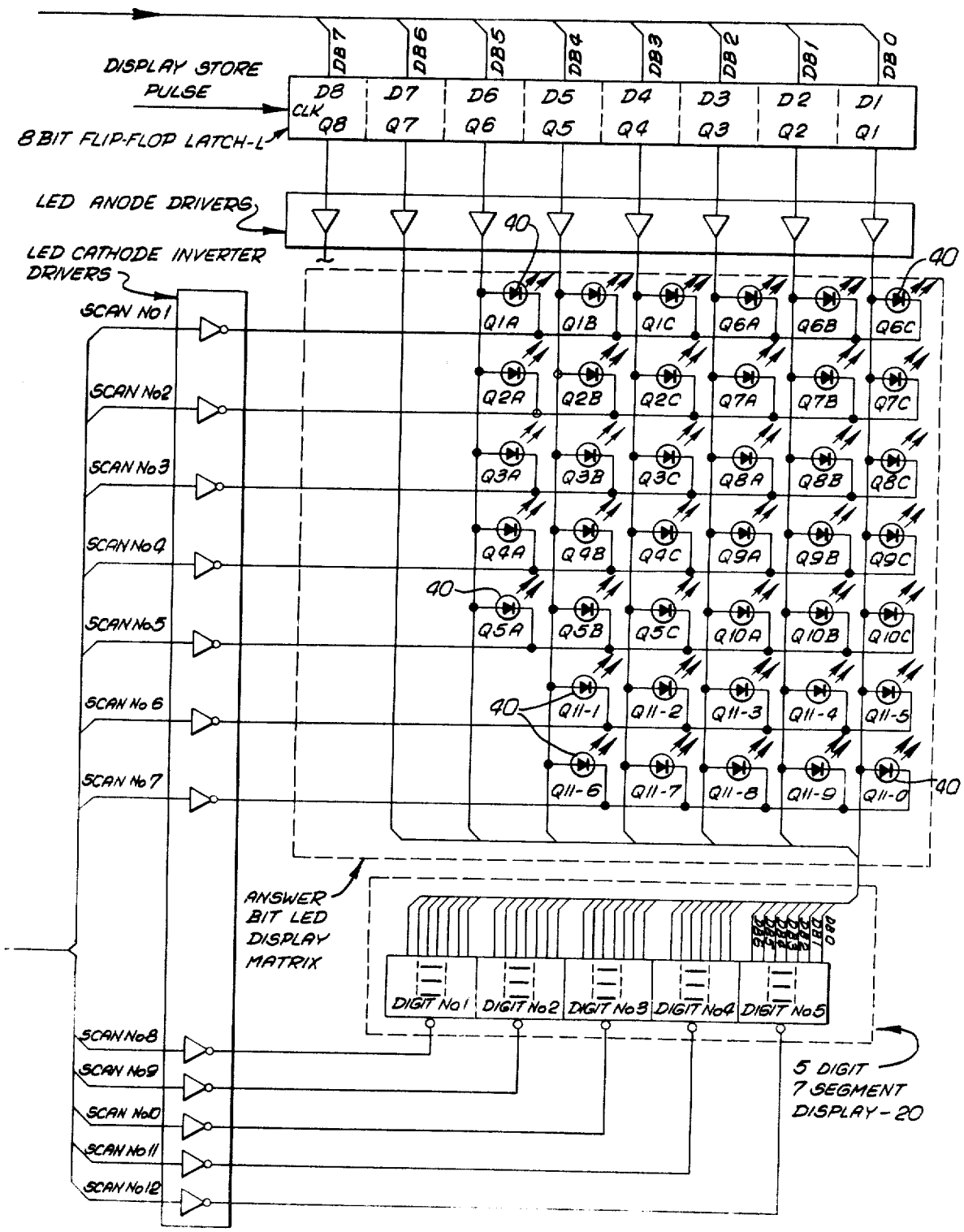

The matrix of light emitting diodes 40 arranged adjacent each key for visually signaling the operation of the key are arranged in the same row and column arrangement as the key switch matrix. Specifically the lights 40 for signaling operation of the keys 1A, 1B through 6C are arranged in the same column and are identified identically. The scan signals, in this instance, are applied to the individual columns of the light emitting diode matrix. For example, the scan No. 1 signal is coupled in parallel to a row of the key switch matrix and the uppermost column of the light matrix for providing a signal to the cathode electrodes of each of the light emitting diodes 40 arranged in the same column. Scan No. 2 through scan No. 7 signals are similarly coupled to the remaining columns of light emitting diodes 40. The operation of the clear and record keys are not signalled by means of the light emitting diodes 40 in the diode matrix of FIG. 12b. Each of the anode electrodes for the light emitting diodes 40 are arranged in rows to be actuated from the signal from the main controller MC. To this end the series of signals DB0 through DB7, reading from the right to the left in FIG. 12b are applied to an 8 bit flip-flop latch L. The flip-flop latch L is also coupled by means of a clock input terminal to a "display store" pulse derived from the main controller MC. The output signals from the flip-flop latch L are identified as the outputs Q1 through Q8, reading from right to left in FIG. 12b. These output signals are applied to individual anode drivers for the diodes 40. The individual anode drivers are coupled to each individual row of light emitting diodes 40 and connected directly to the anode electrodes of each diode 40 that is connected in the same row. For example, the DB0 signal from the controller MC will be applied to the flip-flop latch L at its D1 input terminal and provide a Q1 output signal. The Q1 output signal will be applied to the right hand row of diodes 40 simultaneously with the scan signals 1 through 7.

The scan No. 1 through No. 12 signals that are applied to the light emitting diode matrix are applied to the cathode electrodes of the diodes 40 by means of inverter circuits arranged in series with each of the scan lines as illustrated in FIG. 12b. These inverter drivers provide a low level return path for the groups of diodes 40 arranged in the same column of diodes. This same arrangement prevails for the scan signals 8 through 12 for the digital display 20. The anode signals for the diodes 40 are provided by the anode drivers which respond to the signals from the flip-flop latch L. The flip-flop latch L will store the signals DB0 through DB7 of the main controller MC and provide the signals to the drivers upon receipt of the display store pulse signal.

Figure 13:
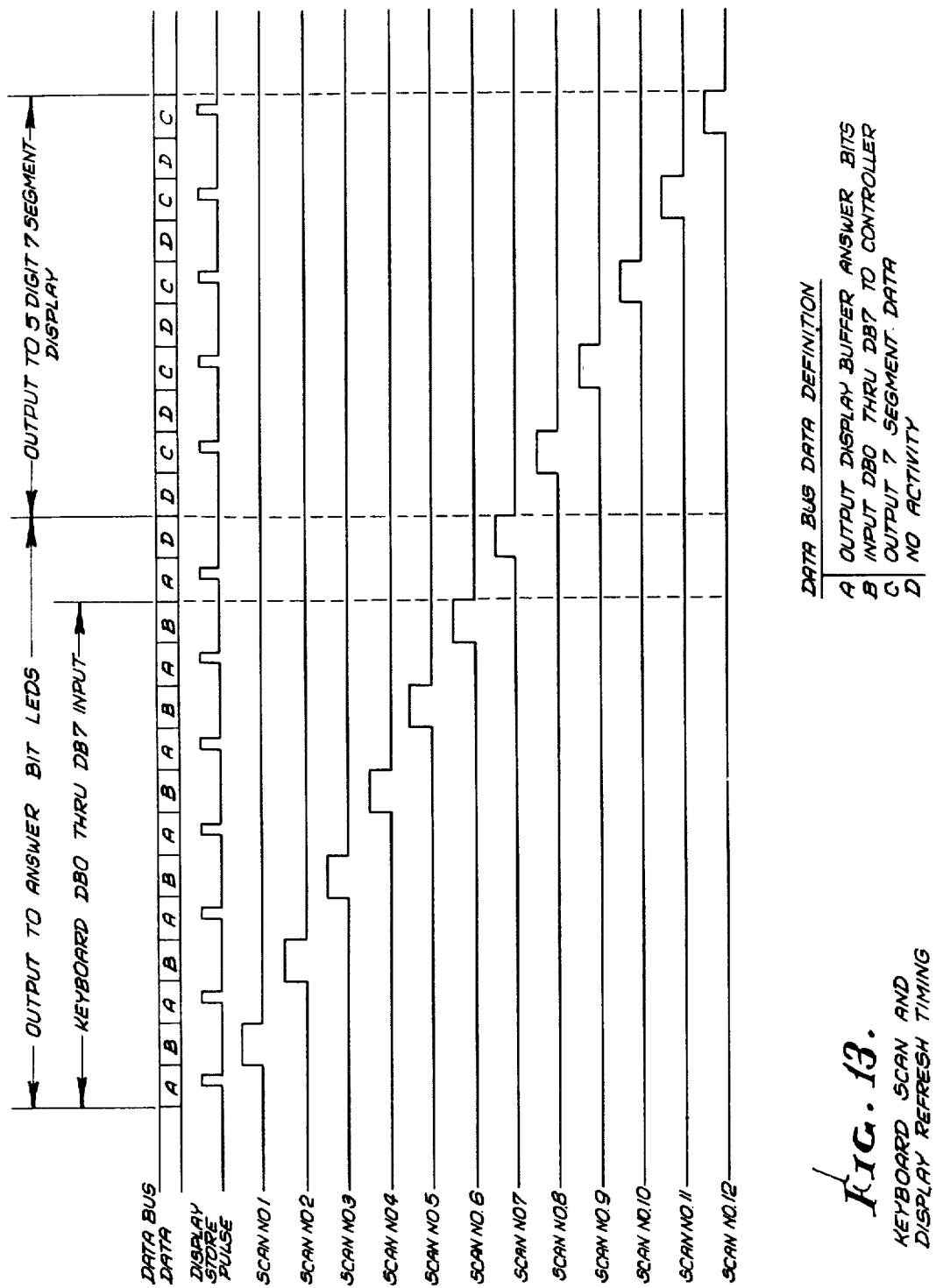
FIG. 13 is a graphical illustration of the signals outputed from the controller of FIG. 8 for the keyboard scan and display refresh timing utilized in FIGS. 12a and 12b.

The signals from the flip-flop latch L are also applied to the display 20 illustrated in the form of a five digit-seven segment display 20 in FIG. 12b for displaying the digits keyed in by operation of the numerical keys for question number 11. These signals are first translated to hexadecimal bits to actuate the desired segments of the seven segment figure 8 display, as will be explained hereinafter. This information is applied by means of the anode driver row lines to energize the segments while the particular digits are selected by means of the scan No. 8 through scan No. 12 signals from the main controller MC. The scan No. 8 signal is applied to the digit number 1 position of the display and scan No. 9 through 12, respectively, to digits 2 through 5. The simultaneous energization of the segments of the digit position and the individual scan signal will display the desired digit. The timing of the scan signals as outputted from the controller MC relative to the display store pulse and the data on the data bus is illustrated in FIG. 13.

Figure 14:
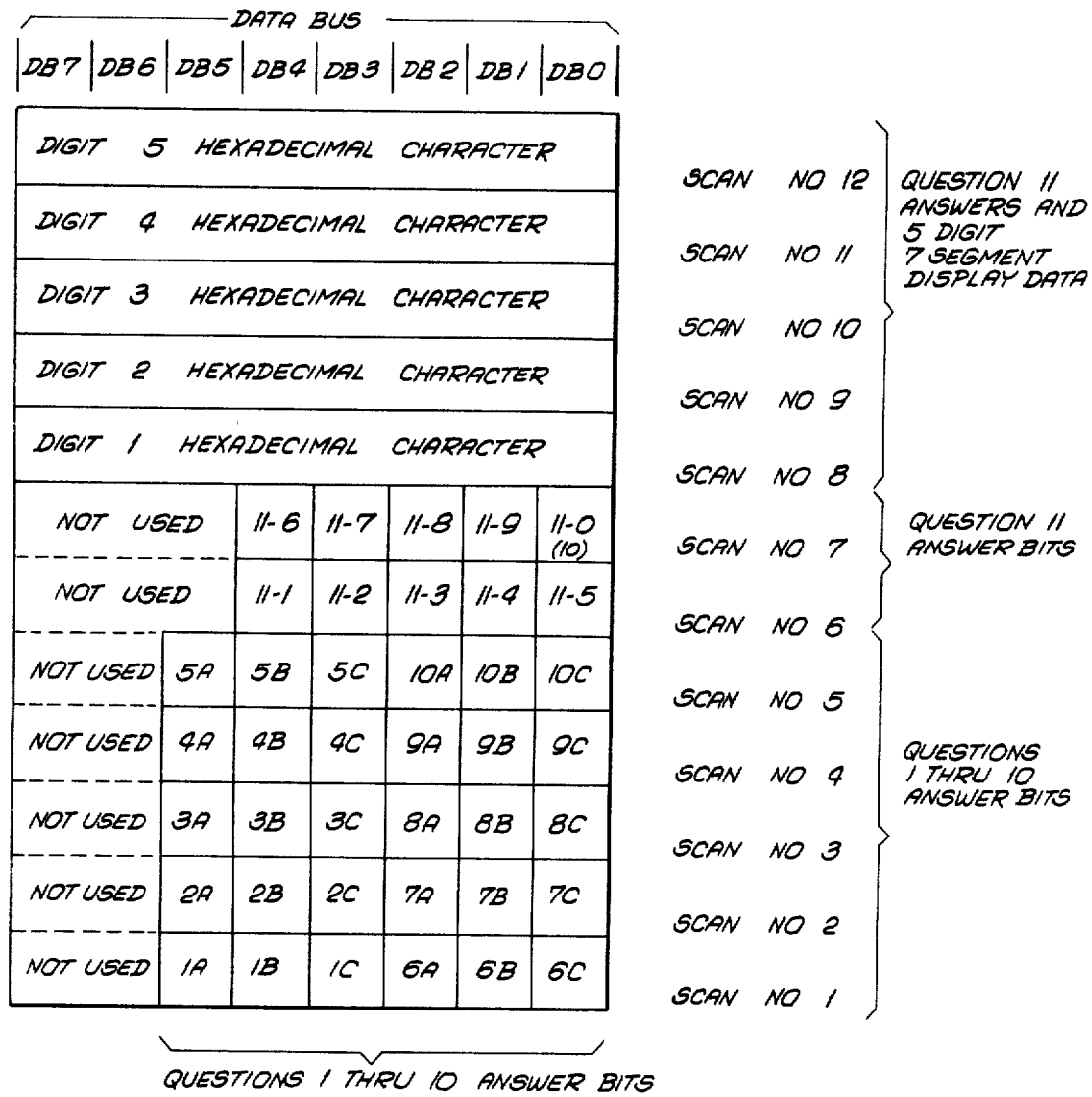
FIG. 14 is a diagrammatic illustration of the various memory positions in the display buffer memory for storing the answer data in the controller of FIG. 7 illustrated with the related scan number positions.

The signals that are derived from the key switch matrix are the signals outputted on the lines DB0 through DB7 in response to an operated key and are coupled to the main controller MC. These signals are stored in the "data store" identified in FIG. 7 of the controller MC block diagram. The data store identified in FIG. 7 is further identified as a temporary storage device or display buffer memory. This buffer memory is organized in a 64 word by 8 bit configuration as illustrated in FIG. 14. The answer bit signals are arranged in the same pattern in the display buffer memory as the key switch matrix as is evident from examining FIG. 14. For example, in the scan 1 position of the buffer memory, the answer bits for answers 1A, 1B through 6C are stored at the bottom column of the buffer memory. In the same sequence the 2A, 2B through 7C answer bits are available in the scan No. 2 position. The 1A, 2A, 3A—11-1, 11-6 answer bits are arranged in the same rows. The DB0-DB7 relationship of the answer bits is also illustrated in FIG. 14 and the scan number and DB number correspond identically to that of the key switch matrix for identifying the information stored in the buffer memory. For example, if during the scan No. 1 time, only the 1A key has been operated the data bus DB0-DB7 would carry the signals 00000100. When applied to the latch L this translates to a high output level signal at Q6 for energizing only the Q1A diode 40.

It should be noted that each of the positions of the buffer memory store a binary 0, except when a key has been operated in which event a binary 1 is stored at the position for the particular key. In addition to the answer bits for questions 1 through 11, the hexidecimal characters for digits one through five of the digital display are also stored in the buffer memory in the positions corresponding to the scan positions 8-12. This information is stored so that the hexadecimal signals for the segments of the figure 8 for each digit position of the digital display can be provided for displaying the selected numerical value. It should now be appreciated from examining FIG. 13 that a separate answer bit in the storage position is provided for each answer bit light emitting diode 40 associated with each of the eleven questions on the keyboard K while additional numeric data is provided for question No. 11 to operate the digital display 20. The readout contents of the display buffer memory is outputted to the associated data lines DB0 through DB7 in synchronism with the scan signals. The display buffer memory is a temporary storage device and the contents of the memory are lost when power is removed from the terminal CST. This is to be contrasted with the permanent memory PM which has battery power applied thereto at all times, as explained hereinabove.

Figure 15:
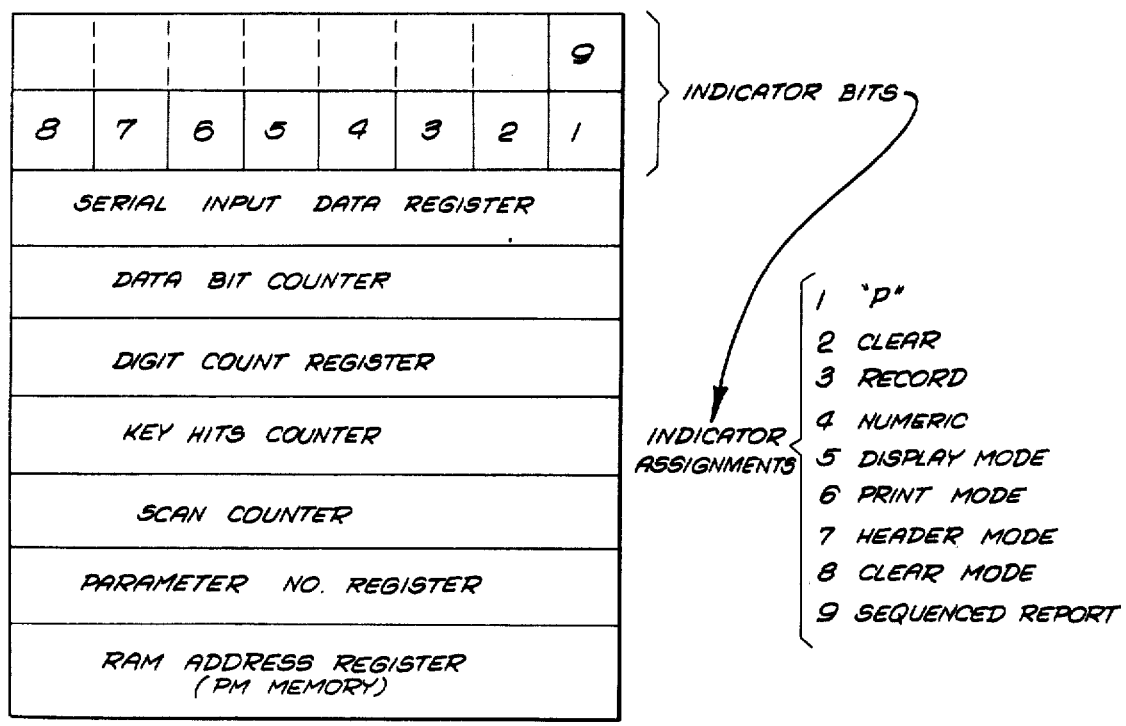
FIG. 15 is a diagrammatic representation of the controller registers for the controller of FIG. 7, identifying the various functions of each register for use in the customer satisfaction terminal.

Along with the display buffer memory, the registers identified as register 0 through 7 in FIG. 7 on the controller MC block diagram are utilized for various temporary storage purposes. FIG. 15 shows the arrangement of the aforementioned controller registers for the various functions. The functions of seven of the registers as illustrated in FIG. 15 reading from the bottom to the top are the PM memory address register for signalling the address in the memory PM. The next register in the stack is the parameter number register which identifies the particular parameter number to be displayed on the digital display 20. The next register in the stack is the scan counter register which keeps track of the scan number signals. The next register is identified as a key hits counter which counts up the counter for every time that a key is operated. The digit count register keeps count of the numeric digits keyed in or the operation of the keys associated with question No. 11. The data bit counter is the next register while the last one is the serial input register. The topmost register is identified as the indicator bits. Indicator bits are identified as the bits one through nine and reside in two register locations. Indicator bits one through eight reading from right to left in FIG. 15 are in one register while indicator bit nine is in the same digit position as indicator bit one in the topmost register of the stack. Indicator bit number one will display a P—or parameter thereby identifying that the number associated with the letter P is a parameter number. Indicator bit number two will indicate that the clear key has been operated. Number three indicator bit signals that the record key has been operated and number four that a numeric key has been operated. Indicator bits five through eight are used during the parameter mode of operation of the terminal CST for displaying the fact that the display mode, the print mode and the header mode and the clear mode are in operation. Number nine is used in the printing sequence for indicating a preselected sequence of a report printout.

FIG. 16 illustrates the flow chart for the keyboard scan and display refresh operations. It should be understood that the flow chart is organized in the conventional fashion for displaying the sequenced operations. To this end a rectangle contains an abbreviated statement of the operation or operations to be performed by the main controller MC. The diamond shaped symbol contains an abbreviated question concerning the logical decision to be made by the controller MC and in accordance with the decision follow either the "yes" or "no" branch of the chart. The use of this flow chart correlates to the use of logical block diagrams normally found in hardware design as should be evident to those skilled in the art.

Figure 18A:
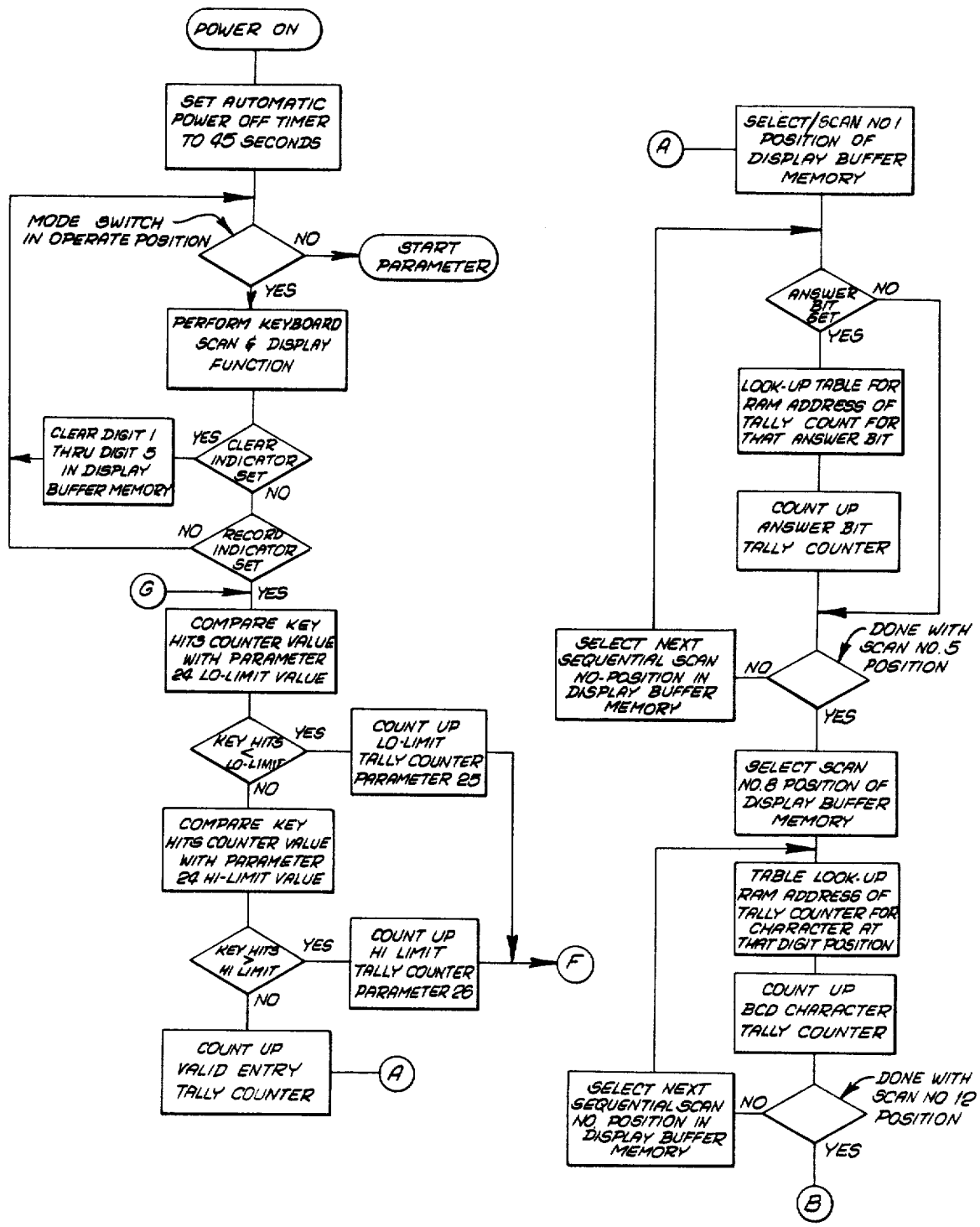
FIGS. 18a, 18b and 18c are flow charts of the power on and operate modes of the customer satisfaction terminal of FIG. 1.

Now referring specifically to FIG. 18a it will be noted that the first operation is the powering of the terminal CST by operating the "on" key to start the scan and display operation. It is assumed that the mode select switch at this time is in the operate position (see FIG. 16). Initially, the automatic turn-off timer is examined to determine if 45 second have elapsed since either the power was applied to the terminal CST or since a key on the keyboard has been operated. If 45 seconds has elapsed, the power is removed from the terminal and it is assumed for the present that 45 seconds has not elapsed. Since the 45 seconds have not elapsed, the logical decision signalled from the main controller MC provides a signal path by means of the "no" route of the diamond shaped symbol. This will cause the scan counter to be initialized to scan No. 1; see FIG. 16. After the scan counter has been initialized to the number one position, the answer bits in the buffer memory are examined and retrieved. During scan 1 time the buffer memory may store the answer bits for answers to the questions 1 and 6. The answer bit output signals will appear on the bus DB0 through DB7. If the terminal has just been turned on all the answer bits in the buffer memory will be zero so that all the bits for the signals DB0 through DB7 are zero and no light emitting diodes are operated. These DB0-DB7 signals will be stored in the eight bit flip-flop latch L as illustrated in FIG. 12. This will be followed by a store pulse to the latch L.

In the next sequence of operations noted in FIG. 16 the output signal from the scan counter, which in this instance is a 1, is tested to determine whether it is greater than 6 or less than 6. In this instance since it is less than 6 the output bits DB0–DB7 input to the controller MC from the key switch matrix are examined to determine if any key has been operated; see point c of FIG. 16. In the example where key 1A has been operated, the answer would be "yes" and so the key hits counter (FIG. 15) is counted up to indicate that a key has been operated, while the 45 second timer in the main controller MC is reset to start another 45 second time interval.

TABLE II

SCAN NO. DATA BUS SIGNAL TO KEY NUMBER TRANSLATE TABLE

| SCAN NO. | DATA BUS SIGNAL TERMINAL | | | | | | | |
|---|---|---|---|---|---|---|---|---|
| | DB0 | DB1 | DB2 | DB3 | DB4 | DB5 | DB6 | DB7 |
| SCAN NO. 1 | 1 | 2 | 3 | 4 | 5 | 6 | 7 | 8 |
| | Q1A | Q2A | Q3A | Q4A | Q5A | Q11-1 | Q11-6 | |
| SCAN NO. 2 | 9 | 10 | 11 | 12 | 13 | 14 | 15 | 16 |
| | Q1B | Q2B | Q3B | Q4B | Q5B | Q11-2 | Q11-7 | |
| SCAN NO. 3 | 17 | 18 | 19 | 20 | 21 | 22 | 23 | 24 |
| | Q1C | Q2C | Q3C | Q4C | Q5C | Q11-3 | Q11-8 | |
| SCAN NO. 4 | 25 | 26 | 27 | 28 | 29 | 30 | 31 | 32 |
| | Q6A | Q7A | Q8A | Q9A | Q10A | Q11-4 | Q11-9 | |
| SCAN NO. 5 | 33 | 34 | 35 | 36 | 37 | 38 | 39 | 40 |
| | Q6B | Q7B | Q8B | Q9B | Q10B | Q11B | Q11-0 | CLR |
| SCAN NO. 6 | 41 | 42 | 43 | 44 | 45 | 46 | 47 | 48 |
| | Q6C | Q7C | Q8C | Q9C | Q10C | | | REC |

After the key hits counters have been counted up, the next operation to be accomplished as illustrated in FIG. 16 is to translate the scan counter value and data bus signal (DB0–DB7) from the key matrix to a key number. Specifically each key on the keyboard is assigned a number from 1 through 48 as represented in Table III hereinabove. Not all of the numbers 1–48 represent a key in the system, however. It will be noted from Table II that key numbers 8, 16, 24, 32, 46 and 47 are blanks.

The 1A answer for question No. 1 is the DB0 data bit at scan No. 1 time is key No. 1, while 2A answer is the DB1 data bit and therefore is key No. 2; the 5A answer at DB4 at scan 1 is key No. 5, while the number 6 digit for question No. 11 is key No. 7 by referring to DB6 at scan No. 1 time, all as illustrated in Table II.

After this translation has been completed, the remaining operations recorded on the flow chart of FIG. 16 are processed in terms of the key numbers. The first decision that takes place, as indicated in FIG. 16 after the key number has been identified from Table II is to perform the logical decision as to whether the key number represents a question that falls within the range of 1 through 10 or some other value. If the question falls within the group of 1 through 10 then the "yes" branch of the flow chart is followed, and it is assumed at this point in the description that this is the case and so the next operation that would take place would be to translate the key number back to an answer bit as indicated in Table III.

TABLE III

KEY NUMBER TO ANSWER BIT AND HEXADECIMAL TRANSLATE TABLES

| KEY NUMBER | DISPLAY BUFFER MEMORY ANSWER BITS | | | | | | | | DISPLAY BUFFER MEMORY HEXADECIMAL CHARACTER | | | | | | | |
|---|---|---|---|---|---|---|---|---|---|---|---|---|---|---|---|---|
| | DB7 | DB6 | DB5 | DB4 | DB3 | DB2 | DB1 | DB0 | DB7 | DB6 | DB5 | DB4 | DB3 | DB2 | DB1 | DB0 |
| 1 | 0 | 0 | 1 | 0 | 0 | 0 | 0 | 0 | | | | | | | | |
| 2 | 0 | 0 | 1 | 0 | 0 | 0 | 0 | 0 | | | | | | | | |
| 3 | 0 | 0 | 1 | 0 | 0 | 0 | 0 | 0 | | | | | | | | |
| 4 | 0 | 0 | 1 | 0 | 0 | 0 | 0 | 0 | | | | | | | | |
| 5 | 0 | 0 | 1 | 0 | 0 | 0 | 0 | 0 | | | | | | | | |
| 6 | 0 | 0 | 0 | 1 | 0 | 0 | 0 | 0 | 0 | 0 | 0 | 0 | 0 | 0 | 0 | 1 |
| 7 | 0 | 0 | 0 | 1 | 0 | 0 | 0 | 0 | 0 | 0 | 0 | 0 | 0 | 1 | 1 | 0 |
| 8 | 0 | 0 | 0 | 0 | 0 | 0 | 0 | 0 | | | | | | | | |
| 9 | 0 | 0 | 0 | 1 | 0 | 0 | 0 | 0 | | | | | | | | |
| 10 | 0 | 0 | 0 | 1 | 0 | 0 | 0 | 0 | | | | | | | | |
| 11 | 0 | 0 | 0 | 1 | 0 | 0 | 0 | 0 | | | | | | | | |
| 12 | 0 | 0 | 0 | 1 | 0 | 0 | 0 | 0 | | | | | | | | |
| 13 | 0 | 0 | 0 | 1 | 0 | 0 | 0 | 0 | | | | | | | | |
| 14 | 0 | 0 | 0 | 0 | 1 | 0 | 0 | 0 | 0 | 0 | 0 | 0 | 0 | 0 | 1 | 0 |
| 15 | 0 | 0 | 0 | 0 | 1 | 0 | 0 | 0 | 0 | 0 | 0 | 0 | 0 | 1 | 1 | 1 |
| 16 | 0 | 0 | 0 | 0 | 0 | 0 | 0 | 0 | | | | | | | | |
| 17 | 0 | 0 | 0 | 0 | 1 | 0 | 0 | 0 | | | | | | | | |
| 18 | 0 | 0 | 0 | 0 | 1 | 0 | 0 | 0 | | | | | | | | |
| 19 | 0 | 0 | 0 | 0 | 1 | 0 | 0 | 0 | | | | | | | | |
| 20 | 0 | 0 | 0 | 0 | 1 | 0 | 0 | 0 | | | | | | | | |
| 21 | 0 | 0 | 0 | 0 | 1 | 0 | 0 | 0 | | | | | | | | |
| 22 | 0 | 0 | 0 | 0 | 0 | 1 | 0 | 0 | 0 | 0 | 0 | 0 | 0 | 0 | 1 | 1 |
| 23 | 0 | 0 | 0 | 0 | 0 | 1 | 0 | 0 | 0 | 0 | 0 | 0 | 1 | 0 | 0 | 0 |
| 24 | 0 | 0 | 0 | 0 | 0 | 0 | 0 | 0 | | | | | | | | |
| 25 | 0 | 0 | 0 | 0 | 0 | 1 | 0 | 0 | | | | | | | | |
| 26 | 0 | 0 | 0 | 0 | 0 | 1 | 0 | 0 | | | | | | | | |
| 27 | 0 | 0 | 0 | 0 | 0 | 1 | 0 | 0 | | | | | | | | |
| 28 | 0 | 0 | 0 | 0 | 0 | 1 | 0 | 0 | | | | | | | | |
| 29 | 0 | 0 | 0 | 0 | 0 | 1 | 0 | 0 | | | | | | | | |
| 30 | 0 | 0 | 0 | 0 | 0 | 1 | 0 | 0 | 0 | 0 | 0 | 0 | 0 | 1 | 0 | 0 |
| 31 | 0 | 0 | 0 | 0 | 0 | 1 | 0 | 0 | 0 | 0 | 0 | 0 | 1 | 0 | 0 | 1 |

TABLE III-continued
KEY NUMBER TO ANSWER BIT AND HEXADECIMAL TRANSLATE TABLES

| | DISPLAY BUFFER MEMORY ANSWER BITS | | | | | | | | DISPLAY BUFFER MEMORY HEXADECIMAL CHARACTER | | | | | | | |
|---|---|---|---|---|---|---|---|---|---|---|---|---|---|---|---|---|
| | DB7 | DB6 | DB5 | DB4 | DB3 | DB2 | DB1 | DB0 | DB7 | DB6 | DB5 | DB4 | DB3 | DB2 | DB1 | DB0 |
| 32 | 0 | 0 | 0 | 0 | 0 | 0 | 0 | 0 | | | | | | | | |
| 33 | 0 | 0 | 0 | 0 | 0 | 0 | 1 | 0 | | | | | | | | |
| 34 | 0 | 0 | 0 | 0 | 0 | 0 | 1 | 0 | | | | | | | | |
| 35 | 0 | 0 | 0 | 0 | 0 | 0 | 1 | 0 | | | | | | | | |
| 36 | 0 | 0 | 0 | 0 | 0 | 0 | 1 | 0 | | | | | | | | |
| 37 | 0 | 0 | 0 | 0 | 0 | 0 | 1 | 0 | | | | | | | | |
| 38 | 0 | 0 | 0 | 0 | 0 | 0 | 1 | 0 | 0 | 0 | 0 | 0 | 0 | 0 | 1 | 1 |
| 39 | 0 | 0 | 0 | 0 | 0 | 0 | 1 | 0 | 0 | 0 | 0 | 0 | 0 | 1 | 1 | 0 |
| 40 | 0 | 0 | 0 | 0 | 0 | 0 | 0 | 0 | | | | | | | | |
| 41 | 0 | 0 | 0 | 0 | 0 | 0 | 0 | 1 | | | | | | | | |
| 42 | 0 | 0 | 0 | 0 | 0 | 0 | 0 | 1 | | | | | | | | |
| 43 | 0 | 0 | 0 | 0 | 0 | 0 | 0 | 1 | | | | | | | | |
| 44 | 0 | 0 | 0 | 0 | 0 | 0 | 0 | 1 | | | | | | | | |
| 45 | 0 | 0 | 0 | 0 | 0 | 0 | 0 | 1 | | | | | | | | |
| 46 | 0 | 0 | 0 | 0 | 0 | 0 | 0 | 0 | | | | | | | | |
| 47 | 0 | 0 | 0 | 0 | 0 | 0 | 0 | 0 | | | | | | | | |
| 48 | 0 | 0 | 0 | 0 | 0 | 0 | 0 | 0 | | | | | | | | |

This is a non-hexadecimal translation so if, for example, the 1A key was operated it is identified as key number 1, the one bit will be stored in the buffer memory at the DB5 bit position with all the other DB bits being 0. After the answer bit has been defined it is stored in the display buffer memory per FIG. 14 in the scan 1 position. For a key 1 operation, a 1 is stored at scan No. 1, DB5 position of the buffer memory. The next decision is to examine the parameter number 1 which will signal whether or not multiple answers or single answers are permissible for the particular question as identified by the key number that has been operated. This is considered in conjunction with FIG. 17. Parameter number 1 is stored in the memory PM to identify whether or not the questions are single answer questions or multiple answer questions. This parameter is stored at address 02 and 03 of the RAM memory PM with the bit values for questions 1-8 residing in the 02 address while the "auto record" or automatic record and questions 9 and 10 bits are stored at the 03 address in the positions that correspond to questions 8, 2 and 1 at the 02 address as illustrated in FIG. 17. If a question 1 through 10 is to have multiple answers than a 1 bit is stored at the RAM address and DB position for the question. For example, for question 1, if multiple answers were permissible the RAM address 02 at the DB0 position would be a 1. If mutually exclusive answers are required then a 0 would be at this position. Similarly, for question number 2 a multiple answer is signalled by having a 1 at the RAM address 02 at the DB1 position. For question number 10, multiple answers would be signalled by having a 1 at the RAM address 03 at the DB1 position. Question No. 11 is defined to have multiple answers. Up to five multiple answers are permitted for question No. 11 and can be displayed in the digital display 20. After this decision has been made and the answer is "yes", the operation proceeds to point D for all multiple answer questions. If a single answer is only permissible as in the normal case for questions 1 through 10, then the logical decision is "no" and then all of the other answer bits that have been entered into the buffer memory previous to this display cycle will be erased. At the end of this clear operation the operation continues back to point D in the cycle to reset the scan signal and count up the scan counter A. The scan counter value is next examined to determine whether it is 13 or not. If the value is 13, the decision is "yes" and the scan and display cycle is complete. If the answer is "no", the scan counter is again examined to determine if it is greater than 7. If the answer is "no", then the flow chart proceeds back to point A on the left side of FIG. 16. The cycle then repeats by getting the answer bits from the display buffer memory in FIG. 14 and the answers are output as the DB0 through DB7 data bits to the light emitting diode matrix (FIG. 12). This is to determine if a second key has been operated since key 1A had been operated, for example. If a key has been detected as being operated, the signals on the lines DB0 through DB7 will have the 1 bit set at the proper position and will be stored in the latch L so that the corresponding light emitting diode 40 will be energized after the store pulse is applied to the 8 bit flip-flop latch L. The scan signal from the scan counter is then output and then tested to determine whether it is greater than 6. If the scan counter value is greater than 6, the operation proceeds to point "D" to repeat that leg of the flow chart. If the answer is "no", the scan counter is less than 6, the DB0 to DB7 input to the controller MC are examined as a result of outputting the latest scan signal to determine if another key has been operated. The procedure continues at point "C" of FIG. 16. If the DB0 through DB7 signals indicate that a key has been operated the key hits counter has been counted up and a reset of the 45 second timer occurs. The same procedure then follows through the right branch of the flow chart as described hereinabove. In the previous explanation, it was assumed that the key number represented a question falling within the range of 1 through 10. If the decision as to whether a question 1 through 10 answer is represented by the key number is a "no", then the key number is tested to determine whether the key represents an answer to question number 11 or the record key has been set. If it is not question number 11, the record key is examined. If that answer is "no" the clear indicator is set and the system proceeds back to point D. If the answer is "yes", indicating that the key number tested is an answer bit for one of the answer keys representing an answer to question number 11, this key number is translated to a hexadecimal character per Table III and stored in the buffer memory at the display buffer memory portion storing the hexadecimal characters or at one of the digit positions 1-5. It will be noted that keys 6, 7, 14, 15, 22, 23, 30, 31, 38 and 39 are the keys that represent the numerical answers for question number 11. Once this hexadecimal character is stored in the display buffer memory, the numeric indicator bit or bit No. 4 is set to 1, in the control register; see FIG. 15. After this series of steps which are unique to the question number 11 key determination, the key number is translated to the answer bits in the non-hexadecimal mode and these are stored in a display buffer memory at the scan No. 6 or No. 7 locations. Again the parameter number 1 is examined to determine whether multiple or single answers are provided and the procedure follows as indicated on FIG. 16 and previously described.

At point D the same procedure is followed for scan counts 1 through 6. During this procedure the scan counter value is checked to determine whether it is 13. If it is not 13 then the system proceeds along the branch to determine whether or not the scan counter value is greater than 7. If it is not greater than 7 then the sequence illustrated in the left hand branch of FIG. 16 is followed beginning at point "A" as previously described. If in following the path at point A the value of the scan counter is greater than 6 it is not necessary to test for the operation of the keys on the keyboard and this step is skipped. At this point the operation proceeds to point D in the flow chart of FIG. 16. Following this path, the scan counter is tested to see if it is equal to 13 for determining whether the 12th scan signal has been output from the controller MC and to determine if the keyboard scan and display refresh operations are complete. If the scan counter value is not 13, then the value of the scan counter is tested to determine if it is greater than 7. If it is not greater than 7, the keyboard scan and refresh operation resumes at point A of the flow chart in the left hand branch as illustrated in FIG. 16. When the key scan counter value is greater than 7, then scans number 8 through 12 are effective for operating the digital display 20.

TABLE IV

HEXADECIMAL MEMORY CHARACTER TO 7 SEGMENT DISPLAY TRANSLATE TABLE

| | DATA BUS SEGMENTS | DB7 NOT USED | DB6 g | DB5 f | DB4 e | DB3 d | DB2 c | DB1 b | DB0 a | | |
|---|---|---|---|---|---|---|---|---|---|---|---|
| | 00 | 0 | 0 | 1 | 1 | 1 | 1 | 1 | 1 | 0 | |
| | 01 | 0 | 0 | 0 | 0 | 0 | 1 | 1 | 0 | 1 | |
| | 02 | 0 | 1 | 0 | 1 | 1 | 0 | 1 | 1 | 2 | |
| | 03 | 0 | 1 | 0 | 0 | 1 | 1 | 1 | 1 | 3 | |
| | 04 | 0 | 1 | 1 | 0 | 0 | 1 | 1 | 0 | 4 | |
| | 05 | 0 | 1 | 1 | 0 | 1 | 1 | 0 | 1 | 5 | NUMBERS |
| | 06 | 0 | 1 | 1 | 1 | 1 | 1 | 0 | 0 | 6 | |
| HEXADECIMAL | 07 | 0 | 0 | 0 | 0 | 0 | 1 | 1 | 1 | 7 | |
| MEMORY | 08 | 0 | 1 | 1 | 1 | 1 | 1 | 1 | 1 | 8 | |
| CHARACTER | 09 | 0 | 1 | 1 | 0 | 0 | 1 | 1 | 1 | 9 | |
| | 0A | 0 | 1 | 0 | 1 | 1 | 1 | 1 | 0 | d | |
| | 0B | 0 | 1 | 1 | 0 | 1 | 1 | 0 | 1 | S | |
| | 0C | 0 | 1 | 1 | 1 | 0 | 0 | 1 | 1 | P | |
| | 0D | 0 | 1 | 0 | 1 | 0 | 0 | 0 | 0 | r | |
| | 0E | 0 | 1 | 0 | 1 | 0 | 1 | 0 | 0 | n | |
| | 0F | 0 | 1 | 1 | 1 | 0 | 1 | 1 | 0 | H | ALPHA |
| | 10 | 0 | 1 | 1 | 1 | 1 | 0 | 0 | 1 | E | |
| | 11 | 0 | 0 | 1 | 1 | 1 | 0 | 0 | 1 | C | |
| | 12 | 0 | 0 | 0 | 1 | 1 | 0 | 0 | 0 | L | |

Figure 16A:
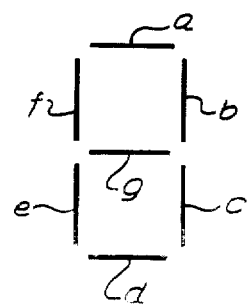
FIG. 16a is a diagrammatic representation of the seven segments for each digit position of the digital display utilized in the customer satisfaction terminal.

The data stored in the display buffer memory is in hexadecimal form and must be translated into the appropriate seven segment data since the digital display 20 defines each digit by means of seven segments of the FIG. 8, and accordingly, the bits must be defined for energizing or maintaining de-energized, the appropriate ones of the seven segments. The conventional figure 8 configuration is illustrated in FIG. 16a with the seven segments identified as the segments "a" through "g", reading clockwise. This translation is effected by means of the Table IV which illustrates the data bus bits, the seven segments, the hexadecimal memory character and the resulting number and letters that are displayed on the digital display 20. The hexadecimal characters 00 through 09 are translated into the seven segment data so that the digital display 20 will display the corresponding numerical digits 0 through 9 with the pattern of seven bits illustrated for the number 0-9. The hexadecimal characters 0A, 0B, 0C through 0F, and 10, 11 and 12 are utilized to display the alphabetic letters d, S, P, r, n, H, E, C, L, as illustrated on the right hand side of Table IV.

After the digits stored in the display buffer memory are translated into the seven segment data and outputted on the data bus for the main controller MC, the main controller outputs the store pulse to the flip-flop latch L and then outputs the appropriate scan signal so that the signalled alpha-numeric digit will be displayed on the digital display 20. The procedure goes back to point B where the scan counter value is examined to determine if it is greater than 6. In the explanation to this point, it was assumed it was greater than 6 and so the procedure goes to point "D". The same procedure as described immediately hereinabove occurs for the scans 8-12 until the 12th scan is completed and the scan and display cycle is completed.

Figure 18B:
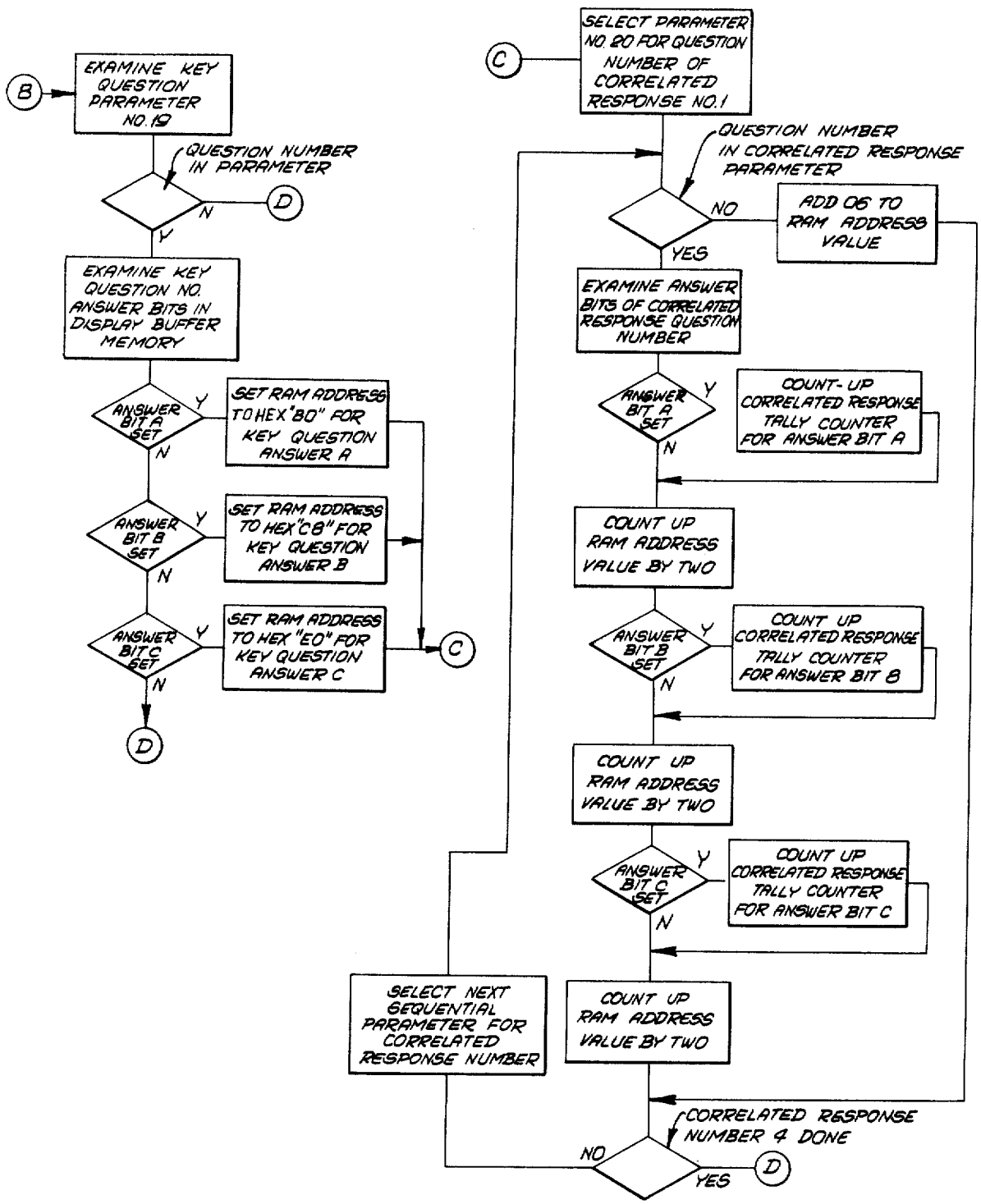
Figure 18C:
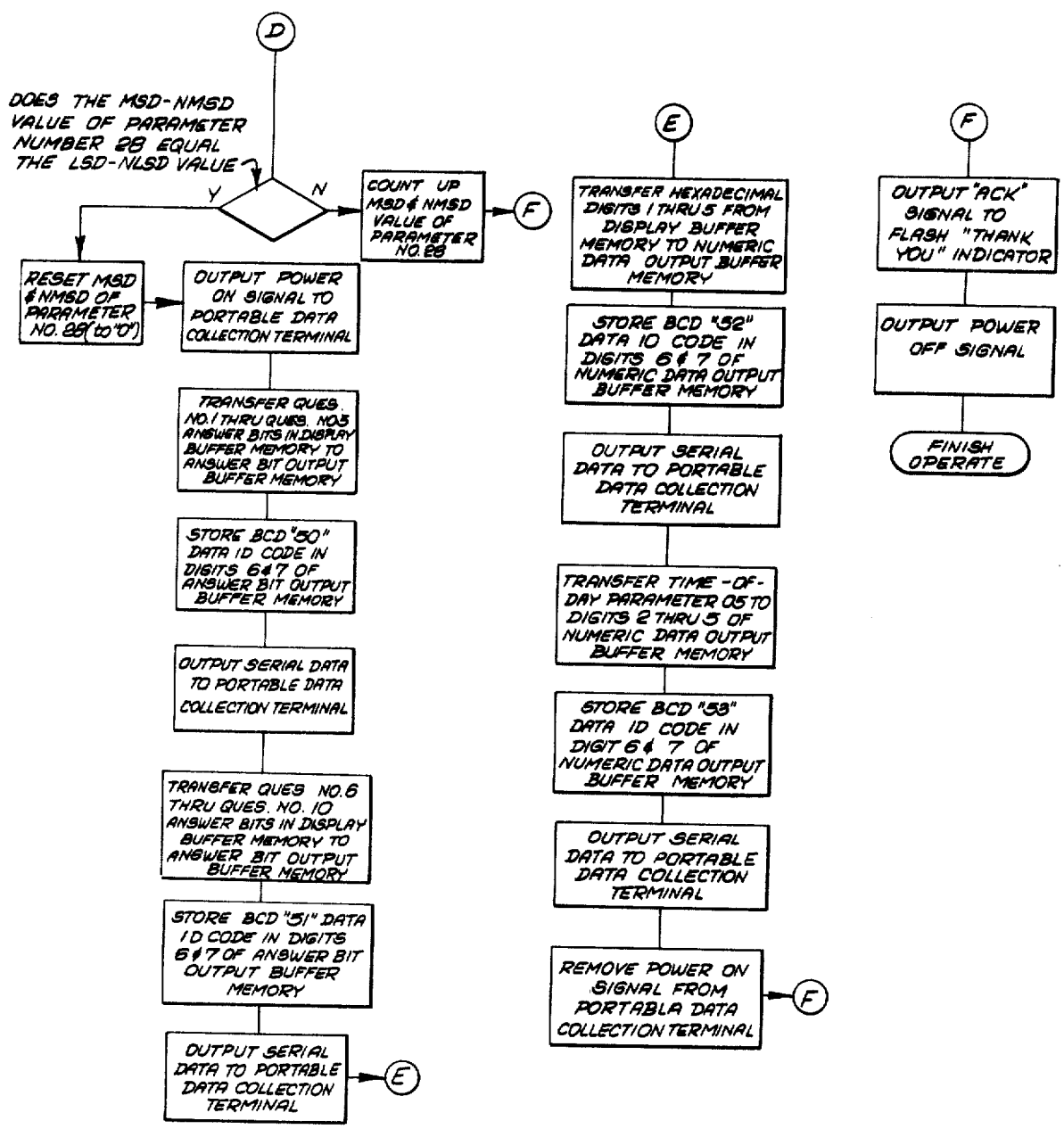

After the user of the customer satisfaction terminal CST has recorded all the answers that it desires on the keyboard, it should permanently record the selected answers in the terminal CST. These instructions for the operation of the terminal will be found on the insert TI to be followed by the terminal user. While the user is keying in the information, the answer bits representative of the selected keys on the keyboard K are stored in the buffer memory. When the record key is operated, the answer bit information stored in the buffer memory is to be transferred to the permanent memory PM or the RAM memory. The RAM memory PM stores the parameter information or the program information that has to be examined for controlling the operation of the terminal CST and the tally counters representative of each answer key on the keyboard to record the number of times each answer has been selected for particular questions displayed on the keyboard K. The permanent memory PM also records the time of day in minutes, hours, day of the month, and the month for use for correlating the answer information with the type of customer, etc. The various steps that are performed to implement the record function during the operate mode are represented in FIGS. 18A, 18B & 18C.

RECORD FUNCTION—OPERATE MODE

As illustrated in FIG. 18A, with the power on, initially the automatic power off timer is set for 45 seconds by the controller MC. Assuming that this has been set, the terminal is then tested to determine whether it is in the "operate" mode or in the "parameter" mode. If the test indicates that it is in the parameter mode, the "no" branch is followed and the parameter functions will proceed and this function will be described hereinafter. If the test indicates that the mode switch is in the "operate" position, then the keyboard scan and display function is performed per FIG. 16. During this operation it will be recalled the microprocessor MC will indicate whether the clear indicator is set or the record indicator is set. Under the present assumption, the clear indicator will not have been set and the record indicator will have been set so that we follow vertically through the flow chart in the left hand branch. After it has been determined that the record indicator has been set, the value of parameter number 24 is examined with regard to the number stored in the key hits counter to determine whether or not the number of keys that have been operated are above or below a pre-selected minimum number of key operations. The value stored in the permanent memory PM is indicated in Table I for parameter 24 and will be the minimum number of key operations that are acceptable for identifying a valid use of the terminal CST. After this test has been completed, the decision as to which of the two branches to follow, will have been made concerning whether or not the low limit value has been exceeded, or not. If the key hits is less than the low limit value stored for parameter 24, then the tally counter in the memory PM at the parameter 25 address is counted up to record an invalid entry. If the number of key operations exceeds the minimum number programmed, the number of key operations is compared with the parameter value for parameter 24 that represents the maximum number of (hi-limit) key operations to determine if the terminal has been validly used. If the number of key hits exceeds the stored maximum number of key hits, then the high limit tally counter in the memory PM at the address for parameter 26 will be counted up for signalling an invalid entry. After the time interval that either the low limit or high limit tally counters are counted up, the terminal CST is rendered inoperative. If the number of key hits does not exceed the stored maximum number of key hits, then, the no branch of the flow chart of FIG. 18 is followed. At this time, the valid entry tally counter is counted up for signalling that a valid use of the terminal has been determined. This tally counter is located at address A8, A9 in memory PM. At this point, the operations proceed to point A or to the right hand branch of FIG. 18A.

After the valid entry tally counter has been counted up, the scan number 1 position of the display buffer memory is selected. At the scan number 1 time interval, the answer bits for questions 1 and 6 are examined to determine whether or not an answer bit has been set; see FIG. 14. If no answer bit has been set during this time interval, then the right hand branch indicated by the "no" will be followed and a decision will be made as to whether scan number 5 position has been outputted or not from the controller MC. Since we are in the scan number 1 position, the decision is "no" and the operations will follow to the left which will cause the next sequential scan position in the display buffer memory to be selected, or scan number 2 for reading out the answer bits for questions 2 and 7 as noted in FIG. 14. Assuming that an answer bit has been set during scan numbers 1B or 2B, then the "yes" branch will be followed vertically downward. The next operation is to process the answer bit by means of table V, by looking up in table V the address in the memory PM for the tally counter for the answer bit. For example, if a 1A answer bit has been selected by referring to table V, the tally counter hexadecimal address will be seen to be 58. Once the address is identified, the tally counter at that address is counter up one.

TABLE V
ANSWER BIT AND HEXADECIMAL CHARACTER TRANSLATION TO RAM TALLY COUNTER ADDRESS

| ANSWER BIT | TALLY COUNTER HEX RAM ADDRESS | HEXADECIMAL MEMORY CHARACTER | TALLY COUNTER HEX RAM ADDRESS |
|---|---|---|---|
| 1A | 58 | 00 | 94 |
| 1B | 5A | 01 | 96 |
| 1C | 5C | 02 | 98 |
| 2A | 5E | 03 | 9A |
| 2B | 60 | 04 | 9C |
| 2C | 62 | 05 | 9E |
| 3A | 64 | 06 | A0 |
| 3B | 66 | 07 | A2 |
| 3C | 68 | 08 | A4 |
| 4A | 6A | 09 | A6 |
| 4B | 6C | | |
| 4C | 6E | | |
| 5A | 70 | | |
| 5B | 72 | | |
| 5C | 74 | | |
| 6A | 76 | | |
| 6B | 78 | | |
| 6C | 7A | | |
| 7A | 7C | | |
| 7B | 7E | | |
| 7C | 80 | | |
| 8A | 82 | | |
| 8B | 84 | | |
| 8C | 86 | | |
| 9A | 88 | | |
| 9B | 8A | | |
| 9C | 8C | | |
| 10A | 8E | | |
| 10B | 90 | | |
| 10C | 92 | | |

This same procedure is followed until the scan positions 1-5 have been examined in the display buffer memory and the tally counters in the permanent memory PM have been counted up for each answer bit that has been set. After the fifth scan, the decision will be that the five scans have been completed and the yes branch or vertical line will be followed so that the next function will be select scan number 8 position of the display buffer memory. After selecting the number 8 scan position of the display buffer memory, the hexadecimal memory character is (the 10 answers for question No. 11) considered based on Table V to determine the RAM address of the tally counter for those answer bits. For the "one" key of question No. 11, the tally counter hexadecimal RAM address would be 96. Again, once the address is determined, then the tally counter for the hexadecimal memory character is counted up. After the tally counter is counted up, a test is made to determine whether scan number 12 is completed or not. If the result is a "no" answer, then the next sequential scan position, or scan number 9, is initiated for reading out the digit No. 2 hexadecimal character and the flow path is back to determine the new RAM address from Table V for counting up the corresponding tally counter. This procedure is continued until after scan No. 12 is complete, then the operation proceeds to the flow chart illustrated in FIG. 18b.

CORRELATE ANSWERS—OPERATE MODE

The next operation performed in the operate mode is correlating the answers between selected questions. This operation allows each of the answers of up to four questions referred to as a "response" question to be correlated or linked to each of the answers to another question called a "key" question.

To understand the operation of correlating answers, the type of questions that are displayed on the keyboard K must be understood. The type of questions that are displayed can be of two types, one, an information question or two, a customer satisfaction question. An information question, for example, may be, "Do you intend to see us again?" Possible answers to the information question are, "yes", "maybe", and "no". A service satisfaction question may be "How satisfied were you with our overall service?" Possible answers to this customer satisfaction question are, "very satisfied", "satisfied", and "not satisfied".

The first step in correlating the answers is to examine parameter number 19 to determine if there is a key question by determining if the parameter value contains a question number of 1 through 10 stored therein. If there is no key question stored at the parameter number 19 address in the memory PM, then the correlation operations are not selected and the operation proceeds to point D for FIG. 18c to be explained hereinafter. When it is determined that there is a key question number in parameter number 19, the answer bits stored in the display buffer memory for that question are examined to determine whether or not the answer bit has been set or not. As noted in FIG. 18b, if the answer is "yes" for any bit, the RAM address register is initialized for storing the answer bits in the corresponding tally counters for tallying the correlated responses. Each of the answer bits A, B and C for the key question number are examined and the tally counter for correlation purposes in the RAM is initialized to the hexadecimal address BO, or C8, or EO upon detection as to which one of the A, B, or C answer bits have been selected. These hexadecimal addresses can be appreciated by examining Table I wherein it is indicated the starting addresses for the tally counters for each of the possible A, B, or C correlated responses of the key question, as is evident from FIG. 18-b. If none of the answer bits for the key question are set, then each of the yes-no decisions for answer bits A,B and C are "no" and the operations proceed to point D of FIG. 18-c.

After the permanent memory PM starting address has been selected for the A,B or C group of correlated tally counters, the specific correlated response tally counter is selected by modifying the RAM address register in response to the answer bits contained in the selected response questions. This operation is initiated by starting at point C, in the right hand branch of FIG. 18-b, by examining the value of parameter number 20 to determine if a question number is found in the correlated response parameter. If a question number is found in parameter number 20, the answer bits in the display buffer memory for that question number are selected for further examination. If the A answer bit has been set, for example, the tally counter located at the initialized RAM address value for the A answer bit is counted up to indicate a correlation between the key question and the A answer bit response. If the A answer bit had not been selected, the RAM address value is incremented by two, to address the B bit tally counter and then the B correlated response answer bit is tested to determine whether it has been selected or not by the representation of the diamond symbol. If it has been selected, the associated tally counter is incremented by following the "yes" output line from the diamond decision symbol after this operation, then, the RAM address is incremented by a value of two. The same steps are repeated for answer bits C and the address value counted up by another two.

If there was no question number in the correlated response in parameter number 20, then, the "no" decision line is followed as shown to the right top of the flow diagram of FIG. 18-b and causes six to be added to the RAM address value. This is the same point that is reached after the C bit has been examined. The operation, then, jumps down to the bottom diamond to determine if the correlated response number four is complete. If the answer is "no", the decision is to follow the branch to the left and select the next sequential parameter for a correlated response number. Since we started with parameter number 20, parameter number 21 will be selected and the procedure follows through the diamond decision symbols again, to determine whether a question number in correlated response parameter 21 is present. If the answer is "yes" the same sequence followed for parameter number 20 is followed for parameter number 21. This procedure is again repeated for correlating response numbers 3 and 4 by examining parameters 22 and 23 for the corresponding answer bits A, B and C. This will bring the operation down to the bottom diamond of FIG. 18-b for the determination that correlated response number 4 has been finished. When this latter decision is "yes", the operation proceeds to point D in FIG. 18-c.

Although the terminal CST operating in the "operate" mode has the ability to select a key number or reference number and correlate the responses thereto, these correlated responses cannot be viewed on the terminal. The correlated responses can only be reviewed by printing them out as will be described hereinafter.

DATA TRANSFER TO MODULE TSM—OPERATE MODE

Now referring to FIG. 18-c, the operations for transferring the information stored in the display buffer to the data collection terminal or the module TSM will be considered. This operation starts at point D at FIG. 18-c. Parameter number 28 is utilized to determine if the answer bit information in the display buffer memory should be sent to the module TSM. Proper paramaterization of parameter No. 28 permits the data collection terminal to receive the answer information of only a representative sample of the total number of users of the customer satisfaction terminal CST. The purpose of this is to conserve the memory of the module TSM and thereby allow the detailed information to be gathered in the module TSM over a longer period of time. The four binary coded decimal characters of parameter number 28 are used as two separate digit values and are compared to each other to initiate this data transfer operation. The two values for one pair of digits is the most significant digit and the next most significant digit, while the other pair is the least significant digit and the next least significant. If the two pairs are not equal, then the values are incremented one count and the operation proceeds to point F (FIG. 18c) to remove the power from the terminal CST without sending any information to the data collection terminal TSM. If the two values of parameter number 28 are equal, then each of these values are reset to zero and power is applied to the data collection terminal TSM from the main controller MC by means of the "power on" line as illustrated in FIG. 8. This will apply the necessary power to the module TSM for operating it.

Figure 19:
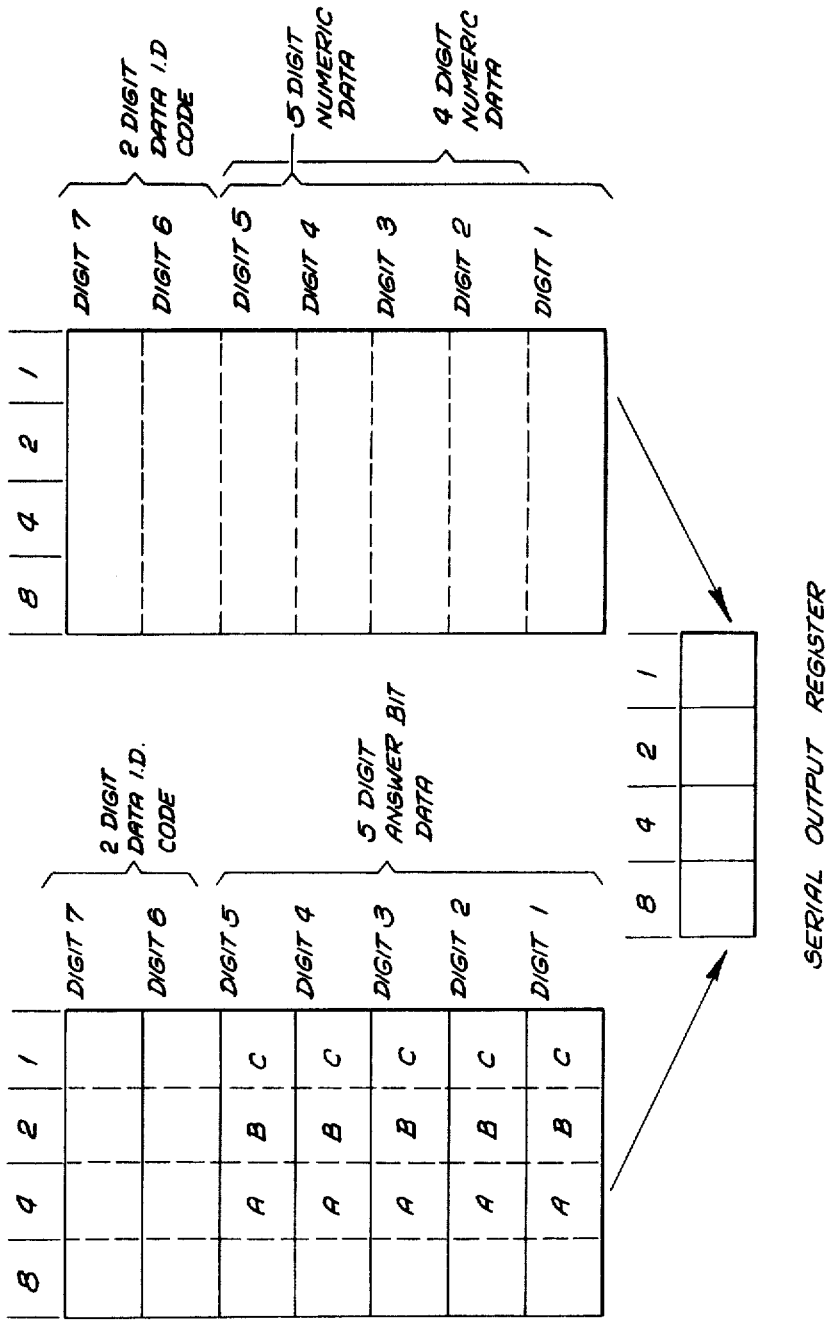
FIG. 19 is a diagrammatic representation of the output buffer memories utilized in the customer satisfaction terminal for transmitting data through the serial output register to the data collection terminal and the printer.

In order to transfer the information from the buffer memory to the data collection module TSM, a further temporary storage facility of the microprocessor MC is utilized as a temporary storage facility. The answer bit information stored in the buffer memory of FIG. 14 is transferred to the answer bit output buffer memory, as illustrated in FIG. 19. This answer bit output buffer memory is arranged in the 8-4-2-1 format and can store the A, B and C bits for digits 1 through 5 plus a two-digit data identification (I.D.) code at digit positions 6 and 7. The information from this answer bit output buffer memory is then transferred into a serial output register arranged in the 8-4-2-1 binary format. Similarly, a numeric data output buffer memory is utilized for intermediate storage between the buffer memory of FIG. 14 and the data collection module TSM for transferring the numerical data of question No. 11. This stores the 4 digit and 5 digit numeric data in the digits 1 through 5 positions along with the two digit data I.D. code.

Now returning to FIG. 18c, after the data collection terminal TSM is powered up, the answer bits for questions 1 through 5 are transferred from the display buffer memory to the answer bit output buffer memory illustrated in FIG. 19. After storing the answer bits in the first five digit positions of the answer bit output buffer memory an identifier code consisting of the binary coded decimal numeral 50 is stored at digit positions 6 and 7 of the answer bit output buffer memory. With the completion of the entry of this information in the answer bit output buffer memory, the data is serially outputted from this buffer memory by means of the serial output register of FIG. 19 to the data collection terminal TSM. These are the operations that are shown in sequential fashion in FIG. 18-c in the left hand column thereof.

The information to be transferred from the answer bit output buffer memory to the data collection terminal TSM is inputted to the data collection terminal TSM by means of a "wand" port. The information is entered into the data collection terminal TSM at the same input port as if a wand for reading a bar coded label has been scanned so that the serial data is entered at the port appears the same to the terminal. The remaining operation of the terminal is conventional.

Figure 20:
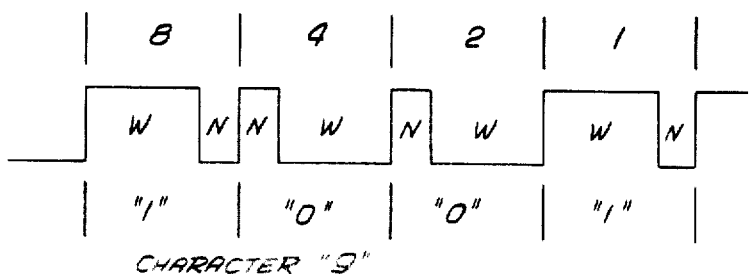
FIG. 20 is a graphical illustration of the coding of the serial data for transmission to the data collection terminal in terms of wide and narrow pulses for representing binary bits.
Figure 21:
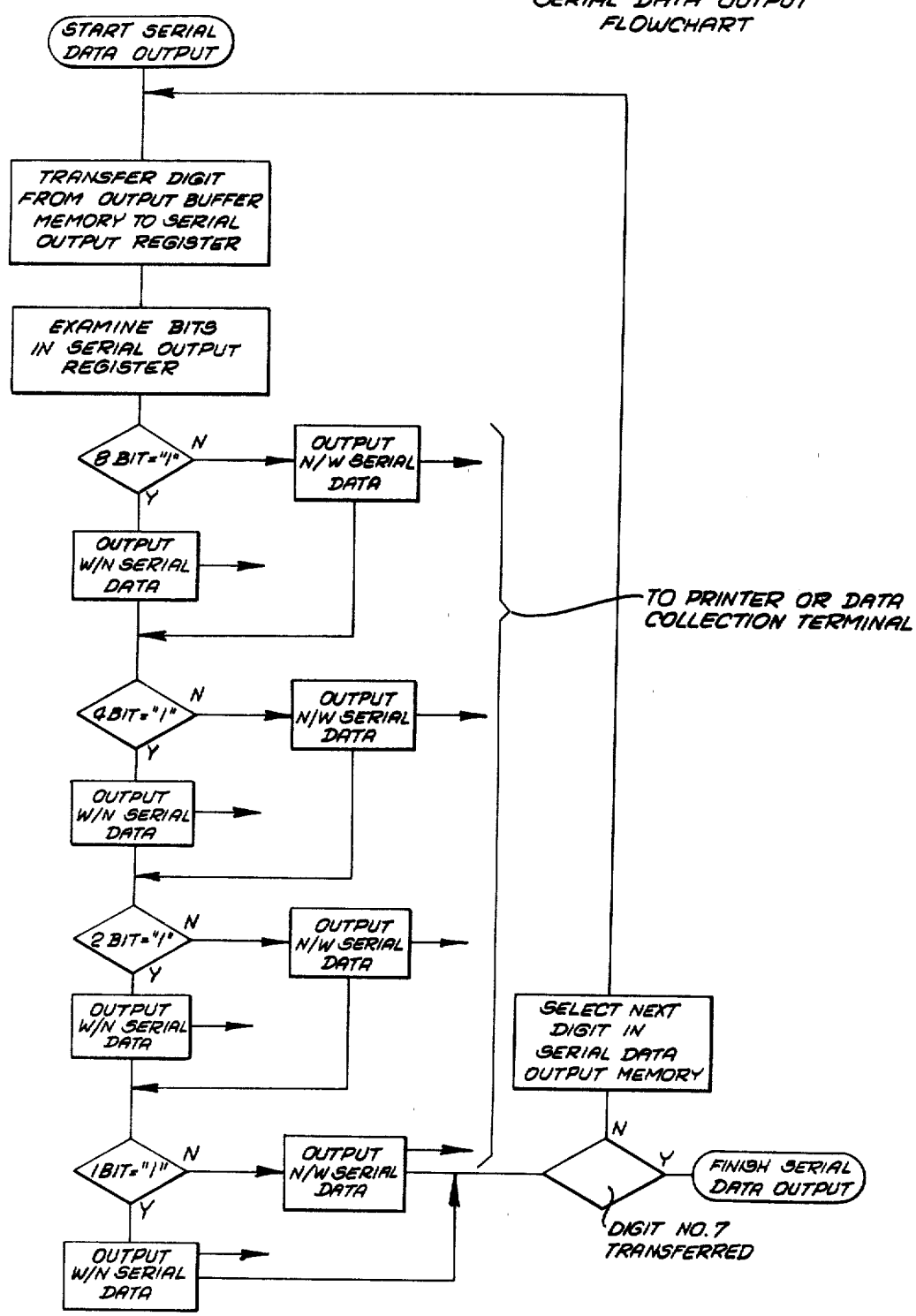
FIG. 21 is a flow chart of the serial data output from the customer satisfaction terminal to the data collection module and the printer.

The coding for serially transferring the information into the data collection terminal TSM is by coding the data in terms of wide and narrow pulses so that the wide/narrow relationship determines whether a binary character is a 1 or a 0. A binary 1 as indicated in FIG. 20 is a wide pulse followed by a narrow pulse. A binary 0 is a narrow pulse followed by a wide pulse. FIG. 20 illustrates as an example the character 9 coded in a 8 4 2 1 format so that a wide-narrow,-narrow-wide,-narrow-wide,-wide-narrow serial train is entered into the data collection terminal TSM. This represents the binary bits 1001 in the 8 4 2 1 format for representing the decimal digit 9. In order to determine the wide/narrow sequence, the digits in the serial output register must be examined, see FIG. 21. A digit from the answer bit output buffer memory is transferred to the serial output register and the binary 8 bit is examined. If the 8 bit is set to a binary 1, a wide pulse followed by a narrow pulse is output into the data collection terminal. If the binary 8 pulse is a 0, then a narrow-wide pulse is output. The commercially available data collection terminal has the capability of decoding the wide-narrow sequence of pulses back into the conventional binary 1 and binary 0 bits. Accordingly, each of the remaining bits in the serial output register are sequentially examined and output as a wide-narrow or narrow-wide pulse until all four bits stored in the output register have been serially output into the terminal TSM. After this operation is complete, the next digit in the output buffer memory is selected or digit number 2 and the serial output operations are again performed. This sequence is repeated until the last digit, digit 7, in the answer bit output buffer memory has been transferred into the data collection terminal TSM, all as illustrated in the flow chart of FIG. 21.

After the answer bits and the I.D. code for questions 1 through 5 have been serially outputted, the answer bits in the buffer memory for questions 6 through 10 are transferred to the answer bit output buffer register along with the identification code 51 placed in digit positions 6 and 7, respectively, see FIG. 18c. This answer information is then serially output through the serial output register per FIG. 21 and the corresponding wide and narrow pulses developed for transferring the information into the data collection terminal TSM. This type of operation is repeated until all of the numeric digits for question number 11 is placed into the data collection terminal TSM. The numerical data is transferred to the data collection model TSM beginning at point E of FIG. 18c and ending at point F. The numerical data is transferred into the numerical data output buffer memory of FIG. 19 and then through the serial output register. The hexadecimal digits 1-5 of the display buffer memory are transferred to the first 5 digits position of the output buffer memory. In digits positions 6 and 7, the binary coded identification number 52 is stored in the output buffer memory. After the numeric data output memory contents have all been processed through the serial output register, the time of day parameter 05 is transferred to the numeric data output buffer memory at digit 2-5 positions. This is followed by storing a "53" as an identification code in digit 6 and 7 positions. This stored data is processed through the serial register and stored in the module TSM.

By reference to FIG. 22, the complete detailed record of the serial data records transferred to the data collection terminal TSM may be appreciated as described hereinabove. This information is illustrated as an answer field including the answers to five questions along with a two digit I.D. code. In the first answer field the answers to questions 1 through 5 are indicated associated with the "50" I.D. code. The next portion of the serial record contains the answers to questions 6 through 10 with a "51" I.D. code. The third answer field includes the answers to question number 11 for the first five digits along with a "52" identification code. The last field is identified as a time field which records the time in hours and minutes, along with the I.D. code of "53".

After all of the aforementioned data is transferred to the data collection terminal TSM the power on signal is removed from the terminal TSM to cause the data collection terminal to power off. When the data collection terminal is powered off, the main controller MC outputs an acknowledge or "ACK" signal through a current driver to cause the energization of the incandescent lamp DSI (FIG. 8) so that the "Thank You" message is flashed to the user, see FIG. 18c. After this time interval the power off signal is outputted by the main controller MC. The power off signal as illustrated in FIG. 8 is applied to the reset input of flip-flop FFI to cause it to reset its state and once it is reset, the power is removed from the terminal CST as a result of the transistor Q1 being rendered nonconductive.

TRANSMITTING DATA TO REMOTE LOCATION VIA TSM

The portable data collection terminal TSM can be removed from the terminal CST for transmitting the stored data to a remote location. The terminal TSM will be released from the terminal CST when the door 13 is open and once the electrical connections with the terminal are removed, the TSM terminal may be carried to a conventional telephone for transmitting the collected data to a remote point. The transmission of the data stored in the collection module TSM is a conventional operation. The terminal TSM is provided with an acoustic coupler outlet so that it can be readily coupled to the hand set of a telephone. In this fashion, the acoustic pulses generated within the terminal TSM will be transmitted over the telephone lines to a host processor. The host processor is generally in a remote location from the customer satisfaction terminal CST. The host processor is generally a processor of significant processing capability so that it can handle any type of processing of the data that has been collected by the customer satisfaction terminal. Correlations of greater scope than that provided by the CST terminal are possible. Profiles as to the times the responses are given, geographical correlations of the customers can be provided as well as correlation between business guests, pleasure guests or conference guests. This information of course, requires time for processing and is not as immediately available as examining the information stored in the memory PM. In addition the printed reports that are prepared may be more extensive in view of the greater computational ability of a large scale processor.

PARAMETER MODE

The other mode in which the customer satisfaction terminal CST may be operated is known as the parameter mode. The parameter mode is principally utilized by authorized personnel of the service establishment in which the terminal is located. The parameter mode is initiated by opening the back door 13 and moving the keyboard K out of its normal position to a position as illustrated in FIG. 2. The keyboard K is moved outwardly to expose the mode select switch M which is mounted on the back side of the printed circuit board 30 as viewed in FIG. 4. This switch M is operable from the "operate" mode to the "parameter" mode as illustrated in FIG. 8. In the parameter mode the terminal CST will perform the keyboard scan and display refresh functions to allow the parameter values stored in the permanent memory PM to be examined and/or modified as well as allowing the selection of the display, print, header, and clear functions.

DISPLAY OF PARAMETER VALUES—PARAMETER MODE

The parameter mode can be traced by following the flow chart in FIG. 23-A&B. With the mode select switch in the parameter position, the parameter mode is initiated. With the initiation of the parameter mode, the parameter number register of FIG. 15 is set to "01". In addition the P indicator is set; indicator bit No. 1. The hexadecimal character "OC" is then stored in the display buffer memory in digit position 1 and the parameter number is stored in digit positions 3 and 4, see FIG. 14. This follows the path from point A to point D in FIG. 23-a. The digit count register, which keeps count of the number of numeric digits keyed in, is then set to "0" at point "D" and the keyboard scan and display refresh function is performed. The storing of the hexadecimal character OC in the display buffer memory will display the letter P in the digit number one position of the digital display 20 in accordance with the mode display format as illustrated in FIG. 24. With the storing of the parameter number in the display buffer memory in digits 3 and 4, the parameter number will be displayed. View A of FIG. 24 tells the viewer that parameter 01 has been selected. The P character that is displayed results from the translation of the hexadecimal character OC in Table IV by providing the binary bits 01110011 reading from right to left to the 7 segments of the digital display 20. If neither the numeric, clear, or record indicators have been set during the performance of the scan and display function then it is again repeated by returning to point E to provide a continuous display of the parameter number. If the decisions with regard to the numeric indicator being set and the clear indicator being set are both "no", the record indicator set is tested. If during the display operation the record indicator is set, then the "yes" branch of the record indicator diamond is followed. Since the P indicator was set at the initiation of the parameter mode, the "yes" branch of the P indicator diamond is followed to the right to the digit count at "0" diamond test, see FIG. 23b. Since the digit counter was initially set to zero at step D, the "yes" branch is followed. At this time the parameter number value is translated to its hexadecimal address and placed into the RAM address register of FIG. 15. This translation is performed by means of Table VI.

TABLE VI
PARAMETER NO. TO RAM HEXADECIMAL ADDRESS TRANSLATE TABLE

| PARAMETER NO. | HEXADECIMAL ADDRESS |
|---|---|
| 1 | 02 |
| 2 | 04 |
| 3 | 06 |
| 4 | 08 |
| 5 | 0A |
| 6 | 0C |
| 7 | 0E |
| 8 | 10 |
| 9 | 12 |
| 10 | 14 |
| 11 | 16 |
| 12 | 18 |
| 13 | 1A |
| 14 | 1C |
| 15 | 1E |
| 16 | 20 |
| 17 | 22 |
| 18 | 24 |
| 19 | 26 |
| 20 | 28 |
| 21 | 2A |
| 22 | 2C |
| 23 | 2E |
| 24 | 30 |
| 25 | 32 |
| 26 | 34 |
| 27 | 36 |
| 28 | 38 |
| 29 | 3A |
| 30 | 3C |
| 31 | 3E |
| 32 | 40 |
| 33 | 42 |
| 34 | 44 |
| 35 | 46 |
| 36 | 48 |
| 37 | 4A |
| 38 | 4C |
| 39 | 4E |

After the translation has been performed, then the RAM parameter value obtained at the memory PM address is transferred into the display buffer memory at the digits 1 through 4 position. The four digit parameter value that has been obtained is "unpacked" and stored in the display buffer memory. The P indicator is reset to indicate to the viewer that the parameter number is no longer displayed, and the operation proceeds to point E. As a result, the new scan and display function displays the parameter value at the digital display 20. During this display interval if the record key is again operated, the P indicator not having been set, the "no" branch will be followed to examine whether or not the digit count is at "0". Since the digit count is still at zero, the parameter number register will be counted up in binary coded decimal. After the parameter number register is counted up it is tested to determine whether or not it is the decimal number 40. If the decimal number is not at 40 then the "no" branch of the diamond decision is followed to re-initiate the flow to point B for displaying the updated parameter number. If the answer to the parameter number being at 40 is "yes" then the point A of the flow diagram of FIG. 23-A is picked up. At point A the parameter number register is set to 01. Accordingly, as the record key is successively actuated during the display operation, the parameter number and the parameter values are alternately displayed on the digital display 20. This operation allows the establishment to review each parameter value and change it if desired.

If during the time that the keyboard scan and display function is being performed the "clear" key on the keyboard K is operated, the clear indicator will be set in the controller register as noted in FIG. 15, i.e., the number 2 indicator bit is set. If the clear indicator is set, then the "yes" path is followed and the digit count at zero test is determined. The digit count is still at "0". Accordingly, the "yes" branch of the diamond test symbol is followed so that the parameter number register is counted down. From that point, the parameter register number is tested as to whether it is at "0" or not and since it is not at "0" at this junction, the flow proceeds back to point B. At that time, the updated parameter number or the number that has just been counted down to will be displayed by proceeding from point B through D to E. In following through the counting down of the parameter number register, if at the diamond test parameter register being at "0" is true, then the "yes" path is followed and the parameter number register is set to 39. After that time interval, the flow is back to point B to set the P indicator.

In reviewing the parameter values as described hereinabove, the parameter values can be sequentially viewed and the operation of the clear key will only cause the parameter numbers to be sequentially viewed in reverse order from their sequence in storage in the memory PM without viewing the parameter values.

Figure 23A:
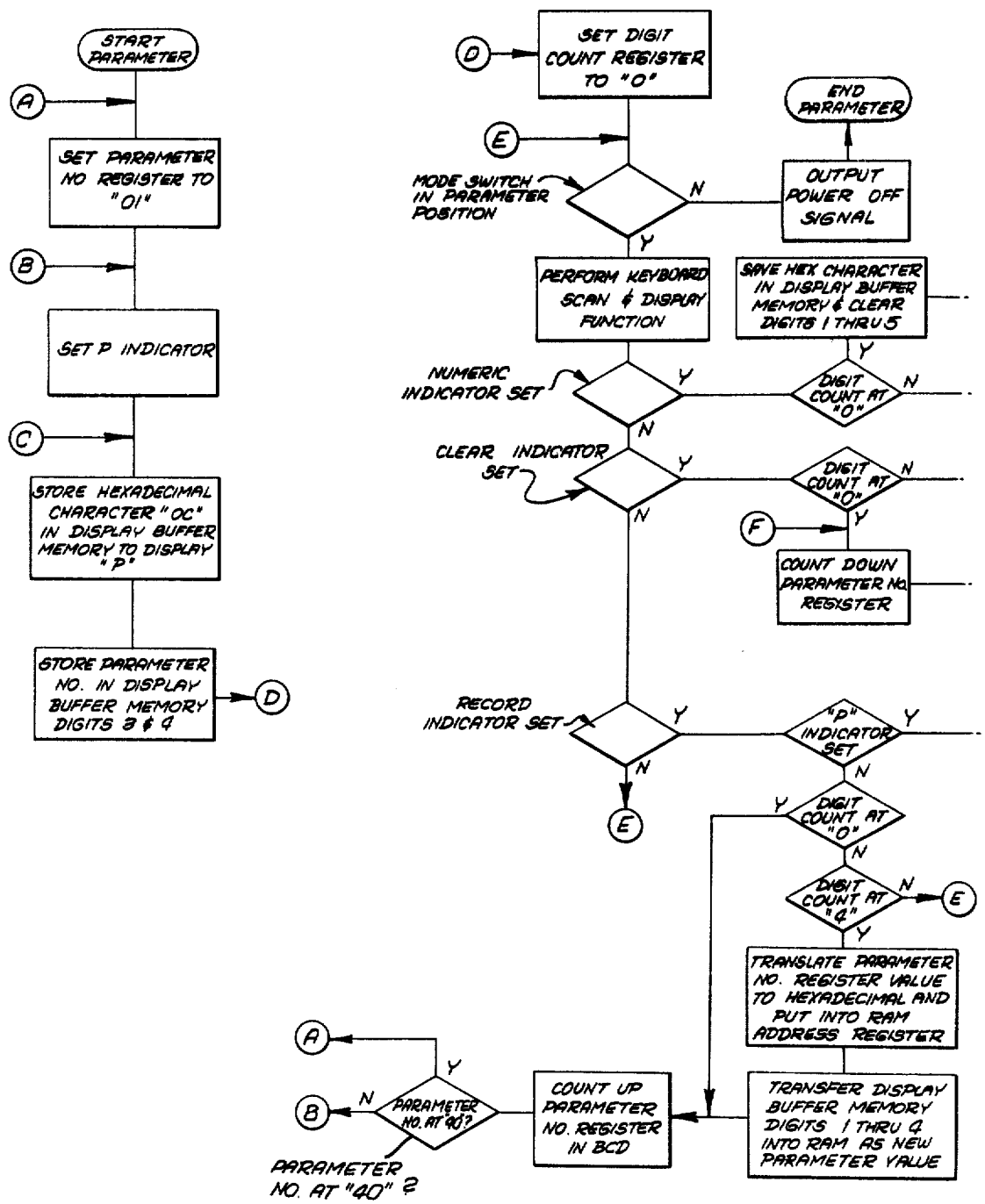
FIGS. 23a and b, 23c and d, and 23e are three flow charts of the parameter mode of operation for the customer satisfaction terminal of FIG. 1.
Figure 23B:
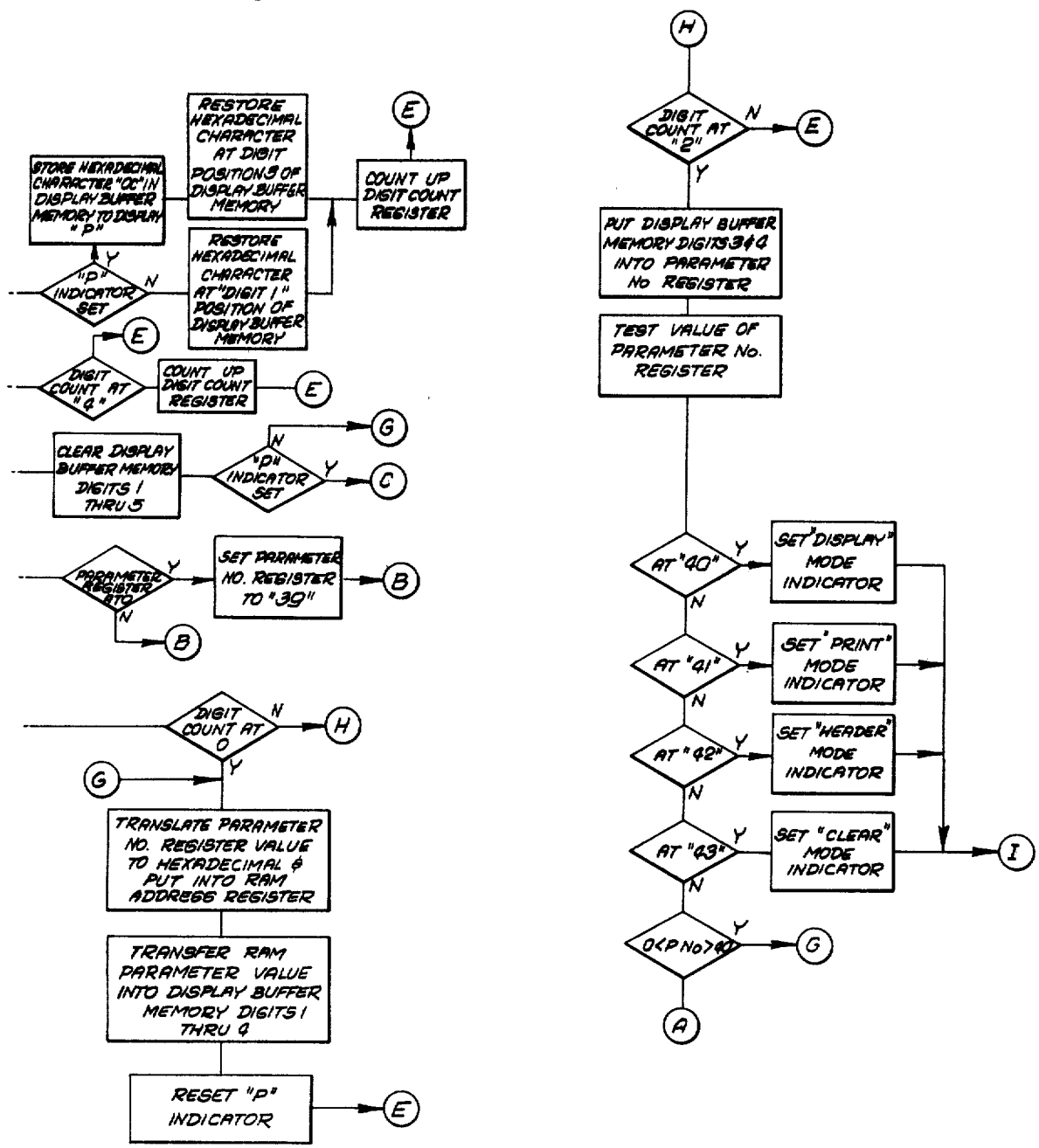

If during the keyboard scan and display operation a numerical key is actuated for either proceeding to a new parameter number, or to enter a new parameter value, the display buffer memory is first cleared when the first numerical digit is entered into the terminal CST. The first character in the buffer memory, however, is saved in a temporary controller register of the microprocessor MC before the display buffer memory is cleared. Following this operation, the P indicator is tested to determine if it is set, and if it is set, and the hexadecimal character is re-stored at the digit 3 position of the buffer memory along with the hexadecimal character "0C" at digit 1 position. At this time the digit count register is counted up and the operation will proceed to point E to display PN. As shown in view B of FIG. 24, when numerical key No. 2 is operated, for example, P2 is displayed (N=2). This will cause the parameter numbers to jump to whatever value is keyed in, rather than be sequentially displayed as described hereinabove. If the test resulted that the P indicator was not set, the "no" branch would be followed as illustrated in FIG. 23b. This will cause the "saved" hexadecimal character to be restored at digit 1 position of the buffer memory and will be displayed as the first digit of a new parameter value. If the "2" key had been operated, the display 20 would show view C of FIG. 24. If during this latter operation a second numerical key is operated, another digit will be displayed. In restoring the characters in the buffer memory, the last step before proceeding to point E was to count up the digit count register and therefore it is no longer at "0". Since it is assumed that it is not at "4", the digit counter is counted up and the operation proceeds to point E. If the numerical key selected is the "3" key, the display 20 will display the view D of FIG. 24 if the P indicator has been set, signalling parameter No. 23. If the P indicator has not been, the parameter value of 23 will be displayed as per view E of FIG. 24.

Returning to FIG. 23-a, it should be noted if the clear key is set and the digit count is not at "0", then the flow is to the right (FIG. 23b) of the operation for clearing the display buffer memory digits 1 through 5. This indicates that the numerical digits have been entered into the display buffer memory. If after this interval the P indicator is determined to have been set, then, the operation proceeds to point C. After returning to point C, the prior parameter number is set. If the P indicator is not set, the operation proceeds to point G to recall and display the prior parameter value. This is accomplished after jumping to point G (FIG. 23B) by translating the parameter number register value to a hexadecimal address number by means of Table VI and placing it into the address register for the memory PM. After reading out the parameter value at the addressed position, it is stored in the display buffer memory digit positions 1 through 4 and then the P indicator is reset and the operation proceeds to point E to then display the prior parameter value.

If, after the numerical keys are operated, the record key is operated but the P indicator is not set, and 4 digits have been keyed into the display buffer memory, the parameter number register value is translated to a hexadecimal address per Table VI and placed into the RAM address register of the memory PM. These operations can be appreciated by examining FIG. 23-a through the record indicator set diamond "yes" branch, P indicator set to "no" branch and examining the digit counts at 0 and then at 4 and through the respective no/yes lines to the translate the parameter number register value block. The final step is the transfer of the display buffer memory digits 1 through 4 into the memory PM as a new parameter value at the addressed position. After that the flow is to the left so as to count up the parameter number register in binary coded decimal and the operation proceeds to point B to display the updated parameter number.

In following this flow path, if the record indicator is set, but the P indicator is set and 2 digits have been keyed into the display buffer memory, the flow is to point H. With the digit count at 2, those 2 digits are transferred to the parameter number register and their value is subsequently tested to see if they are for a parameter function code of 40, 41, 42 or 43 (FIG. 23-b). If a "yes" answer results from the parameter number being at 40 then the display mode indicator is set. If a "yes" is produced at 41, the print mode indicator is set. At 42, header mode is set. At 43, the clear mode indicator is set. At the end of the setting of any one of these indicators the operation proceeds to FIG. 23-c at point I. If the parameter number key is not a function code (40–43) and its value lies between 1 to 39 the operation proceeds to point G to display the value of that parameter.

If one of the function code parameters 40, 41, 42 or 43 has been selected as indicated hereinabove, the operation proceeds to point I in FIG. 23-c. At point I, a mode display message consisting of 3 hexadecimal characters is stored in the display buffer memory at digits 1–3. As indicated in FIG. 23-c, Look-up table VII will provide the hexadecimal characters that will translate the mode indicator for proper display.

TABLE VII

MODE INDICATOR TO HEXADECIMAL MESSAGE CHARACTERS TRANSLATE TABLE

|  | HEXADECIMAL CHARACTER | | |
| --- | --- | --- | --- |
| INDICATOR | DIGIT 1 | DIGIT 2 | DIGIT 3 |
| DISPLAY MODE | 0A | 0B | 0C |
| PRINT MODE | 0C | 0D | 0E |

TABLE VII-continued

MODE INDICATOR TO HEXADECIMAL MESSAGE CHARACTERS TRANSLATE TABLE

|  | HEXADECIMAL CHARACTER | | |
| --- | --- | --- | --- |
|  | DIGIT 1 | DIGIT 2 | DIGIT 3 |
| HEADER MODE | 0F | 10 | 0A |
| CLEAR MODE | 11 | 12 | 0D |

The hexadecimal characters will be translated to seven segment data by means of Table IV. The seven segment data will display the messages of FIG. 25 in accordance with the hexadecimal digits stored in the buffer register. Table VII and FIG. 25 can be related by means of the hexadecimal characters that are stored in the digits position. For example, for the "display" mode, the hexadecimal characters OA, OB and OC are stored in digit positions 1 through 3, the resulting message is dSP on the digital display 20, once translated by means of Table IV. Similar relationships can be found in regard to the other three display modes. The print mode message is displayed as Prn. The header mode is signalled by the letters HEd. The clear mode by Clr. After the translation is effected, as noted in FIG. 23-c, the keyboard scan and display function is performed.

If, after the time that the display function is performed, the clear key is operated, then the operation proceeds by means of the "yes" branch to point B or FIG. 23-a. This will cause the parameter number to be redisplayed so that another function code parameter may be selected. The setting of the numerical indicator is ignored in this procedure unless the print indicator is also set, in which case the digit count is set to 1 to indicate the entry of the report number to be printed.

When the record indicator is set (FIG. 23-c), this is the signal to proceed with the selected mode operations and the mode indicators are examined to determine which parameter function to perform.

If in following the flow chart of FIG. 23-b it is determined that the parameter number register, FIG. 15, stores the decimal digit 43, the clear mode indicator mode is set. The operations then proceed to Point I of FIG. 23-c. When the terminal is in the clear mode there is a resetting to "0" of all of the individual answer bits, numerical bits and correlated tally counts, as will be described. In proceeding to point I of FIG. 23-c, the operations that are performed at the look-up table mode to translate the indicator to a hexadecimal character per Tables VII and IV and FIG. 25, as described hereinabove.

Figure 25:
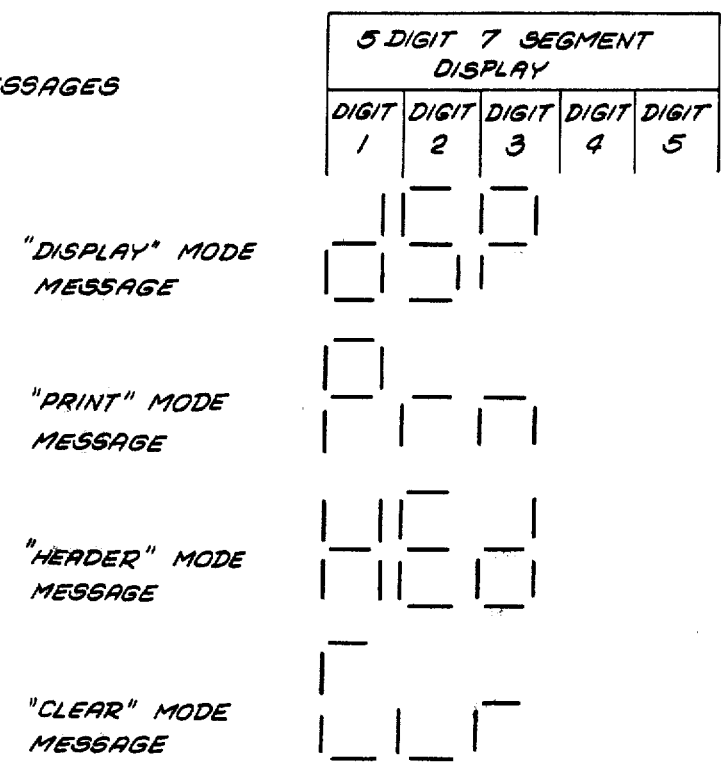
FIG. 25 is a diagrammatic representation of the messages and their mode of display on the digital display of the customer satisfaction terminal.

By reference to Table VII, it will be seen that the clear mode indicator references hexadecimal characters 11, 12, and 0D. To display the clear mode message or the message Clr as indicated in FIG. 25, these three hexadecimal characters will be seen from referring to Table IV to display the letters Clr. Accordingly, the seven segment data represented in Table IV opposite the hexadecimal characters 11, 12 and 0D will be applied to the five digit seven segment display so that the clear mode message will be displayed at positions 1, 2 and 3. After the operation has been accomplished, the keyboard scan and display function is produced. Following this, it will be determined that neither the clear indicator, nor the numerical indicator have been set. Since the record indicator has been set, the procedure proceeds to the clear mode indicator which has been set, so the "yes" branch follows. The next operation is to set the address register for the permanent memory PM to the address of the first tally count therein. In referring to Table I, the first tally count would be the answer number 1A and so the hexadecimal address to be first examined is the address 58. After the address has been located, then an 0,0 is stored at address 58 to clear the tally counter. The address is next tested to determine whether it is equal to A7 as noted in the left arm of FIG. 23-c. A7 is the hexadecimal address of the last tally count stored in the permanent memory. If the address register is not at address A7 then the address is counted up to the next tally count and the clearing of the stored tally counts are repeated. These operations continue until all the tally counts have been reset and then the operation proceeds to point B of FIG. 23-a when the testing of the address equal to A7 is determined to be "yes". At point B the clear mode parameter number is displayed.

DISPLAY TALLY COUNTS—PARAMETER MODE

If the parameter number register FIG. 15 indicates the decimal number 40 then the "display" mode is signalled. In the display mode, all of the answer bit tally counts for questions number 1 through 10 as well as the tally counts for question number 11 with respect to the numeric digits 0 through 9 are displayed on the digital display 20. Accordingly, as indicated in FIG. 23-a, the display mode indicator is set and the procedure follows the FIG. 23-c at point I. As in the clear mode the table look-ups mode is entered and Tables VII and IV will provide the correct hexadecimal characters OA, OB and OC for displaying the display message dSP on the digital display 20. These three letters will be displayed at digits 1, 2 and 3 in the mode display illustration of FIG. 25. After the look-up mode is accomplished, the keyboard scan and display function is performed. Since the clear indicator has not been set, the numeric indicator is not set, but the record indicator is set, the test is made for the clear mode indicator. At this point the clear mode indicator has not been set, so the "no" decision branch is followed from the diamond shaped element to point J of FIG. 23-c. At point J there is a test as to whether the display mode indicator has been set and since it has just been set the answer is "yes".

When the display mode is first selected, as a result of the operation of the record key, the address of the tally count for the total number of valid entries accepted is put into the permanent memory address register of FIG. 15. As noted in Table I this RAM address value is the hexadecimal character A8. At hexadecimal address A8, A9, the tally count of all the entries that have passed the low limit and the high limit validity test are stored as evident from Table I. The four digit packed BCD tally count that is stored at the A8, A9 address is transferred to the display buffer memory digits 1 through 4 positions, see FIG. 14. The display function is performed to display the readout tally count value.

Figure 23C:
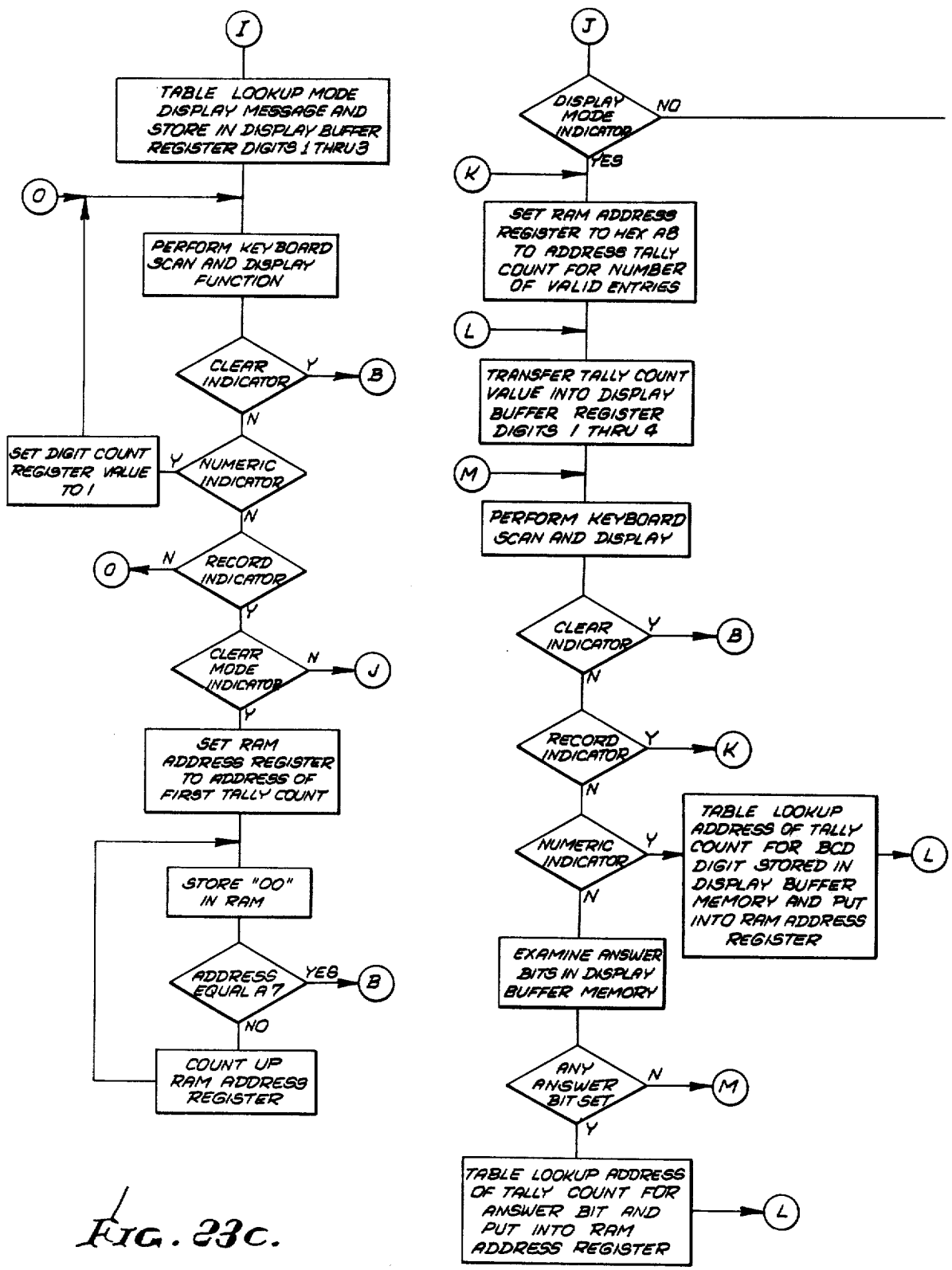
Figure 23D:
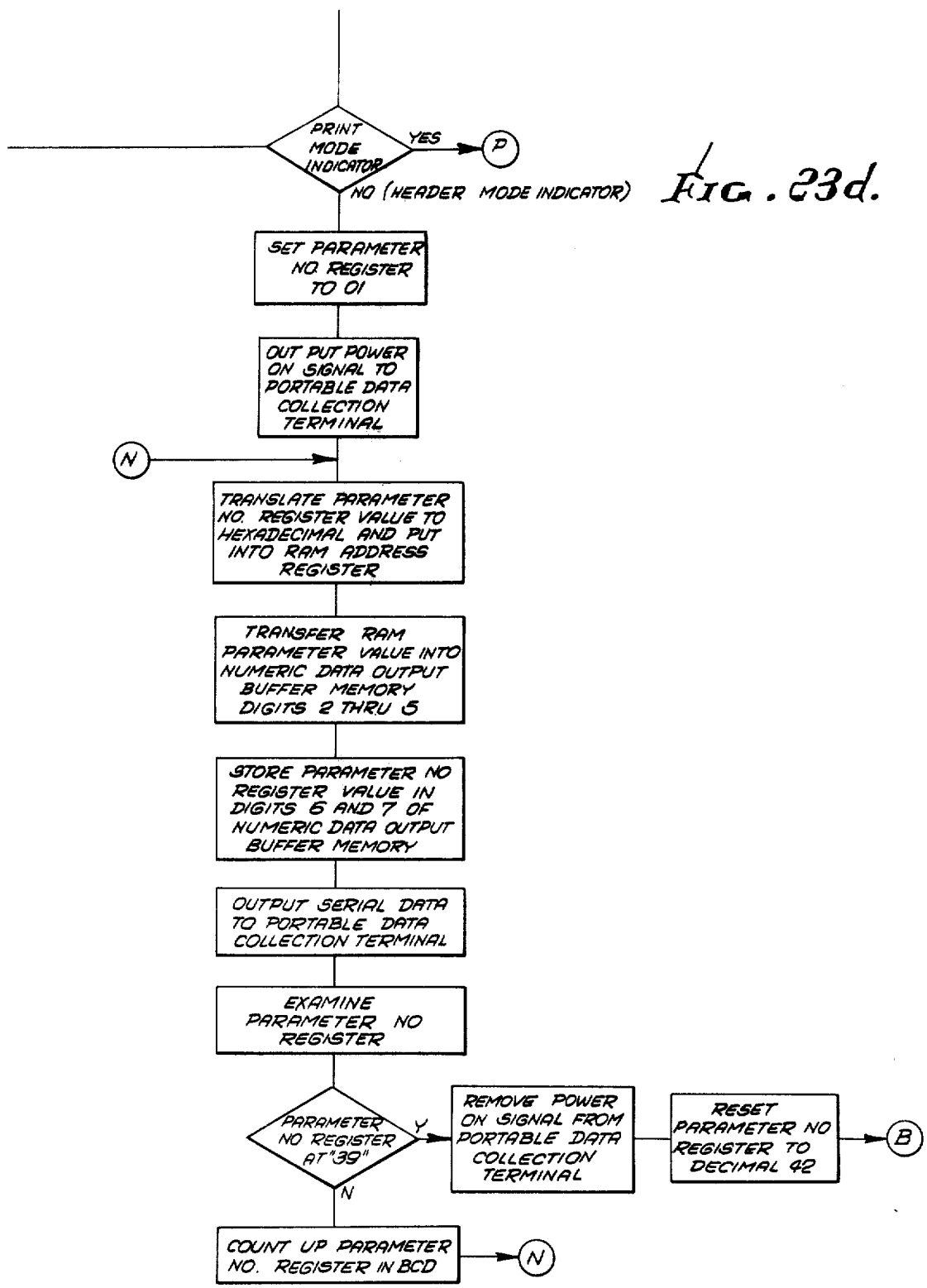
Figure 23E:
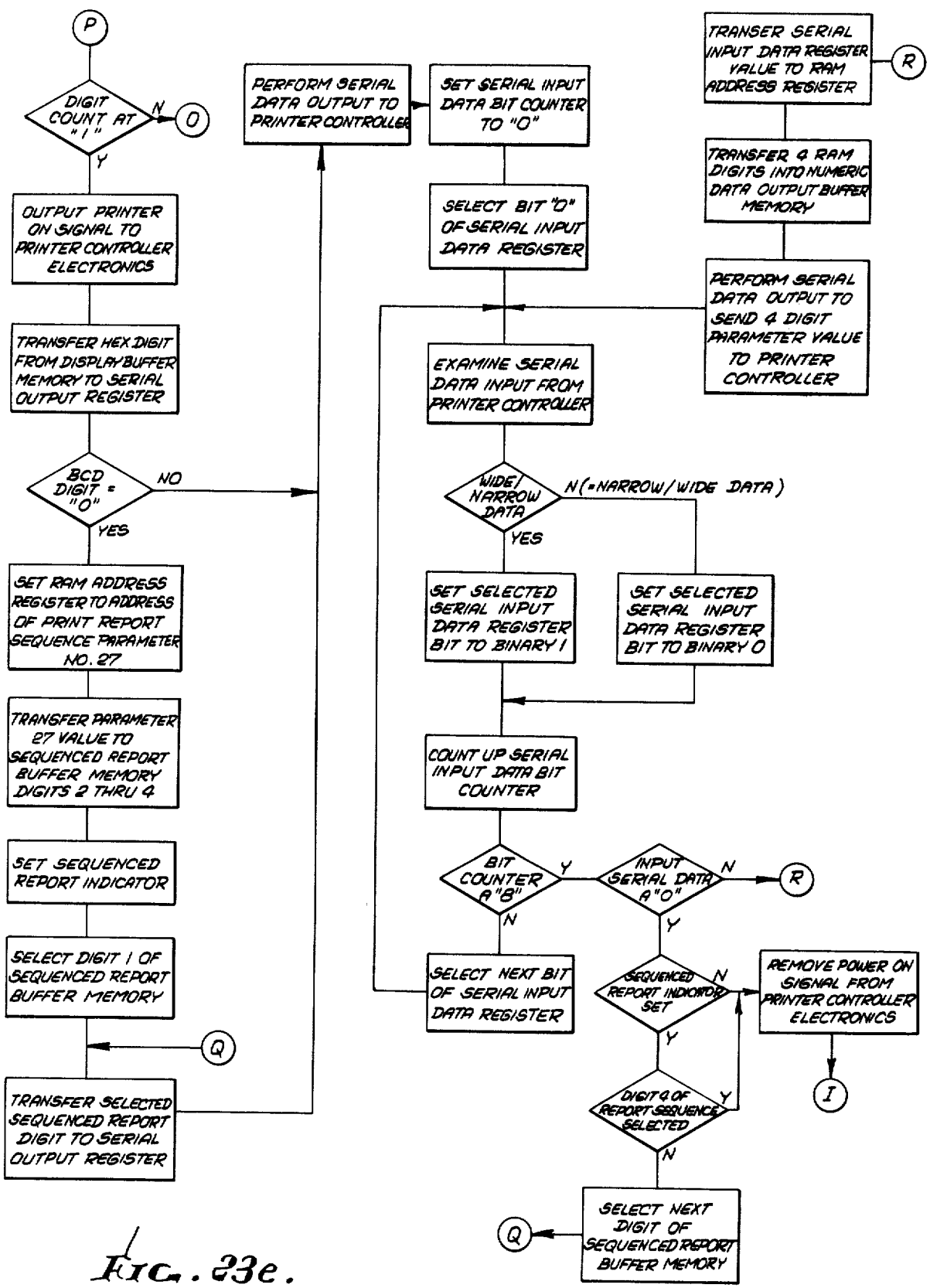

While discussing the portion of the flow chart of FIG. 23c headed up at point J, and after performing the scan and display function, if the clear key is operated so that the clear indicator is set, then the operation proceeds to point B of FIG. 23-a to again display the parameter number. Similarly, while considering the loop headed up by point J of FIG. 23-c, if the record indicator is set, the operation proceeds by means of the "yes" branch to point K of the same loop headed up by point J. Point K is immediately below the display mode indicator diamond symbol. At this point, then, the record description described immediately hereinabove is repeated, as will be appreciated from examining the flow chart of FIG. 23-c. Also, during this aforementioned scan and display function, if the numerical indicator is set the branch to the right will be followed to examine the translation table for the answer bit and hexadecimal memory character to locate the addresses in the permanent memory PM of the tally counter. This translation is found in Table V in the right hand portion thereof. The resulting permanent memory address is placed into the address register of FIG. 15. After this procedure, the operation proceeds to point L in the loop headed up at point J of FIG. 23-c. At point L the tally count values are transferred into the display buffer register digit positions 1 through 4 and the tally count display operations previously described are repeated.

If during this same display operation no indicator is set, then the display buffer memory answer bits are examined to determine if there is an answer bit stored. This will be noted by noting the diamond symbol for the numeric indicator following the "no" branch. If an answer bit is located, then it is translated by means of Table V, the left hand portion thereof, to determine the address in the permanent memory for the corresponding tally counter. After the address is located and placed into the permanent memory address register the procedure jumps to point L of the same branch of FIG. 23c. The tally count display operations are then repeated by following through the same arm of the flow chart. It should now be appreciated that all of the information stored in the permanent memory PM can now be examined on a tally count, by tally count basis by the establishment utilizing the customer satisfaction terminal CST.

HEADER/PARAMETER MODE

The next operation that is tested by means of the parameter number in the parameter number register of FIG. 15 is to test for the "header" mode. If the parameter number register stores the number 42, the "header" mode indicator is set and the procedure continues from FIG. 23b at point I to FIG. 23c, point I. As in the display and clear modes, once the header mode is signalled, the necessary translation by means of Tables VII and IV for displaying the header mode message on the digital display 20 is performed after proceeding to point I. The header mode message as illustrated in FIG. 25 are the letters HEd. In order to obtain the letters HEd as recorded in Table VII, the hexadecimal characters for the first three digits of the digital display 20 are the characters OF, 10 and OA. In translating these three characters on the basis of Table IV, it will be noted that the necessary seven segment data is defined for defining the letters HEd. After this operation is performed, the left hand arm of FIG. 23-c is followed to perform the keyboard scan and display function. Since the clear indicator and the numeric indicator are not set at this time, and the record indicator is set, but not the clear mode indicator, the procedure jumps to point J, the right hand arm of FIG. 23-c. At point J it is determined whether or not the display mode indicator has been set and since the answer, in this instance, is "no" the procedure follows to the right to the print mode indicator diamond. This latter decision will be "no" thereby signalling that the header mode has been set and the arm of FIG. 23-d is followed.

TRANSFER OF HEADER VALVES TO TSM—PARAMETER MODE

The first operation is to set the parameter number register to 01 and then a "power on" signal from the main controller MC is coupled to the portable data collection terminal TSM. This places the terminal TSM in condition to receive all of the header mode parameter values for parameters 1 through 39. In order to transfer the parameter number register values to the data collection terminal TSM, it is necessary to locate the parameter information in the permanent memory PM and transfer it to the data collection module TSM. For this purpose Table VI is used to translate the parameter number to a hexadecimal address in the permanent memory PM for reading out parameter data. Once the parameter numbers are translated to the memory PM addresses, the information at the addressed location is transferred into the number data output buffer. The four digit addressed parameter value is transferred to the digits 2 through 5 positions of the numerical data output buffer memory as illustrated in FIG. 19. In addition, the parameter number register value is stored in digits 6 and 7 of the same buffer memory. The next operation is to transfer the data just stored in the numerical data output buffer memory to the serial output register of FIG. 19 for transmitting it to the data collection terminal TSM. After this operation is completed, a test is performed to examine the parameter number of the register to determine whether it is at "39" or not. If it is not at 39, the parameter number register is counted up 1 and the procedure reverts back to point N, FIG. 23-d. At point N the translation is again made by means of Table VI of the new parameter number register value to locate the hexadecimal address of the next parameter number in the permanent memory PM. The steps then repeat through FIG. 23-d. These operations are repeated until all the parameter values for parameters 1 through 39 have been transferred to the data collection terminal TSM. When the decision point is once again reached as to whether the parameter register is at "39" or not and the answer is "yes", then at this point the "power on" signal is removed from the data collection terminal TSM. After the power is removed from the module TSM, the parameter number register is reset to the decimal number 42. When the parameter number register has been reset, the operation proceeds to point B of FIG. 23-a in the left hand arm thereof. After jumping to point B, the parameter number 42 is displayed. This completes the header mode operation.

The serial storage of the parameter number and the associated parameter values as viewed by the operator in a sequential mode will appear the same as illustrated for Report No. 1 after the "standard header" reproduced hereinbelow. This parameter information can be used by the service organization establishment to convert the parameter numbers to the related questions for obtaining the text of the questions that have been used on the terminal CST.

PRINT/PARAMETER MODE

The next program function is referred to as the "print" mode. If in FIG. 23b the test of the parameter value in the parameter number register indicates that the parameter number is 41 then the yes path is followed from the "at 41" diamond symbol and the print mode indicator is set. As in the previous programmed functions, the procedure goes to point I of FIG. 23c. At point I in FIG. 23c the necessary translations are made to display the letters Prn for displaying the print mode message on the digital display 20 as indicated in FIG. 25. This is performed by means of the translations for identifying the hexadecimal characters in Tables VII and IV to produce the desired Prn letters, as previously described. The hexadecimal characters OC, OD and OE as translated by Table IV will produce the necessary train of binary signals to display the desired print mode message. After this translation is effected the keyboard scan and display operation is performed and the series of tests, as previously explained are run thereafter. With no numeric indicator set and with the record indicator set and no clear mode indicator set the procedure jumps to point J. At point J the display mode indicator is determined as not being set and so the procedure is to the right of FIG. 23c. In view of the setting of the print mode indicator, th procedure follows to the right to point P. Point P is found in FIG. 23d and e.

The print mode initiates operation of the report printer P by sending it the report number of the report that is to be printed out.

As the selected report is being printed, the printer controller or microprocessor requests by means of a printer serial data input to the main controller MC various four digit parameters and/or tally count values from the permanent memory PM, see FIG. 8. The detailed operation of the printer controller and associated electronics will be described hereinafter.

Returning to FIG. 23e to point P, when a numeric digit for the report number has been entered by the operator it is indicated by a digit count value of 1. The print mode operation will not begin if the digit count is not at "1" and the procedure jumps to point "O" in FIG. 23-C and those previously described operations are repeated. Assuming that the digit count is at 1, the "yes" branch of the diamond symbol will be followed. As a result the "printer on" signal is coupled to the printer by means of the microprocessor MC, as illustrated in FIG. 8. After the printer P has the power applied thereto, the hexadecimal digit stored in the display buffer memory, which represents the report number desired by the user, is transferred to the serial output register of FIG. 19 and tested for a value of 0. If report number 0 has not been selected, then the serial output function is performed to output the report number, by means of the "no" branch of the diamond symbol, to the printer controller and will be explained hereinafter.

Figure 26:
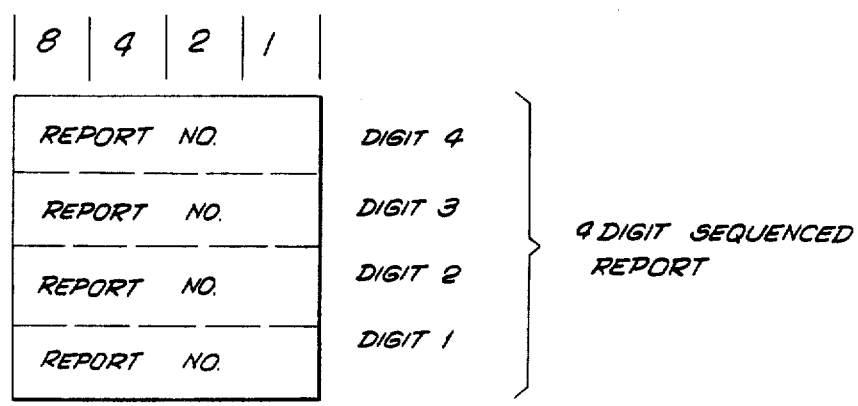
FIG. 26 is a diagrammatic representation of the sequenced report arrangement in the memory for use by the printer.

If report number 0 is selected, then a dedicated sequencing of the reports is desired. The use of the sequenced report parameter eliminates the need for the establishment to attend the terminal CST or to print out all the reports. At this point the digit equals 0 test will follow the "yes" line which will cause the permanent memory address register of FIG. 15 to address a print report sequence parameter number No. 27, per Table VI. The parameter number No. 27 value that is addressed is transferred from the permanent memory PM to a sequenced report buffer memory to the position of digits 1 through 4. The sequence report buffer memory organization is illustrated in FIG. 26. The next step is to set the sequenced report indicator in the controller register, as illustrated in FIG. 15. The indicator bit number 9 is the sequenced report indicator assignment. The next operation is to select the digit 1 of the sequenced report buffer memory of FIG. 26. This report digit is transferred to serial output register of FIG. 19. The procedure then goes on to perform the serial data output to the printer controller and the operation is at the same point as when the binary coded digit test described hereinabove indicated that the digit was not 0.

After the serial data is output to the printer controller, the serial data bit counter of the controller register of FIG. 15 is set to 0. After it is set at zero, the 0 bit of the serial input data register of the controller register of FIG. 15 is selected and then the serial data input from the controller is examined. At this point the printer P is asking for information. The format for communication between the printer controller PC and the main controller MC is the same wide-narrow pulse relationship described hereinabove. The serial data input from the printer controller is examined to determine whether it is a 1 or a 0 by examining the wide-narrow or narrow-wide relationship and setting a 1 or 0 accordingly into the serial input of FIG. 15. After the binary 1's and 0's are stored, the data bit counter of the controller register of FIG. 15 is counted up. The data bit counter is counted up until 8 bits have been received. If the 8 bits received are not all zeros, then they are transferred to the permanent memory address register and the 4 digit parameter or tally count value at that address is transferred from the permanent memory PM to the numeric data output buffer of FIG. 19 and subsequently serially transferred to the printer controller PC. These procedures follow from point R of FIG. 23e. The serial data output to the printer controller is performed in accordance with the steps illustrated in FIG. 21. After the data is transmitted to the printer controller the flow is back to the operation of examining data input from the printer controller.

If the test of whether or not the serial data input is a "0" (all 0's) is a "yes", this signals that the report is finished. Following this flow path, if the sequence report indicator is not set, the power is removed from the printer controller electronics and then the procedure commences at point I of FIG. 23c. At that point, the print mode display message is again displayed so that the user may select another report number. If the sequence report indicator is set, then the "yes" branch of the diamond symbol is followed and digit number 4 of the sequence report buffer memory is tested to determine whether it has been selected or not. If it has been selected then the "yes" branch is followed and the power is removed from the terminal. If it has not been selected, the next digit of the sequence report buffer memory is selected and the procedure goes to the point Q in the left hand arm of FIG. 23e. At that point, the next sequence report digit is transferred to the serial output register and the procedure goes back through the loop once again. This continues until all the four report numbers in the sequence report buffer memory have been output to the printer controller and all four reports have been printed. This completes the print mode.

REAL TIME CLOCK

The real time clock RTC was described in conjunction with FIG. 8. The RTC applies one cycle per minute to the main controller MC. The signals from the real time clock RTC are stored in the permanent memory PM. The permanent memory has a counter to count up the minutes from 0 to 60, another counter to count up the hours from 0 to 24, and individual counters to count up the days of the month and the months of the year from 1 through 12. The days of the month are examined relative to Table VIII. Table VIII records the number of days in each month of the year, plus one day.

TABLE VIII

| | | DAYS IN MONTH PLUS 1 DAY |
|---|---|---|
| | 01 | 32 |
| | 02 | 29 |
| | 03 | 32 |
| | 04 | 31 |
| MONTH | 05 | 32 |
| COUNTER | 06 | 31 |
| VALUE | 07 | 32 |
| | 08 | 32 |
| | 09 | 31 |
| | 10 | 32 |
| | 11 | 31 |
| | 12 | 32 |

Figure 27:
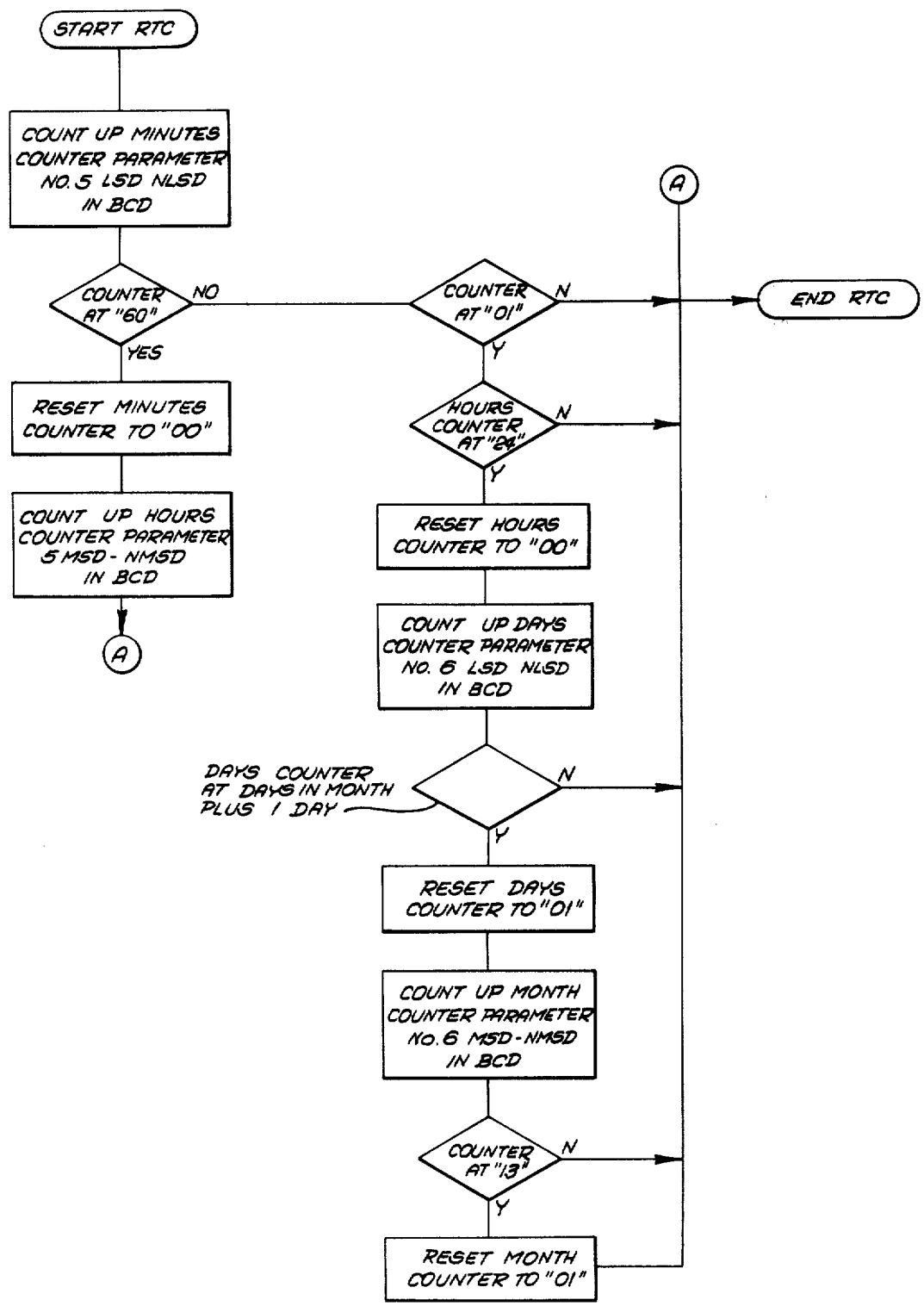
FIG. 27 is a flow chart of the procedure for recording the real time.

In starting the real time clock operation the flow chart of FIG. 27 should be examined. The real time operation is considered in conjunction with the values for parameters number 5 and 6 stored in the permanent memory PM. The minutes counter of the memory PM is considered to be the least significant digit and the next least significant digit of parameter number 5. Accordingly, this minutes counter is counted up and then tested to see if it is at 60 minutes. If it is at 60 minutes then it is reset to 00, and the hours counter, which is considered to be the most significant and the next most significant digits of parameter number 5, is counted up. After this, the operation proceeds to point A of FIG. 27 to terminate the RTC operation.

If the minutes counter is not at 60, then the test is to determine whether the counter is at 01. If it is not at 01 then the time clock operation is terminated. If it is at 01, then the hours counter is tested to see if it is at 2400 hours. The hours are counted on a 0000 through 2400 hour format (military time) so that the hours continue from 1200, 1300, etc, to 2400, 0000, etc. If the hours counter is not at 2400, then the real time clock operation is terminated. If it is at 2400, then the time of 2401 is a new day and the hours counter is reset to 0000 and the days counter is counted up. The days counter is the least significant digit and next least significant digit in binary coded decimal of parameter number 6. The next sequence of operations illustrated in FIG. 27 is the testing to determine if the days counter represents a value that is equal to the days in the month plus one day, as stored in Table VIII. If the days counter is equal to the value stored in Table VIII, then a new month is in existence and the days counter is reset to 01 and the month counter is counted up. The month counter is formed by the most significant digit and the next most significant digit of parameter number 6. When the month counter reaches 13 it is reset to the first month of the year. This is determined by examining the counter for the months to determine whether it is 13 or not, per FIG. 27.

The above described operation continues for every one cycle per minute input to the main controller MC. It will be recalled that the output of the divide element D60 is applied to the clock input of the flip-flop FF1 so that if the power is not already on the terminal CST, it powers on the terminal for a short interval, as previously described. Once the new time clock information is recorded, the power off signal is applied by the main controller MC to reset the flip-flop FF1 and the power is removed from the terminal.

PRINTER (PARAMETER MODE)

Figure 28A:
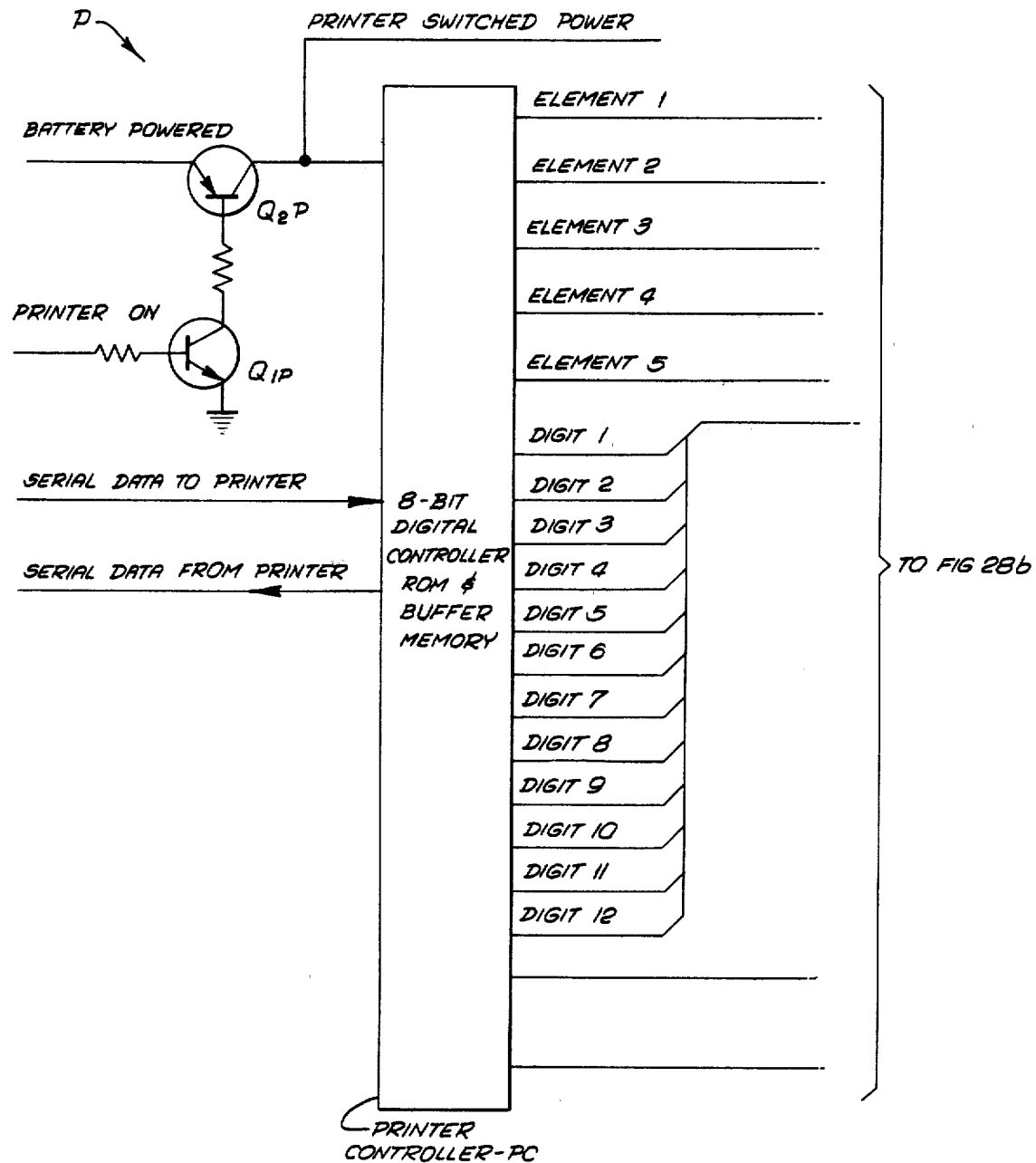
FIGS. 28a and 28b are logic diagrams of the control electronics for the printer control network.
Figure 28B:
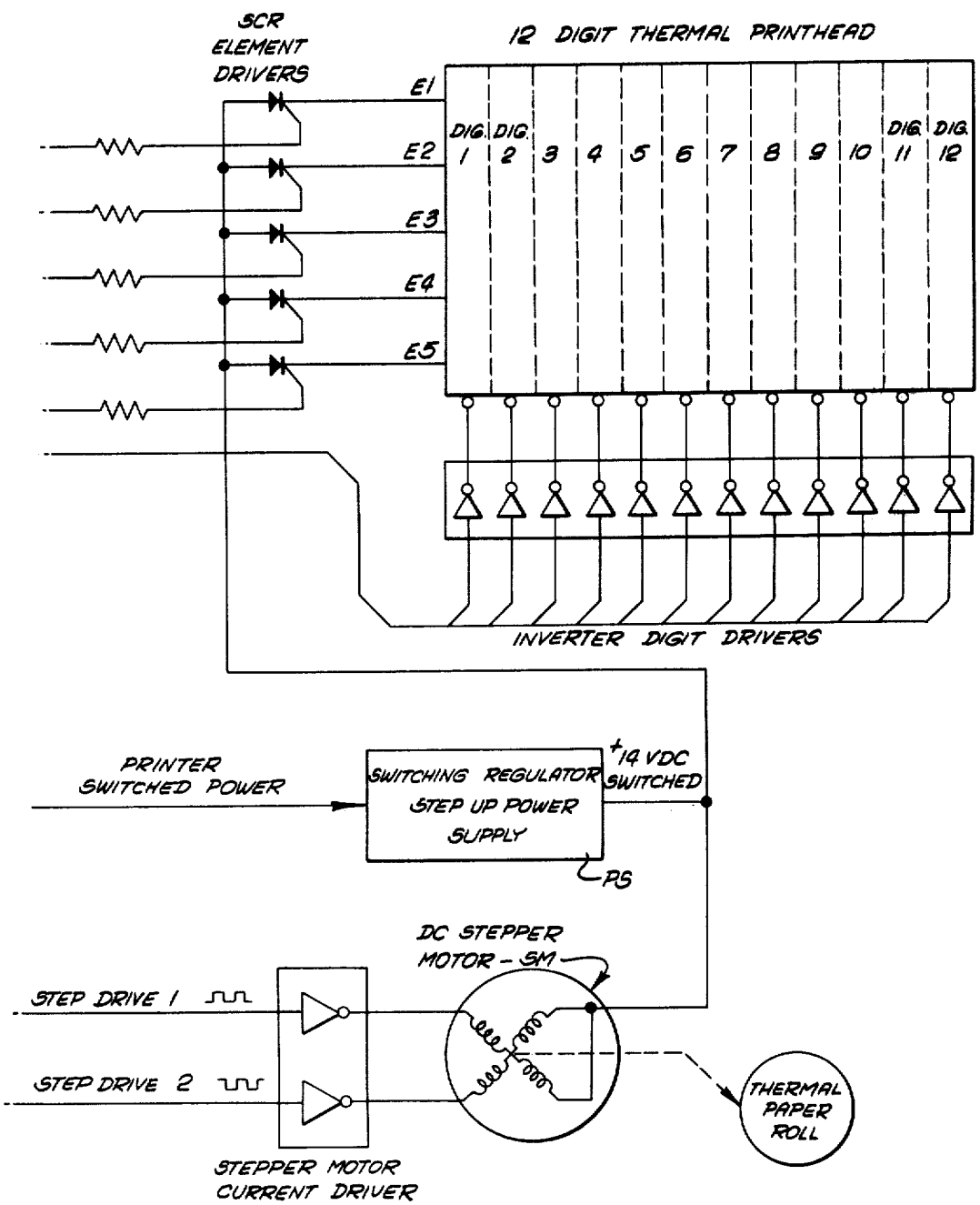
Figure 33:
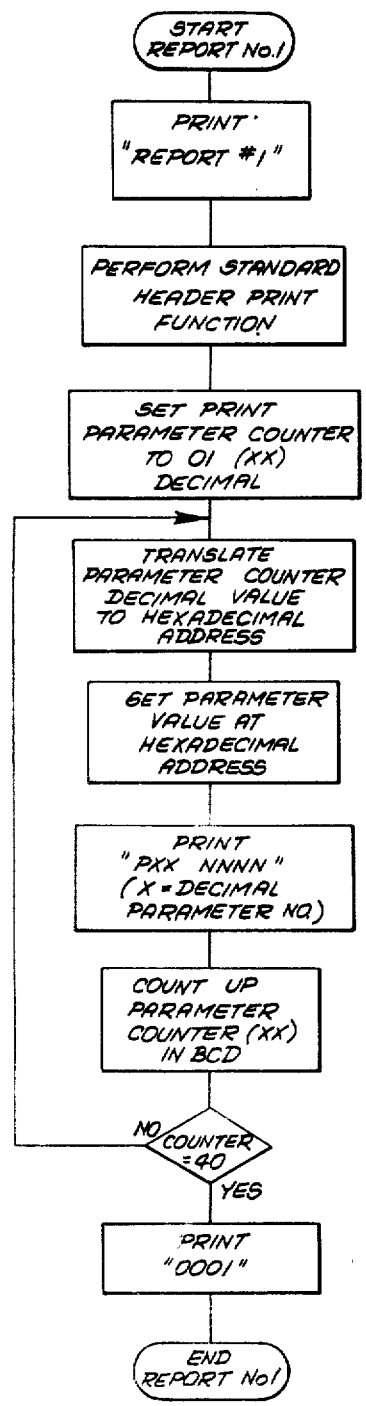
FIG. 33 is a flow diagram for printing out "report No. 1" by the thermal printer.
Figure 29:
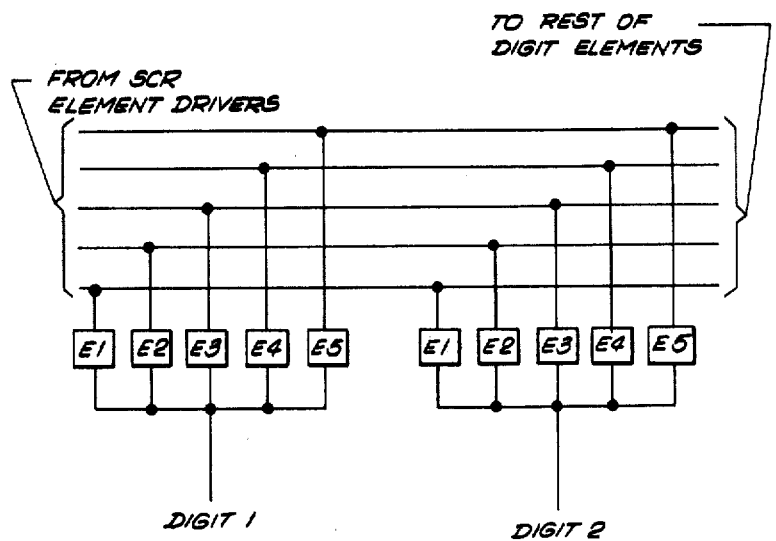
FIG. 29 is a schematic illustration of the actuation network for the printer elements of the thermal printer.
Figure 30:
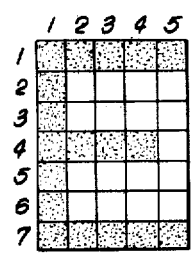
FIG. 30 is an illustration of the 5×7 dot matrix for a typical character as printed out by the thermal printer.

The printer P for the terminal CST will now be examined in detail in conjunction with FIGS. 28-30. The printer P provides a printed out hard copy of the various reports which are based on the parameter and tally count data stored in the permanent memory PM, as previously described. The printer P has its own microprocessor and is illustrated in FIG. 28 as the printer controller PC. This controller PC is used to perform the same type of functions as those described for the main controller MC. The printing mechanism per se is a commercially available, twelve column thermal printer which prints on heat sensitive paper in a 5×7 dot matrix format.

In FIGS. 28a and 28b, the logic diagram for the printer electronics is illustrated. The electronics includes the switching transistors Q1P and Q2P. These printer module transistors receive signals from the main controller MC as illustrated in FIG. 8. The "printer on" signal is coupled from the main controller MC to the base electrode for the transistor Q1P. Battery power for the printer module is coupled from FIG. 8 directly to the emitter electrode of the transistor Q2P. The collector electrode of the transistor Q1P is coupled to the base electrode of the transistor Q2P through a resistor. The emitter electrode of the transistor Q1P is connected directly to ground potential. The collector electrode of the transistor Q2P is coupled directly to input the battery power to the printer controller PC. A "printer switched power" line is coupled also to the collector electrode on the transistor Q2P for powering other elements of the printer module. The "serial data to printer" and "serial data from printer lines", identified in FIGS. 8 and 28 are coupled between the controllers and MC and PC as illustrated. The printer controller PC provides the signals to the printing lines to the printing elements 1 through 5 for each digit position. The printing lines are illustrated with individual silicon controlled rectifiers, SCR's, coupled to the individual lines from the printer controller PC at their gate electrodes for driving the elements E1 through E5. The printing elements are arranged to print in one of the five areas of the 5×7 format. A typical arrangement for two digits is illustrated in FIG. 29. It is understood that the remaining digits 3 through 12 are similarly arranged in parallel circuit relationship. The signals for digits 1 through 12 for the 12 digit thermal printhead are also outputted from the printer controller PC to inverter digit drivers coupled to the 12 digit thermal printhead. The "printer switched power" is coupled to a block identified as a "switching regulator step up power supply", PS, which provides the plus 14 volt DC switched output voltage. This output is applied to the anode electrodes of each of the SCR element drivers for the printhead. The remaining electrodes for these SCR drivers are coupled to the thermal printhead elements E1-E5, as illustrated in FIG. 29. The 14 volts switched power supply is also provided to actuate or energize the DC stepper motor SM for advancing the paper as the printing procedure proceeds. This is shown in diagrammatic fashion in FIG. 28 as a thermal paper roll which is incrementally advanced by the stepper motor SM. The stepper motor SM is powered by pulses from the printer controller PC which are illustrated as step drive 1 and step drive 2 pulses applied through current drivers to the individual windings for the stepper motor SM.

The operation of the printing module P will now be briefly described. A high level "printer on" signal from the main controller MC when applied to the base electrode of the transistor Q1P causes it to be rendered conductive which renders the transistor Q2P conductive and applies a printer switched power signal to the printer controller PC and to the switching regulator power supply PS. The output voltage from the power supply PS, the plus 14 volts DC, is applied to the five silicon controlled rectifier element drivers and to the DC stepper motor SM. As descried hereinabove in conjunction with the parameter mode print function of the main controller MC, after the printer controller PC has power applied thereto the main controller MC sends the printer controller PC a report number to be printed by way of the serial data to the printer line. As the printer prints the selected report, the printer controller PC requests various data from the permanent memory PM. This is accomplished by sending the data to the main controller MC by way of the serial data from printer line, as illustrated in FIG. 28a, the address of where the data is located in the permanent memory PM. The main controller MC then retrieves this data and serially outputs it to the printer controller PC on the line "serial data to printer" as illustrated in FIGS. 8 and 28a. The actual printing is accomplished by means of the large character tables stored in the printer controller PC read only memory (ROM) which contains the row and column type information for printing in the 5×7 dot matrix format as illustrated in FIG. 30. The printing procedure is conventional and is known in the art. The printing procedure proceeds from the proper selection of the printing elements and digit positions to allow the DC voltage from the power supply PC to be applied to any of the five elements for any one digit to cause heat to be generated and the resultant darkening of the heat sensitive paper opposite the printhead. After the elements have been properly energized for each of the 12 characters, the printer controller PC will provide a square wave stepping signal to the stepper motor causing it to move the paper approximately one element line width and then the element information is again applied to the printhead. The paper advancement is accomplished in seven increments to complete the line of marks, such as for the character E illustrated in FIG. 30. It should be recognized that for each of the seven steps the desired area of the five horizontal spaces are darkened or left in its white condition for defining a desired character. At the end of the seven advancements of the paper, the character will be fully defined.

Figure 31:
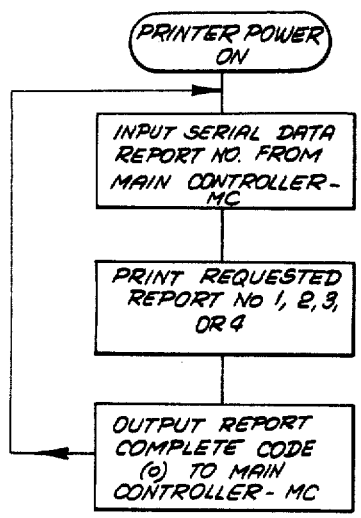
FIG. 31 is a flow diagram of the general printer operations.

The printer controller stores in its read only memory tables which contain the character table addresses of each fixed character that is to be printed on a single print line. A print line may contain all fixed data such as when printing the "property ID" or a combination of fixed data and variable data from the permanent memory. For example, when printing the date, variable data may also result from mathematical computations performed on the data from the permanent memory, such as totalling the tally counts and calculating percentages. FIG. 31 shows the general operations performed in printing any of these reports.

Referring specifically to FIG. 31 it will be known that the general operations include powering the printer module PC on by way of the main controller MC as described hereinabove. The main controller MC will then send a report number to the printer controller PC to identify the report to be printed out. The requested report of the series of four reports is then printed out. After the report is printed out the report complete code (0) is then sent to the main controller MC. The input operation is again repeated as noted by the return line in FIG. 31 if another report is to be printed. If the printing is complete, the main controller MC removes the power from the printer P to power off the printer controller PC.

In printing out the reports a standard header is utilized for all of the reports. The standard header is a list of information that is printed at the head of all four reports and its printed format is reproduced herein as follows:

REPORT #1
PARAMETERS

STANDARD HEADER
- PROPERTY ID 59000044
- LOC: 2672
- TIME: 0917
- DATE: 10-20
- QUESTION SET 5900
- TOT RESPONSE 0056
- P01 0080
- P02 5900
- P03 0044
- P04 2672
- P05 0917
- P06 1020
- P07 5900
- P08 5908
- P09 5909
- P10 5910
- P11 5911
- P12 5912
- P13 5913
- P14 5914
- P15 5915
- P16 5916
- P17 5917
- P18 5918
- P19 0001
- P20 0005
- P21 0006
- P22 0007
- P23 0008
- P24 1025
- P25 9913
- P26 9906
- P27 4231
- P28 0001
- P29 0008
- P30 3030
- P31 3231
- P32 3232
- P33 3333
- P34 3434
- P35 3535
- P36 3636
- P37 3737
- P38 3838
- P39 3939
- #0001

Figure 32:
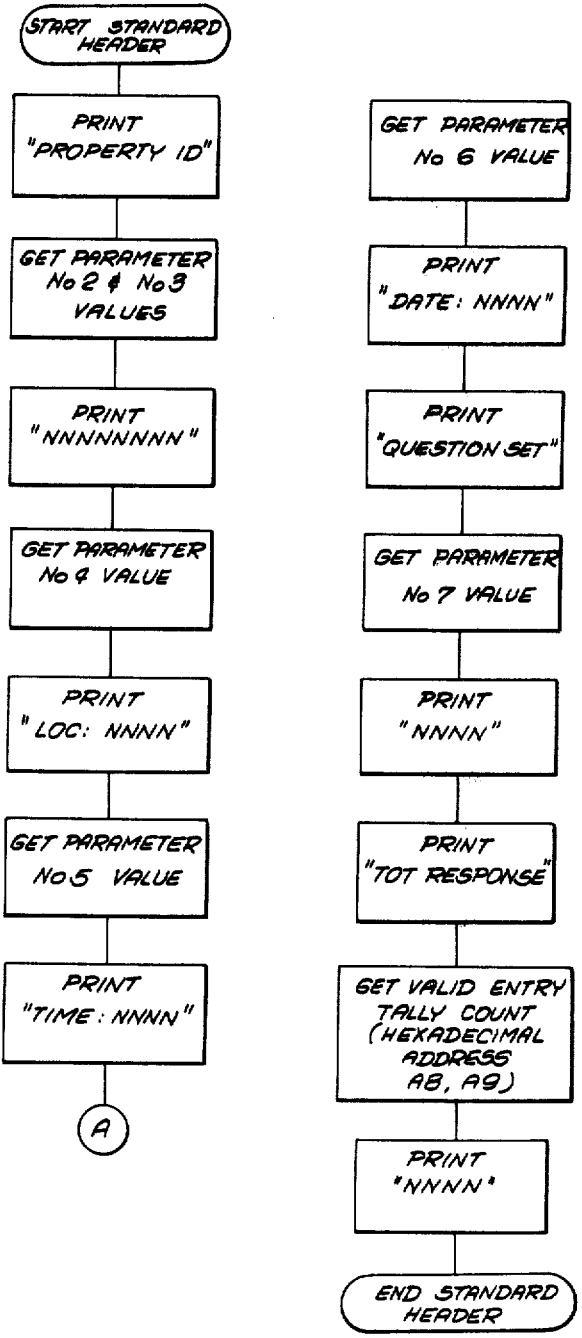
FIG. 32 is a flow diagram for the standard header print out.
Figure 34:
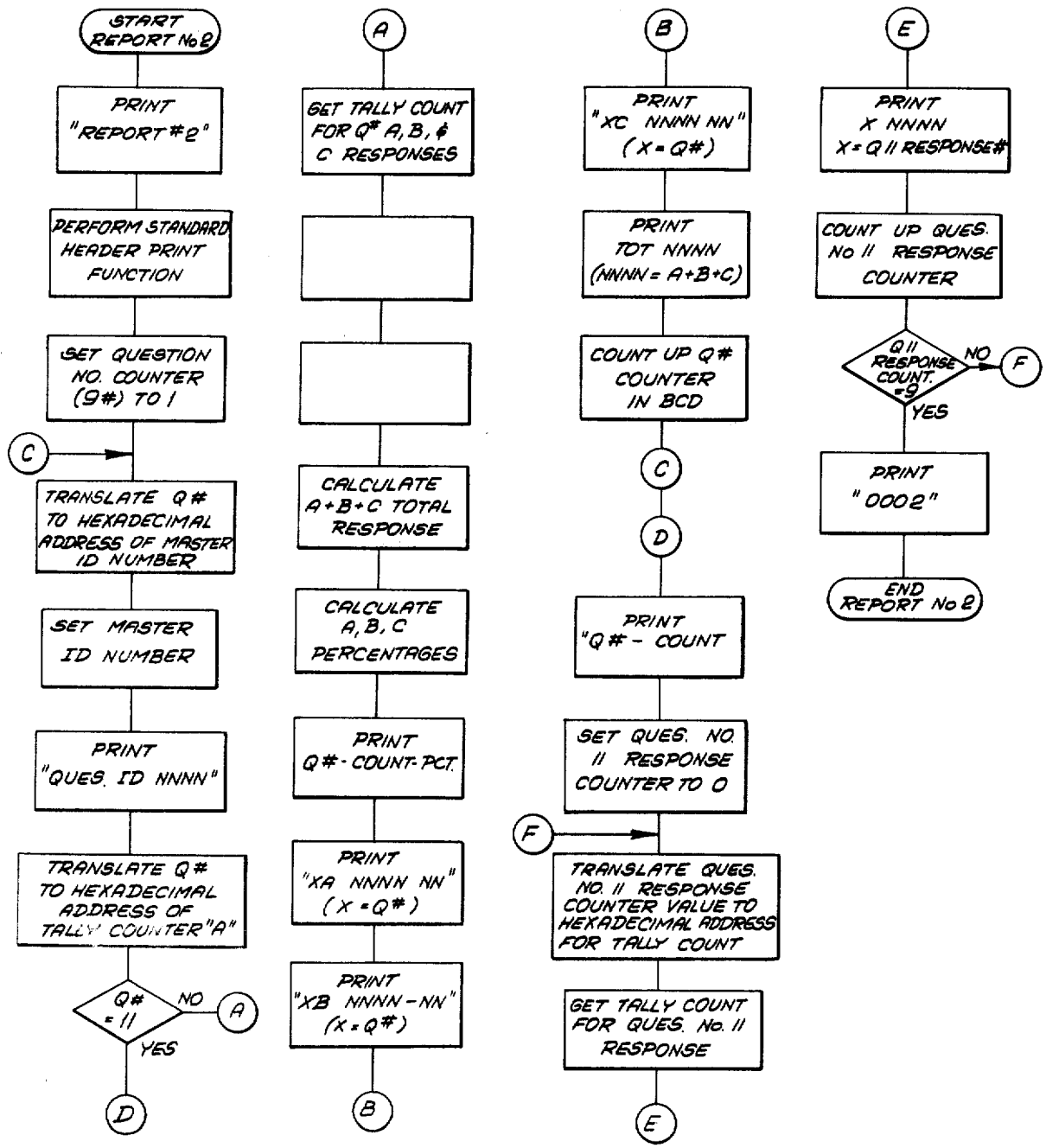
FIG. 34 is a flow diagram for printing out "report No. 2" by the thermal printer.
Figure 35:
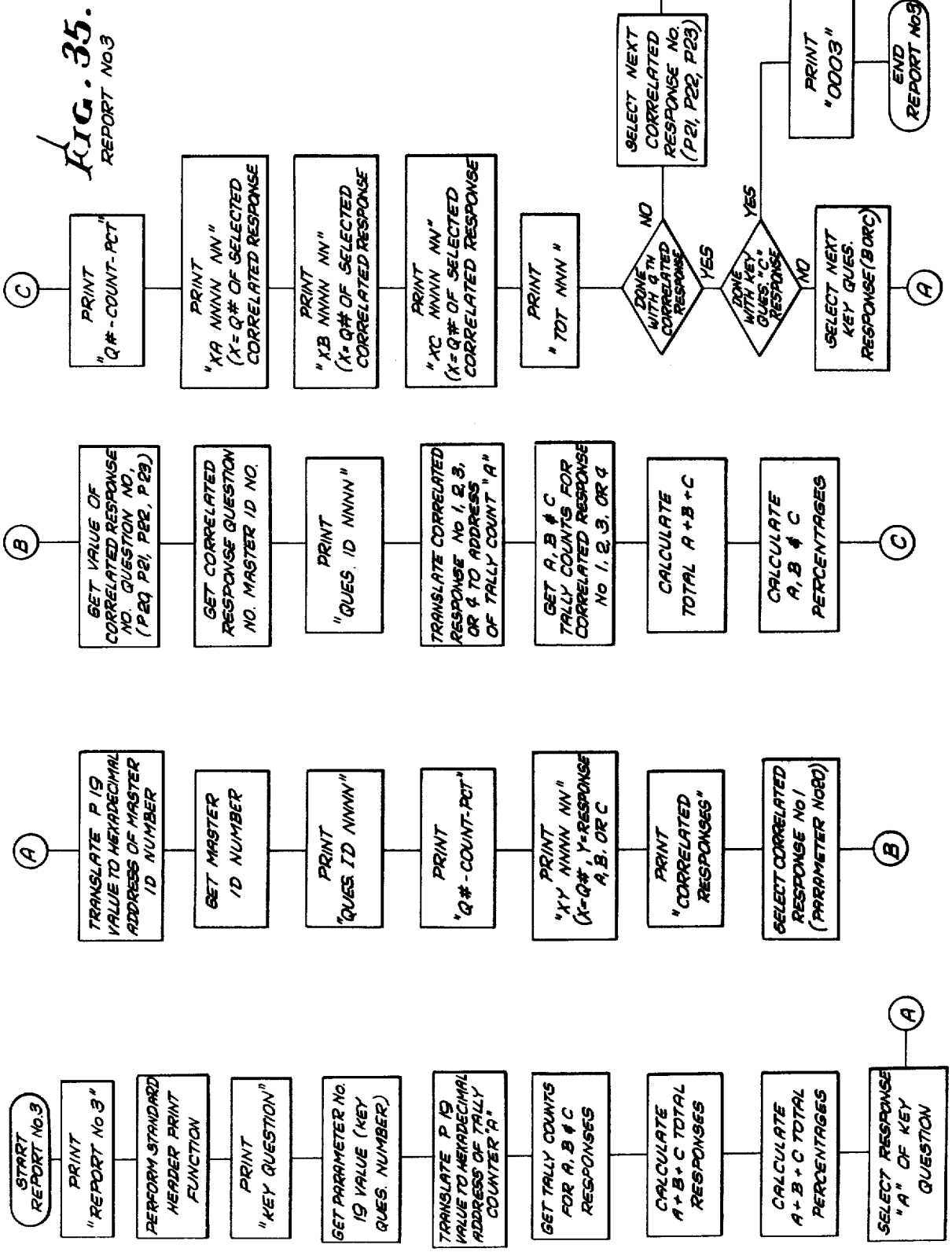
FIG. 35 is a flow diagram for printing out "report No. 3" by the thermal printer.
Figure 36:
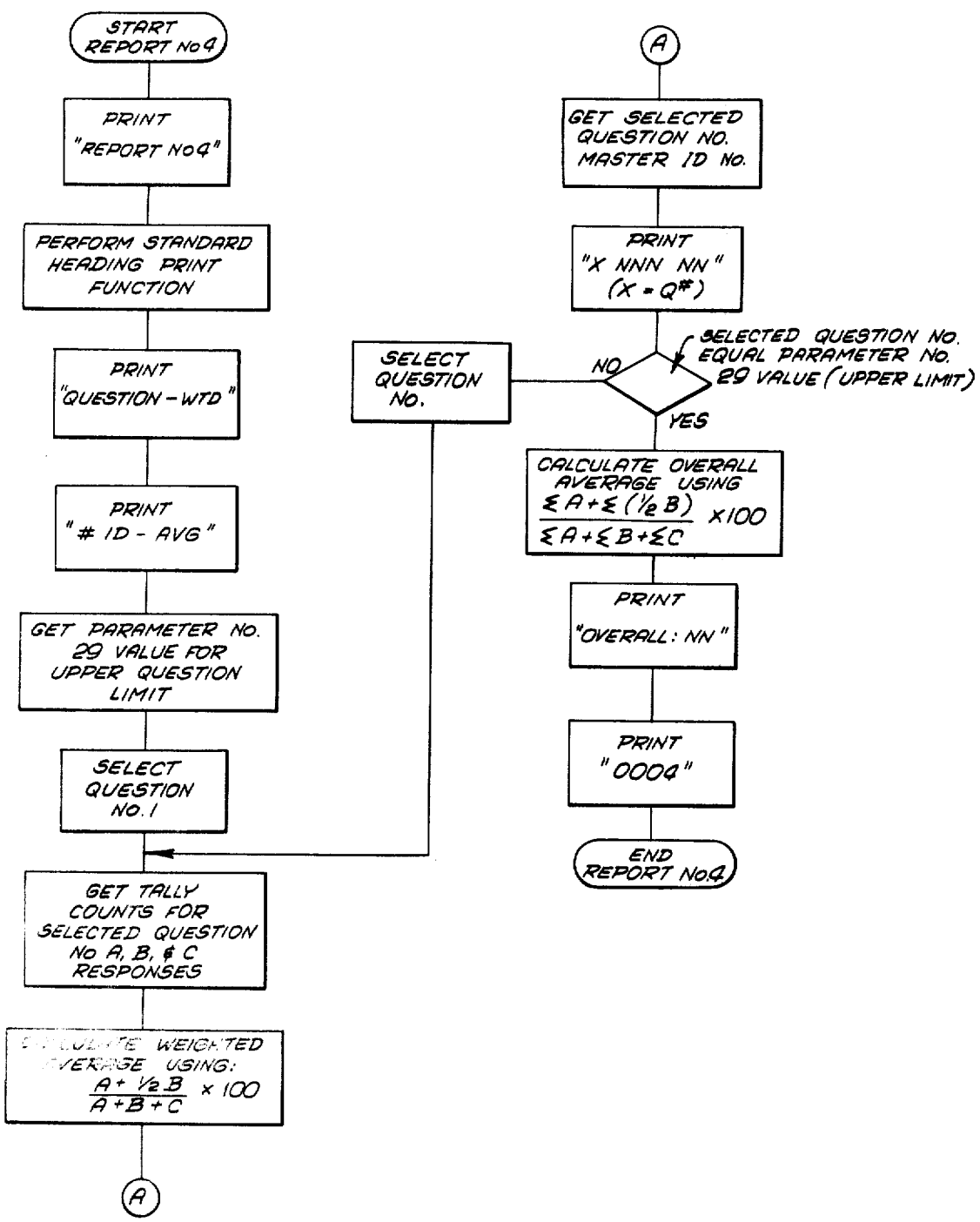
FIG. 36 is a flow diagram for printing out "report No. 4" by the thermal printer.

The operations for printing out the standard header are detailed in FIG. 32.

The operations performed by the printer controller PC to implement printing of reports 1 through 4 are illustrated in FIGS. 33 through 36, respectively. The resultant reports 1 through 4 in following through the sequence of FIGS. 33 through 36, and illustrating the actual printout format of each of these reports are reproduced hereinbelow as follows:

REPORT #2
COUNT-PCT

PROPERTY ID 59000044
LOC:2672
TIME:0914
DATE:10-20
QUESTION SET 5900
TOT RESPONSE 0056

QUES ID:5908
Q#-COUNT-PCT
1A 32 57
1B 14 25
1C 10 18
TOT 56

QUES ID:5909
Q#-COUNT-PCT
2A 32 58
2B 13 24
2C 10 18
TOT 55

QUES ID:5910
Q#-COUNT-PCT
3A 30 57
3B 13 25
3C 10 19
TOT 53

QUES ID:5911
Q#-COUNT-PCT
4A 31 57
4B 13 24
4C 10 19
TOT 54

QUES ID:5912
Q#-COUNT-PCT
5A 32 57
5B 14 25
5C 10 18
TOT 56

REPORT #3
KEY QUESTION

PROPERTY ID 59000044
LOC:2672
TIME:0915
DATE:10-20
QUESTION SET 5900
TOT RESPONSE 0056

KEY QUESTION

QUES ID:5908
Q#-COUNT-PCT
1A 32 57

CORRELATED RESPONSES

QUES ID:5912
Q#-COUNT-PCT

QUES ID:5913
Q#-COUNT-PCT
6A 7 13
6B 17 33
6C 28 54
TOT 52

QUES ID:5914
Q#-COUNT-PCT
7A 6 12
7B 19 37
7C 26 51
TOT 51

QUES ID:5915
Q#-COUNT-PCT
8A 6 12
8B 16 33
8C 27 55
TOT 49

QUES ID:5916
Q#-COUNT-PCT
9A 7 14
9B 16 33
9C 26 53
TOT 49

QUES ID:5917
Q#-COUNT-PCT
10A 7 13
10B 17 32
10C 29 55
TOT 53

QUES ID:5918
Q#-COUNT
11
0 1
1 147
2 43
3 30
4 27
5 26
6 1
7 1
8 1
9 1

0002

KEY QUESTION

QUES ID:5908
Q#-COUNT-PCT
1B 14 25

CORRELATED RESPONSES

QUES ID:5912
Q#-COUNT-PCT
5A 1 7
5B 12 86
5C 1 7
TOT 14

QUES ID:5913
Q#-COUNT-PCT
6A 2 17
6B 8 67
6C 2 17
TOT 12

QUES ID:5914
Q#-COUNT-PCT
7A 2 15
7B 9 69
7C 2 15
TOT 13

KEY QUESTION

QUES ID:5908
Q#-COUNT-PCT
1C 10 18

CORRELATED RESPONSES

QUES ID:5912
Q#-COUNT-PCT
5A 1 10
5B 1 10
5C 8 80
TOT 10

QUES ID:5913
Q#-COUNT-PCT
6A 0 0
6B 4 44
6C 5 56
TOT 9

QUES ID:5914
Q#-COUNT-PCT
7A 0 0
7B 4 44
7C 5 56
TOT 9

-continued

```
5A  30  94      QUES ID:5915        QUES ID:5915
5B   1   3      Q#-COUNT-PCT        Q#-COUNT-PCT
5C   1   3      8A   2  17          8A   0   0
TOT 32          8B   8  67          8B   3  38
                8C   2  17          8C   5  63
QUES ID:5913    TOT 12              TOT  8
Q#-COUNT-PCT
6A   5  16                          # 0003
6B   5  16
6C  21  68
TOT 31
QUES ID:5914
Q#-COUNT-PCT
7A   4  14
7B   6  21
7C  19  66
TOT 29
QUES ID:5915
Q#-COUNT-PCT
8A   4  14
8B   5  17
8C  20  68
TOT 29
                REPORT # 4
                WEIGHTED AVG
                PROPERTY ID
                59000044
                LOC:2672
                TIME:0913
                DATE:10-20
                QUESTION SET
                5900
                TOT RESPONSE
                0056
                QUESTION-WTD
                # ID   -AVG
                1  5900  70
                2  5909  70
                3  5910  69
                4  5911  69
                5  5912  70
                6  5913  30
                7  5914  30
                8  5915  29
                OVERALL: 55
                # 0004
```

Figure 37:
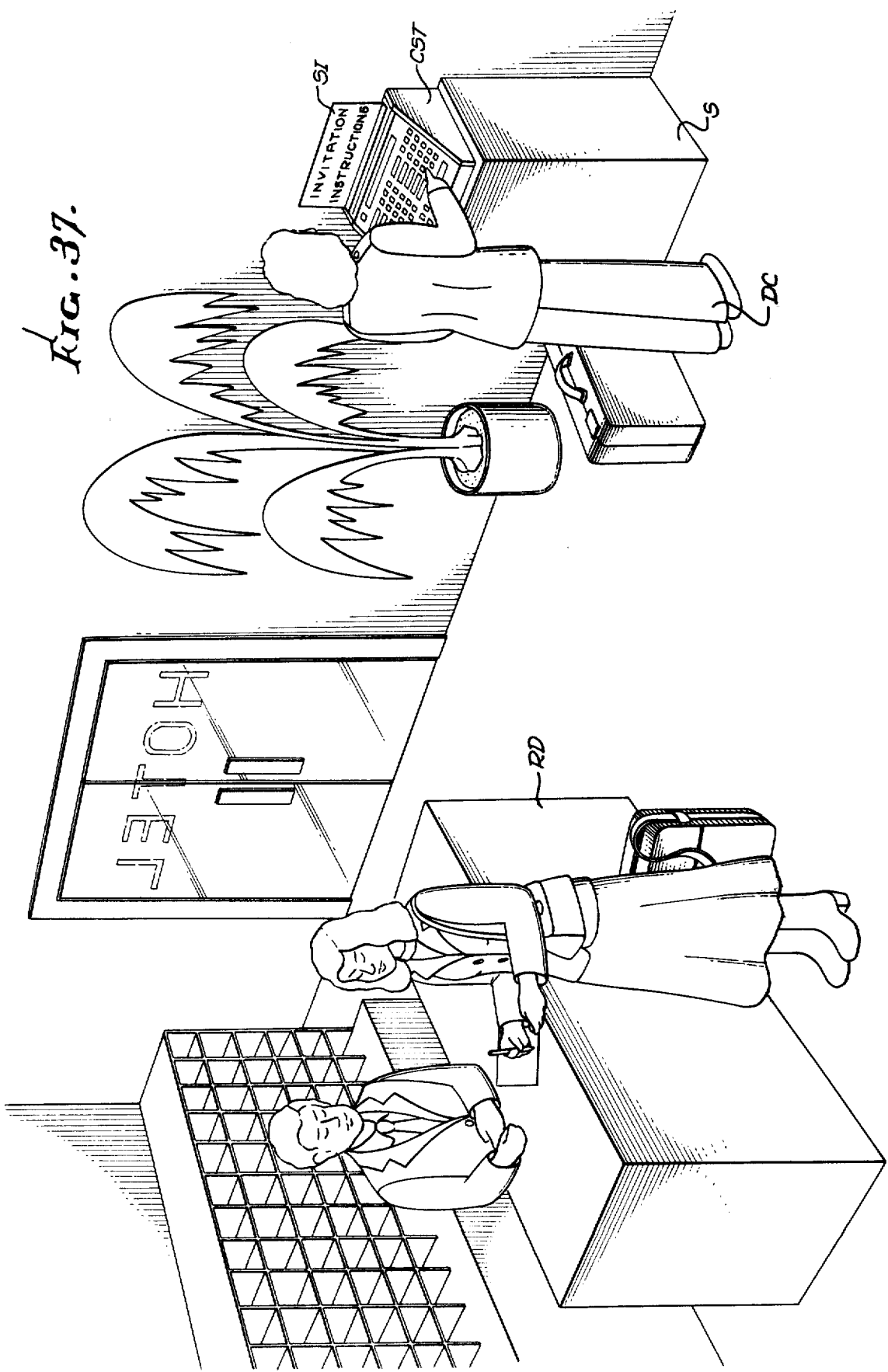
FIG. 37 is a diagrammatic illustration of a hotel lobby illustrating the convenient location of the customer satisfaction terminal in the lobby and illustrating a sign mounted on the terminal for inviting hotel guests to use the terminal.

Referring to FIG. 37, the general layout of a hotel lobby is illustrated. The illustration is of an individual at the registration desk RD completing the necessary registration form. A departing hotel customer DC is illustrated in another portion of the lobby adjacent the stand S. The stand S mounts the customer satisfaction terminal CST arranged by the hotel establishment in a convenient location to solicit the use of the terminal CST to those customers who have used their facilities immediately before departing. The departing customer DC is illustrated operating the terminal CST. The terminal CST mounts a sign SI that records a message to attract the customer's attention to invite them to record their opinions as to their satisfaction with the hotel services by means of the terminal CST. Since the terminal CST is portable and preferably battery operated it may be readily moved by an authorized individual to another location in the hotel. The terminal CST may be moved to the restaurant, for example, to test opinions concerning the services and foods of the restaurant. Similarly, convenient locations may be utilized as well as multiple terminals CST at various convenient locations in the hotel or motel or similar service organizations.

What is claimed is:

1. A method of anonymously collecting data on customer satisfaction with the services rendered by a service organization, including the steps of providing an electronic terminal having a multiplicity of pressure sensitive keys on one face thereof, said face of the terminal being capable of simultaneously and continuously displaying a plurality of permanently recorded customer satisfaction inquiries at preselected locations on the terminal and individual multiple responses tailored for each different inquiry, a plurality of groups of keys corresponding to the plurality of inquiries arranged adjacent individual inquiries and being representative of the individual responses for the single inquiry adjacent thereto with each key of the group being representative of a different response to the same inquiry, the terminal including means for individually substituting different permanently recorded inquiries and the responses for the displayed inquiries associated with a group or groups of keys, placing the thus defined electronic terminal in a location of the service organization that is readily accessible to the customers of the service organization so that the customers are invited to use the terminal and record their opinions as to the services they have experienced, the same inquiries and multiple responses being continuously displayed to a multiplicity of customers until the service organization changes the inquiries and multiple responses, the operation of a key generating an electrical data signal representative of opinion data relative to a previously identified inquiry displayed on the terminal, individually collecting the electrical data signals representative of each individually selected response signalled by the operation of a key by the terminal user on the basis of the location of the operated key, storing the electrical data signals in permanent storage means within the terminal on the basis of the number of users selecting each individual response to each of the individual responses, the permanent storage means includes program storage characters for defining the responses to each inquiry as permitting multiple responses or only a single response to an inquiry for each inquiry, examining the program storage characters to determine if the inquiry has been programmed for a single response or multiple responses, temporarily storing all key operations for each inquiry based on the collected data signals in a temporary storage device prior to storage in the permanent storage means, if it is determined an inquiry has been programmed for a single response, clear all previously stored data signals while maintaining the last data signal stored in the temporary storage device whereby the terminal user may change a previously selected response prior to storage in the permanent storage means.

2. A method of anonymously collecting data on customer satisfaction with the services rendered by a service organization as recited in claim 1 including the step of automatically storing the time of day, the day and month in the permanent storage means so that the stored data signals can be reviewed in relationship to the time of day, etc. the opinions were rendered.

3. A method of anonymously collecting data on customer satisfaction with the services rendered by a service organization as recited in claim 1 including the step of automatically discriminating between valid and invalid use of the terminal and only storing the data signals in the permanent storage means representing the valid use of the terminal, the step of discriminating between valid and invalid use of the terminal comprises determining if the number of key operations is greater than a preselected number of minimum key operations and less than a preselected number of maximum key operations and identifying all terminal usages falling between said minimum and maximum numbers as a valid use of the terminal and storing the data signals in the permanent storage means only for the identified valid usages of the terminal.

4. A method of anonymously collecting data on customer satisfaction with the services rendered by a service organization as defined in claim 1 including the step of transmitting the collected data signals to a remote location for data processing.

5. A method of anonymously collecting data on customer satisfaction with the services rendered by a service organization as defined in claim 1 wherein the electronic terminal includes printing means housed within the terminal and the steps include printing out the collected data signals on the basis they reside in the permanent storage means.

6. A method of anonymously collecting data on customer satisfaction with the services rendered by a service organization as defined in claim 5 wherein the printing means includes programmable microprocessor means for controlling the print out of the printing means, and including the step of programming the microprocessor means to perform preselected mathematical computations with respect to the collected data signals and printing out the resultants of the computations.

7. A method of anonymously collecting data on customer satisfaction with the services rendered by a service organization as defined in claim 3 including the steps of identifying, counting and recording all invalid uses of the terminal and counting and recording all valid uses of the terminal.

8. A method of anonymously collecting data on customer satisfaction with the services rendered by a service organization as defined in claim 1 including the step of visually signalling the operation of each key by continuously energizing a lamp arranged adjacent each key in response to the operation of a key.

9. A method of anonymously collecting data on customer satisfaction with the services rendered by a service organization as defined in claim 1 wherein at least one inquiry displayed on the terminal requires numerical data as a response and a plurality of keys are associated with said one inquiry with each key representing a different numerical value, and the keyboard includes a digital display adapted to display the numerical values represented by an operated numerical key, converting the electrical data signals generated in response to the operation of said keys representative of numerical data to digital display signals for signalling the numerical values of the selected numerical key, and coupling the digital display signals to the digital display to display the selected numerical value.

10. A method of anonymously collecting opinion data including the steps of recording a plurality of inquiries with multiple choice responses for each individual inquiry, simultaneously displaying the record of the plurality of inquiries and the corresponding responses with a keyboard so that the individual keys of the keyboard are associated with and represent one of the multiple choice responses of the group of responses for an individual inquiry, providing a manually operable mode select switch switchable between an "operate" mode for collecting opinion data or a "parameter" mode for storing data in a permanent memory and reading out the data, permanently storing data including program data in a permanent memory that is addressable to read out the data and write in new data when the mode select switch is in the "parameter" mode, placing the select switch in the "operate" mode for acquiring response data represented by an operated key, while the select switch is in the "operate" mode, electronically scanning the keyboard to acquire response data represented by an operated key and continuously displaying the fact that an individual key has been operated and the corresponding response or responses for each displayed inquiry has been selected, designating addressable locations in the permanent memory as tally counters for storing a count representative of the number of times each individual key of the keyboard associated with an individual response has been selected, incrementing each tally counter in the permanent memory for each of said keys that have been operated, the program data stored in the permanent data includes data for identifying an inquiry as requiring multiple responses or single responses to the displayed inquiries, examining the program data to determine the single or multiple response requirement for each displayed inquiry, upon determining that an inquiry has been programmed for multiple responses, incrementing each tally counter for each operated key, and upon determining that an inquiry has been programmed for a single response, incrementing the tally counter for the last operated key only for said single response inquiry.

11. A method of anonymously collecting opinion data as defined in claim 10 including the step of placing the mode select switch in the "parameter" mode, while the select switch is in the "parameter" mode, displaying each piece of data stored in the permanent memory including the response data in each tally counter.

12. A method of anonymously collecting opinion data as defined in claim 10, including the steps of placing the mode select switch in the "parameter" mode, while the select switch is in the "parameter" mode, displaying the program data in a preselected sequence, while displaying said program data, modifying or clearing preselected segments of the program data.

13. A method of anonymously collecting opinion data as defined in claim 10 including the step of providing print means for printing hard copy, placing the mode select switch in the "parameter" mode, while the select switch is in the "parameter" mode, transferring preselected data stored in the memory to said print means, and printing out the transferred data as a hard copy print out.

14. A method of anonymously collecting opinion data as defined in claim 10 including the step of placing the mode select switch in the "parameter" mode, while the select switch is in the "parameter" mode, clearing the tally counters for each response key.

15. A method of anonymously collecting opinion data as defined in claim 10 wherein the keyboard is switchably electrically powered and including the steps of automatically and periodically timing the keyboard to determine if a preselected time interval has elapsed since a key has been operated, if it is determined that the preselected time interval has elapsed since the key has been operated removing the electrical power to the keyboard, and if a key has been operated prior to the elapse of the preselected time interval, resetting said timing of the keyboard operations in response to a key operation and maintaining the electrical power on the keyboard.

16. A method of anonymously collecting opinion data as defined in claim 10 wherein the keyboard is switchably electrically powered and including a real time clock for continuously providing electronic timing signals at preselected real time increments, continuously recording the electronic timing signals in a permanent memory whether or not power is applied to the keyboard including the step of applying electrical power for preselected time intervals, if not previously powered during the recording step, to permit the recording thereof.

17. A method of anonymously collecting opinion data including the steps of recording a plurality of inquiries with multiple choice responses for each individual inquiry, simultaneously displaying the record of the plurality of inquiries and the corresponding responses with a keyboard so that the individual keys of the keyboard are associated with and represent one of the multiple choice responses of the group or responses for an individual inquiry, providing a manually operable mode select switch switchable between an "operate" mode for collecting opinion data or a "parameter" mode for storing data in a permanent memory and reading out the data, permanently storing data including program data in a permanent memory that is addressable to read out the data and write in new data when the mode select switch is in the "parameter" mode, placing the select switch in the "operate" mode for acquiring response data represented by an operated key, while the select switch is in the "operate" mode, electronically scanning the keyboard to acquire response data represented by an operated key and continuously displaying the fact that an individual key has been operated and the corresponding response or responses for each displayed inquiry has been selected, dedicating addressable locations in the permanent memory as tally counters for storing a count representative of the number of times each individual key of the keyboard associated with an individual response has been selected, incrementing each tally counter in the permanent memory for each of said keys that have been operated, dedicating an addressable location in the permanent memory for storing a number corresponding to a displayed inquiry that is characterized as a "key" inquiry, the "key" inquiry being a reference for a plurality of other displayed inquiries whose responses being correlated to the "key" inquiry, dedicating an addressable location in the permanent memory for storing a number corresponding to a displayed inquiry that will provide a "correlated" response to the response to the "key" inquiry, repeating the last mentioned step of dedicating an addressable location in the permanent memory 18. A method of anonymously collecting opinion data as defined in claim 17 including the steps of providing print means for printing out hard copy, transferring the "key" inquiry data and "correlated" inquiry data and tally counter data stored in the memory to the print means, and printing out the transferred data as a hard copy print out.

19. A method of anonymously collecting opinion data as defined in claim 18 wherein the print means includes programmable processing means, and calculating the percentage of terminal users responding to "key" and "correlated" inquiries and then printing out same.

20. A method of anonymously collecting opinion data as defined in claim 18 including the steps of providing a microprocessor control means for the print means for processing including arithmetical processing of the data transferred thereto, transferring preselected fixed data stored in the memory to said print means, printing out the fixed data, transferring preselected variable data stored in the memory to said print means, performing preselected arithmetic processing on the transferred data by means of the microprocessor control means for the print means, and printing out the resultants of the arithmetic processing.

21. A data collection terminal comprising a housing having a plurality of keys arranged in rows and columns on one face thereof, said housing simultaneously displaying a plurality of inquiries with multiple responses for each inquiry, a response of the group of multiple responses for an individual inquiry being arranged in association with an individual key whereby the operation of a key represents the selection by the terminal user of the associated response, the keys being arranged in an electrical matrix of rows and columns with each key arranged in electrical open circuit relationship with an individual row and column and the operation of the key momentarily bridges the row and column lines of an operated key to provide an answer signal, the keys including a "record key" arranged at a preselected location in the rows and columns of keys to provide a "record" signal to said terminal, microprocessor control circuit means mounted in the housing for providing key scan signals to the electrical matrix of rows and columns, row-by-row, for detecting and signalling the operation of an individual key and providing an answer signal to said microprocessor circuit means representative of the operated key, said microprocessor control circuit means including temporary storage means for temporarily storing the answer signals at preselected storage locations in accordance with the positions of the keys in said rows and columns, permanent storage means for summing the number of times an individual response is selected with each response being assigned an individual storage location in said permanent storage means, the operation of the "record" key provides a "record" signal to said microprocessor circuit means and said circuit means provides the necessary control signals for transferring the answer signals from the temporary storage means to said permanent storage means at the individual storage locations for summing the answer signals and thereby the number of times the individual responses have been selected by the terminal users, the plurality of keys including a plurality of keys representative of numerical data, each key being representative of a different piece of numerical data, and wherein said housing includes digital display means for displaying alpha-numeric data and a mode select switch operable between an "operate" mode and a "parameter" mode, the mode select switch being mounted and secured in said terminal to be accessible only to an authorized individual, the "operate" mode of the select switch permitting anonymous individuals to operate the keys of the terminal to select the individual responses and thereby cause the microprocessor control circuit means to acquire the individual responses and display the selected responses as selected and to cause the recording of the selected responses in the permanent storage means only upon operation of the "record" key, the permanent storage means having preselected parameters stored therein in the form of individual segments of numerical data for programming the terminal for performing preselected operations, the "parameters" mode of the select switch permitting only authorized individuals to view the data comprising the answer data and programming data stored in the permanent memory by means of the digital display means, said microprocessor control circuit means being responsive to the mode select switch being operated to the "parameter" position to permit the answer data and programming data to be displayed on the digital display the keys including a "clear" key arranged at a preselected location in the rows and columns of keys, said microprocessor control circuit means being further coupled to be responsive to the operation of the "record" and "clear" keys and being coupled to said digital display means for displaying the numerical data stored in the permanent storage means on the digital display means, the microprocessor control circuit means being further constructed and defined to be responsive to the operation of the "record" key to display the identification of a numerical value representative of a parameter and then responsive to the next sequential operation of the record key to display the identified numerical value so that the parameter and numerical value are displayed in the same sequence as their storage locations in the permanent storage means and to be responsive to the operation of the "clear" key to display the same numerical value and then responsive to the sequential operation of the "clear" key to display the same associate parameter identification data so that they are displayed in reverse sequence from their storage locations in the permanent storage means.

22. A data collection terminal as defined in claim 21 wherein said microprocessor circuit means includes means responsive to the operation of the keys representative of numeric data and said microprocessor circuit means operative to be responsive to the operation of the "record" key for transferring the keyed in numeric data into the permanent storage means at the locations of said individual segments of numerical data for programming the terminal.

23. A data collection terminal comprising a housing having a plurality of keys arranged in rows and columns on one face thereof, said housing simultaneously displaying a plurality of inquiries with multiple responses for each inquiry, a response of the group of multiple responses for an individual inquiry being arranged in association with an individual key whereby the operation of a key represents the selection by the terminal user of the associated response, the keys being arranged in an electrical matrix of rows and columns with each key arranged in electrical open circuit relationship with an individual row and column and the operation of the key momentarily bridges the row and column lines of an operated key to provide an answer signal, the keys including a "record key" arranged at a preselected location in the rows and columns of keys, microprocessor control circuit means mounted in the housing for providing key scan signals to the electrical matrix of rows and columns, row-by-row, for detecting and signalling the operation of an individual key and providing a key scan signal to said microprocessor circuit means representative of the operated key, said microprocessor control circuit means including temporary storage means for temporarily storing the answer signals at preselected storage locations in accordance with the position of the key in said rows and columns, permanent storage means for summing the number of times an individual response is selected with each response being assigned an individual storage location in said permanent storage means, the operation of the "record" key provides a key scan signal to said microprocessor circuit means and said circuit means provides the necessary control signals for transferring the answer signals from the temporary storage means to said permanent storage means at the individual storage locations for summing the number of times the individual responses have been selected by the terminal users, and the keys including a plurality of keys representative of numerical data, each key being representative of different numerical data, the keys further including a "clear" key arranged at a preselected location in the rows and columns of keys, the housing including digital display means for displaying alpha-numeric data and a mode select switch operable between an "operate" mode and a "parameter" mode, the mode select switch being in the "operate" mode for collecting data, the permanent storage means includes numerical data stored therein through the operation of the numerical data keys for programming preselected functions in accordance with the preselected different values of the numerical data and identification data representative of a unique parameter stored therein for each piece of numerical data, said microprocessor control circuit means coupled to be responsive to the "parameter" mode of the mode select switch and the operation of the "record" and "clear" keys and being coupled to said digital display means for displaying the numerical data stored in the permanent storage means on the digital display means, the microprocessor control circuit means being further constructed and defined to be responsive to the operation of the "record" key to display the identification of a numerical value representative of a parameter and then responsive to the next sequential operation of the record key to display the identified numerical value so that the parameter and numerical value are displayed in the same sequence as their storage locations in the permanent storage means and to be responsive to the operation of the "clear" key to display the same numerical value and then responsive to the sequential operation or the "clear" key to display the same associated parameter identification data so that they are displayed in reverse sequence from their storage locations in the permanent storage means, and circuit means coupled to be responsive to the operation of the keys representative of numerical data for transferring different programming numerical data into the permanent storage means at the locations of said stored numerical data and to be displayed at the digital display means as it is keyed in.

24. A data collection terminal as defined in claim 23 wherein said housing includes a conventional, portable data collection terminal including individual memory means therein, said conventional data collection terminal being removably mounted in said housing, and additional circuit means associated with said microprocessor control circuit means for transferring the answer signals from said temporary storage means of said microprocessor to said individual memory for the data collection terminal.

25. A data collection terminal as defined in claim 24 wherein said removably mounted conventional data collection terminal includes means for converting the answer signals received and stored therein to corresponding binary coded acoustic pulses for transmission over the conventional telephone lines upon removal of the conventional data collection terminal from the customer satisfaction terminal to transmit the acoustic pulses representative of answer signals to a remote point.

26. A data collection terminal as defined in claim 24 wherein said housing includes printing means stored therein and an additional, individual microprocessor circuit means coupled to said printing means, and circuit means in said first mentioned microprocessor circuit means for transferring the answer signals from the temporary storage means to said individual microprocessor circuit means to be printed out by said printing means, said individual microprocessor circuit means being programmable for controlling the printing means to print out preselected data in preselected formats, including performing calculations on the data represented by the key scan signals.

27. A data collection terminal as defined in claim 24 wherein preselected locations of said permanent storage means stores preselected data at each location useful for programming preselected functions.

28. A data collection terminal as defined in claim 27 wherein one storage location of said permanent storage means stores a numerical value representative of the lowest number of key actuations permitted for collecting valid data and another storage location of said permanent storage means stores a numerical value representative of the highest number of key actuations permitted for collecting valid data, said microprocessor control circuit means includes counting means for counting the number of key operations and means for comparing the number of key operations to the stored low and high value of key operations and terminating the operation of the terminal in the event the number of key operations is less than said low value or greater than said high value and thereby identifying the valid and invalid entries on the terminal.

29. A data collection terminal as defined in claim 28 wherein said permanent storage means includes means for storing the number of valid entries on the terminal, the valid entries including all entries falling within the range that is greater than said stored low value of key operations and less than said stored high value of key operations, and means for increasing the number of valid entries in said storage means for each entry signalled as being valid.

30. A data collection terminal comprising a housing having a plurality of keys arranged in rows and columns on one face thereof, said housing simultaneously displaying a plurality of inquiries with multiple responses for each inquiry, a response of the group of multiple responses for an individual inquiry being arranged in association with an individual key whereby the operation of a key respresents the selection of the terminal user of the associated response, the keys being arranged in an electrical matrix of rows and columns with each key arranged in electrical open circuit relationship with an individual row and column and the operation of the key momentarily bridges the row and column lines of an operated key, the keys including a "record key" arranged at a preselected location in the rows and columns of keys, microprocessor control circuit means mounted in the housing for providing key scan signals to the electrical matrix of rows and columns, row-by-row, for detecting and signalling the operation of an individual key and providing an answer signal to said circuit means representative of the operated key, said microprocessor control circuit means including temporary storage means for temporarily storing the answer signals at preselected storage locations in accordance with the position of the key in said rows and columns, permanent storage means for summing the number of times an individual response is selected with each response being assigned an individual storage location in said permanent storage means, the operation of the "record" key provides a key scan signal to said microprocessor control circuit means and said circuit means provides the necessary control signals for transferring the answer signals from the temporary storage means to said permanent storage means at the individual storage locations for summing the number of times the individual response have been selected by the terminal users, and the keys including a "clear" key arranged at a preselected location in the rows and columns of keys, digital display means and a mode select switch operable between an "operate" mode and a "parameter" mode, the mode select switch being in the "operate" mode for collecting data, microprocessor control circuit means coupled to be responsive to the "parameter" mode of the mode select switch and the operation of the "record" and "clear" keys and being coupled to said digital display means for displaying the numerical data stored in the permanent storage means on the digital display means, the microprocessor control circuit means being further constructed and defined to be responsive to the operation of the "record" key to display the identification of a numerical value representative of a parameter and then responsive to the next sequential operation of the "record" key to display the identified numerical value so that the parameter and numerical value are displayed in the same sequence as their storage locations in the permanent storage means and to be responsive to the operation of the "clear" key to display the same numerical value and then responsive to the sequential operation of the "clear" key to display the same associated parameter identification data so that they are displayed in reverse sequence from their storage locations in the permanent storage means.

* * * * *

UNITED STATES PATENT AND TRADEMARK OFFICE
CERTIFICATE OF CORRECTION

PATENT NO. : 4,345,315
DATED : August 17, 1982
INVENTOR(S) : Ernest R. Cadotte and Gerald P. Hester It is certified that error appears in the above-identified patent and that said Letters Patent is hereby corrected as shown below:

IN THE ABSTRACT:
Line 8, the word "response" should be -- responses --

Column 3, line 59 "collection" should be -- collected --
Column 6, line 22, "multiple-choise" should be --multiple choice
Column 27, line 23, "Table III" should be -- Table II --.

IN THE CLAIMS
Claim 17, column 60, line 17, the claims should continue as follows: -- for a preselected plurality of correlated responses, dedicating addressable locations in the permanent memory as additional talley counters for storing a count at each dedicated address respresentative of each individual key of the keyboard associated with an individual response for said "key" inquiry and each response for each inquiry designated as a "correlated" response, and incrementing each talley counter in the permanent memory for one of the keys that have been operated for responding to the "key" inquiry for each "correlated" inquiry. --

Claim 30, column 65, line 6, "response" should be -- responses --.

Signed and Sealed this

Twenty-sixth Day of April 1983

[SEAL]

Attest:

Attesting Officer

GERALD J. MOSSINGHOFF
Commissioner of Patents and Trademarks